United States Patent
Chizeck et al.

(10) Patent No.: US 9,471,142 B2
(45) Date of Patent: Oct. 18, 2016

(54) METHODS AND SYSTEMS FOR HAPTIC RENDERING AND CREATING VIRTUAL FIXTURES FROM POINT CLOUDS

(75) Inventors: Howard Jay Chizeck, Mercer Island, WA (US); Fredrik Rydén, Seattle, WA (US); Sina Nia Kosari, Seattle, WA (US); Blake Hannaford, Seattle, WA (US); Nicklas Gustafsson, Gothenburg (SE); Hawkeye I. King, Suquamish, WA (US)

(73) Assignee: The University of Washington, Seattle, WA (US)

( * ) Notice: Subject to any disclaimer, the term of this patent is extended or adjusted under 35 U.S.C. 154(b) by 241 days.

(21) Appl. No.: 14/125,574

(22) PCT Filed: Jun. 15, 2012

(86) PCT No.: PCT/US2012/042716
§ 371 (c)(1),
(2), (4) Date: Mar. 4, 2014

(87) PCT Pub. No.: WO2012/174406
PCT Pub. Date: Dec. 20, 2012

(65) Prior Publication Data
US 2014/0168073 A1 Jun. 19, 2014

Related U.S. Application Data

(60) Provisional application No. 61/497,423, filed on Jun. 15, 2011.

(51) Int. Cl.
*G06F 3/01* (2006.01)
*G06T 15/40* (2011.01)

(52) U.S. Cl.
CPC ............. *G06F 3/016* (2013.01); *G06T 15/405* (2013.01); *G06T 2210/28* (2013.01); *G06T 2210/56* (2013.01)

(58) Field of Classification Search
None
See application file for complete search history.

(56) References Cited

U.S. PATENT DOCUMENTS

| 5,634,039 A | 5/1997 | Simon et al. |
| 6,084,587 A * | 7/2000 | Tarr ........................ G06T 15/00 345/419 |

(Continued)

FOREIGN PATENT DOCUMENTS

| EP | 2721463 | 4/2012 |
| WO | 95/20788 A1 | 8/1995 |

(Continued)

OTHER PUBLICATIONS

Abbott, et al., "Haptic virtual fixtures for robot-assisted manipulation," Robotics Research, pp. 49-64, 2007.

(Continued)

*Primary Examiner* — Claire X Pappas
*Assistant Examiner* — Benjamin Casarez
(74) *Attorney, Agent, or Firm* — McDonnell Boehnen Hubert & Berghoff LLP

(57) ABSTRACT

Methods, articles of manufacture, and devices related to generating haptic feedback for point clouds are provided. A computing device receives depth data about an In-Contact environment. The computing device generates a point cloud from the depth data. The computing device determines a haptic interface point (HIP). The computing device determines a haptic interface point (HIP). The computing device determines a force vector between the HIP and point cloud. The computing device sends an indication of haptic feedback based on the force vector.

17 Claims, 15 Drawing Sheets

(56) References Cited

U.S. PATENT DOCUMENTS

| | | | |
|---|---|---|---|
| 6,104,158 A | | 8/2000 | Jacobus et al. |
| 6,191,796 B1* | | 2/2001 | Tarr .................. G06F 3/014 345/581 |
| 6,421,048 B1* | | 7/2002 | Shih .................. G06F 3/016 345/419 |
| 6,597,347 B1 | | 7/2003 | Yasutake |
| 6,704,694 B1* | | 3/2004 | Basdogan ............... G06F 3/016 345/184 |
| 7,084,867 B1* | | 8/2006 | Ho .................. G06F 3/016 345/419 |
| 7,084,869 B2 | | 8/2006 | Sriram et al. |
| 7,191,104 B2 | | 3/2007 | Stewart et al. |
| 7,885,732 B2 | | 2/2011 | Troy |
| 8,398,541 B2 | | 3/2013 | DiMaio et al. |
| 2003/0112281 A1* | | 6/2003 | Sriram .................. A63F 13/10 345/619 |
| 2005/0065658 A1 | | 3/2005 | Green |
| 2005/0148432 A1 | | 7/2005 | Carmein |
| 2006/0049939 A1 | | 3/2006 | Haberer et al. |
| 2006/0142657 A1 | | 6/2006 | Quaid |
| 2007/0142751 A1* | | 6/2007 | Kang ................ A61B 17/1764 600/587 |
| 2007/0142968 A1 | | 6/2007 | Prisco et al. |
| 2008/0218514 A1 | | 9/2008 | Tarr et al. |
| 2008/0240502 A1 | | 10/2008 | Freedman et al. |
| 2009/0278915 A1 | | 11/2009 | Kramer et al. |
| 2010/0063630 A1 | | 3/2010 | Sutherland |
| 2011/0066406 A1* | | 3/2011 | Tsai .................. G06F 3/016 703/1 |
| 2011/0119224 A1 | | 5/2011 | Mangione-Smith |
| 2012/0109150 A1 | | 5/2012 | Quaid |
| 2013/0096575 A1 | | 4/2013 | Olson |
| 2013/0147789 A1 | | 6/2013 | Kim |
| 2013/0169423 A1 | | 7/2013 | Iorgulescu et al. |
| 2013/0218472 A1 | | 8/2013 | Fu et al. |
| 2013/0286004 A1 | | 10/2013 | McCulloch et al. |
| 2014/0168073 A1 | | 6/2014 | Chizeck et al. |
| 2014/0320392 A1 | | 10/2014 | Chizeck et al. |
| 2014/0320489 A1 | | 10/2014 | Chizeck et al. |
| 2014/0320629 A1 | | 10/2014 | Chizeck et al. |

FOREIGN PATENT DOCUMENTS

| | | |
|---|---|---|
| WO | 2008120217 A2 | 10/2008 |
| WO | 2009045827 A2 | 4/2009 |
| WO | 2012126135 | 9/2012 |
| WO | 2012174406 | 12/2012 |
| WO | 2013033122 A1 | 3/2013 |
| WO | 2015134391 | 9/2015 |

OTHER PUBLICATIONS

Abbott, et al., "Stable Forbidden-Region Virtual Fixtures for Bilateral Telemanipulation," Transactions of the ASME, Journal of Dynamic Systems, Measurement and Control, vol. 128, No. 1, pp. 53-64, 2006.

Anderson, et al., "The Optics of Human Skin," Journal of Investigative Dermatology, vol. 77, pp. 13-19, 1981.

Basdogan, et al., "Haptic Rendering in Virtual Environments," in Handbook of Virtual Environments, K. Stanney (Ed.), Lawrence Earlbaum: London, 2002.

Brown, et al., "Mechanical design and analysis for a scanning fiber endoscope," Proceedings of the 2001 ASME International Mechanical Engineering Congress and Exposition, New York, NY, vol. 51, pp. 165-166, 2001.

Burrus, "Kinect Calibration," available online at: http://nicolas.burras.name/index.php/Research/KinectCalibration, 2010.

BWH and 3D Slicer, "3D Slicer," available online at: http://www.slicer.org, 2015.

Cha, et al., "Haptic Interaction with Depth Video Media," Advances in Multimedia Information Processing-PCM 2005, pp. 420-430, 2005.

Colgate, et al., "Passivity of a class of sampled-data systems: Application to haptic interfaces," Journal of Robotic Systems, vol. 14, No. 1, pp. 37-47, ISSN: 0741-2223, 1997.

EP 12733550.3, EP Office Action dated Feb. 13, 2015.

Helferty, et al., "Videoendoscopic Distortion Correction and Its Application to Virtual Guidance of Endoscopy," IEEE Transactions on Medical Imaging, vol. 20, No. 7, pp. 605-617, 2001.

Henry et al., "RGB-D Mapping: Using Depth Cameras for Dense 3D Modeling of Indoor Environments," in Proceedings of the 12th International Symposium on Experimental Robotics (ISER), 2010.

Herrera, et al., "Accurate and Practical Calibration of a Depth and Color Camera Pair," Computer Analysis of Images and Patterns, Part II, vol. 6855 of the series Lecture Notes in Computer Science, pp. 437-445, 2011.

Hua, et al., "Development of 2D Microdisplay Using an Integrated Microresonating Waveguide Scanning System," Journal of Intelligent Material Systems and Structures, vol. 22, No. 14, pp. 1613-1622, epub Jun. 2011.

Hua, et al., "Development of a novel polymeric waveguide and micro actuator for micro scanning system," 19th International Conference on Adaptive Structures and Technologies, Ascona, Switzerland, pp. 1-10, 2008.

Jacques, et al., "Absorption spectra for biological tissues," available online at: http://omlc.ogi.edu/classroom/ece532/class3/muaspectra.html , 1998 (retrieved Oct. 2015).

Lloyd, et al., "Programming Contact Tasks Using a Reality-based Virtual Environment Integrated with Vision," in IEEE Transactions on Robotics and Automation, 1997.

Panergo, et al., "Resonant polymeric optical waveguide cantilever integrated for image acquisition," Journal of Lightwave Technology, vol. 25, No. 3, pp. 850-860, 2007.

PCT/US2012/042716, International Search Report and Written Opinion, Sep. 25, 2012.

PCT/US2015/018320, International Search Report and Written Opinion, Jun. 18, 2015.

Prime Sense LTD, "Reference design," available online at: http://www.primesense.com/?p=514, 2011.

Weissleder, "A clearer vision for in vivo imaging," Nature Biotechnology, vol. 19, pp. 316-317, 2001.

Ruspini, et al., "The haptic display of complex graphical environments," in Proceedings of the 24th annual conference on computer graphics and interactive techniques, pp. 345-352, 1997.

Rusu, et al., "3D is here: Point Cloud Library (PCL)," IEEE International Conference on Robotics and Automation (ICRA), pp. 1-4, 2011.

Ryden, (uploaded to YouTube Dec. 16, 2010) "Haptics using Kinect," available online at: https://www.youtube.com/watch?v=bcUCDns_7Qc, (retrieved on Feb. 9, 2015).

Ryden, et al., "A proxy method for real-time 3-dof haptic rendering of streaming point cloud data," IEEE Transactions on Haptics, vol. 6, No. 3, pp. 257-267, 2013.

Ryden, et al., "Advanced Telerobotic Underwater Manipulation Using Virtual Fixtures and Haptic Rendering," MTS/IEEE Oceans Conference, San Diego, CA, pp. 1-8, 2013.

Ryden, et al., "Proxy Method for Fast Haptic Rendering from Time Varying Point Clouds," 2011 IEEE/RSJ International conference on Intelligent Robots and Systems, pp. 2614-2619, 2011.

Ryden, et al., "Using Kinect™ and a Haptic Interface for Implementation of Real-Time Virtual Fixtures," Proceedings of the 2nd Workshop on RGB-D: Advanced Reasoning with Depth Cameras (in conjunction with RSS 2011), Los Angeles, CA, pp. 1-5, 2011.

Sehgal, et al., "Real-Time Scale Invariant 3D Range Point Cloud Registration," Image Analysis and Recognition, Springer: Berlin, pp. 220-229, 2010.

Seibel, et al., "Single fiber flexible endoscope: general design for small size, high resolution, and wide field of view," in Proceedings of SPIE, Biomonitoring and Endoscopy Technologies, vol. 4158, pp. 29-39, 2001.

Stanton, "New rules for humidity in the OR," AORN Journal (online), available at: http://www.aorn.org/News/Managers/May2010Issue/Humidity, 2010.

(56) References Cited

OTHER PUBLICATIONS

Takahashi, et al., "Polymeric waveguide design of 2D display system," SPIE NDE Health Monitoring and Diagnostics, vol. 6177, pp. 617719-1-617719-9, 2006 (retrieved Oct. 2015).

Nang, et al., "1-D electro-optic beam steering device," Sensors and Actuators A: Physical, vol. 188, pp. 277-284, 2012.

Wang, et al., "1-D electro-optic beam steering device," 16th International Solid-State Sensors, Actuators and Microsystems Conference (TRANSDUCERS 2011), Beijing, China, pp. 1570-1573, 2011.

Wang, et al., "2-D Mechanically Resonating Fiberoptic Scanning Display System," 2010 International Symposium on Dptomechatronic Technologies (ISOT), Toronto, Canada, pp. 1-6, 2010.

Wang, et al., "Development of a microfabricated scanning endoscope using SU-8 based optical waveguide," SPIE NDE Health Monitoring and Diagnostics, vol. 5047, pp. 305-313, 2003.

Wang, et al., "Development of an electro-optic scanner for potential endoscope application," Journal of Medical Devices, vol. 3, No. 2, pp. 027522, 2009.

Wang, et al., "Development of an optical waveguide cantilever scanner," Proceedings of SPIE, vol. 4876, pp. 72-83, 2002.

Wang, et al., "Electro-optic polymer prism beam deflector," 21st Annual Meeting of the IEEE Lasers and Electro-Optics Society, Newport Beach, CA, pp. 579-580, 2008.

Wang, et al., "Electro-optic polymer prism beam deflector," Optical Engineering, vol. 48, No. 11, pp. 114601, 2009.

Wang, et al., "Micromachined optical waveguide cantilever as a resonant optical scanner," Sensors and Actuators A, vol. 102, pp. 165-175, 2002.

Wang, et al., "Scanning polymeric waveguide design of a 2D display system," IEEE Journal of Display Technology, vol. 1, No. 1, pp. 28-38, 2008.

Wang, et al., "Two-dimensional mechanically resonating fiber optic scanning display system," Optical Engineering, vol. 19, No. 9, pp. 097401-1-097401-8, 2010.

El-Far, et al. (2008) "An algorithm for Haptically Rendering Objects described by point clouds," IEEE, 001443-00148.

Kwok, G. Mylonas, L. Sun, M. Lerotic, J. Clark, T. Athanasiou, A. Darzi, and G. Yang, "Dynamic active constraints for hyper-redundant flexible robots," Medical Image Computing and Computer-Assisted Intervention-MICCAI 2009, pp. 410-417, 2009.

Bettini, S. Lang, A. Okamura, and G. Hager, "Vision assisted control for manipulation using virtual fixtures," vol. 2, pp. 1171-1176. [Online]. Available:http://ieeexplore.ieee.org/xpl/articleDetails.jsp?arnumber=976327.

Marayong and A. Okamura, "Speed-accuracy characteristics of human-machine cooperative manipulation using virtual fixtures with variable admittance," Human Factors: The Journal of the Human Factors and Ergonomics Society, vol. 46, No. 3, pp. 518-532, 2004.

Li, M. Ishii, and R. H. Taylor, "Spatial motion constraints using virtual fixtures generated by anatomy," Robotics, IEEE Transactions on, vol. 23, No. 1, pp. 4-19, Feb. 2007.

Kragic, P. Marayong, M. Li, A. Okamura, and G. Hager, "Human-machine collaborative systems for microsurgical applications," The International Journal of Robotics Research, vol. 24, No. 9, pp. 731-741, 2005.

Park, R. Howe, and D. Torchiana, "Virtual fixtures for robotic cardiac surgery," pp. 1419-1420, 2001.

Peshkin, J. Colgate, W. Wannasuphoprasit, C. Moore, R. Gillespie, and P. Akella, "Cobot architecture," Robotics and Automation, IEEE Transactions on, vol. 17, No. 4, pp. 377-390, 2001.

Davies, M. Jakopec, S. Harris, F. Rodriguez y Baena, A. Barrett, A. Evangelidis, P. Gomes, J. Henckel, and J. Cobb, "Active-constraint robotics for surgery," Proceedings of the IEEE, vol. 94, No. 9, pp. 1696-1704, 2006.

Becker, R. MacLachlan, G. Hager, and C. Riviere, "Handheld micromanipulation with vision-based virtual fixtures," in Robotics and Automation (ICRA), 2011 IEEE International Conference on, May 2011, pp. 4127-4132.

Dewan, P. Marayong, A. Okamura, and G. Hager, "Vision-based assistance for ophthalmic micro-surgery," in Medical Image Computing and Computer-Assisted Intervention MICCAI 2004, ser. Lecture Notes in Computer Science, C. Barillot, D. Haynor, and P. Hellier, Eds. Springer Berlin/Heidelberg, 2004, vol. 3217, pp. 49-57.

Li, A. Kapoor, and R. Taylor, "A constrained optimization approach to virtual fixtures," in Intelligent Robots and Systems, 2005. (IROS 2005). 2005 IEEE/RSJ International Conference on, Aug. 2005, pp. 1408-1413.

Park, J. Choi, Y. Park, and K. Sun, "Haptic virtual fixture for robotic cardiac catheter navigation," Artificial Organs, vol. 35, No. 11, pp. 1127-1131, 2011. [Online]. Available: http://dx.doi.org/10.11114.1525-1594.2011.01373.x.

Yamamoto, N. Abolhassani, S. Jung, A. Okamura, and T. Judkins, "Augmented reality and haptic interfaces for robot-assisted surgery," The International Journal of Medical Robotics and Computer Assisted Surgery, 2011.

Gibo, L. N. Verner, D. D. Yuh, and A. M. Okamura, "Design considerations and human-machine performance of moving virtual fixtures,"In Robotics and Automation, 2009. ICRA '09. IEEE International Conference on, May 2009, pp. 371-676.

Ren, R. Patel, K McIsaac, G. Guiraudon, and T. Peters, "Dynamic 3-d virtual fixtures for minimally invasive beating heart procedures," Medical Imaging, IEEE Transactions on, vol. 27, No. 8, pp. 1061-1070, Aug. 2008.

King, B. Hannaford, K.-W. Kwok, G.-Z. Yang, P. Griffiths, A. Okamura, I. Farkhatdinov, J.-H. Ryu, G. Sankaranarayanan, V. Arikatla, K. Tadano, K. Kawashima, A. Peer, T. Schauss, M. Buss, L Miller, D. Glozman, J. Rosen, and T. Low, "Plugfest 2009: Global interoperability in telerobotics and telemedicine," in Robotics and Automation (ICRA), 2010 IEEE International Conference on, May 2010, pp. 1733-1738.

Quigley, B. Gerkey, K. Conley, J. Faust, T. Foote, J. Leibs, E. Berger, R. Wheeler, and A. Ng, "Ros: an open-source robot operating system," in ICRA workshop on open source software, vol. 3, No. 32, 2009.

Kosari, S. Ramadurai, H. J. Chizeck and B. Hannaford, "Robotic Compression of Soft Tissue," in International Conference on Robotics and Automation (IROS). IEEE, 2012.

Ramadurai, S. N. Kosari, H. H. King, H. J. Chizeck, B. Hannaford, "Application of Unscented Kalman Filter to a Cable Driven Surgical Robot: A Simulation Study," in International Conference on Robotics and Automation (IROS). IEEE, 2012.

Rydén and H. J. Chizeck, "A Method for COntraint-Based Six Degree-of-freedom Haptic Interaction with Streaming Point Clouds," IEEE Trans. on Robotics and Engineering, 2013.

Daniel Herrera C., Juho Kannala, and Janne Heikkila, Accurate and Practical Calibration of a Depth and Color Camera Pair CAIP 2011, Part II, LNCS 6855, pp. 437-445, 2011.

Helferty, C. Zhang, G. McLennan, and W. E. Higgins "Videoendoscopic Distortion Correction and Its Application to Virtual Guidance of Endoscopy," IEEE Transaction on Medical Imaging, vol. 20, No. 7.

Rydén, et al., 'Proxy Method for Real-Time 3-DOF Haptic Rendering from streaming Point cloud data, IEEE Transactions on Haptics, 6(3): 257-267, 2013.

Tassa, Y. and Erez, T. and Todorov, E Fast Model Predictive Control for Reactive Robotic Swimming. 2011.

Thou et al. (Apr. 2015) "An Exoskeleton Glove Mechanism for Mobile Robot Navigation through Haptics Feedback," IEEE/ASME Transactions on Mechatronics, 20(2):641-652.

Zhou, MA et al., An Exoskeleton Glove Mechanism for Mobile Robot Navigation through Haptics Feedback, IEEE/ASME Transactions on Mechatronics (2013).

Diolaiti, Nicola et al., Haptic Teleoperation of a Mobile Robot, IFAC Symp. on Robot Control 2798-805 (2003).

(56) References Cited

OTHER PUBLICATIONS

Buss, Martin et al., Multi-Modal Multi-User Telepresence and Teleaction System, IEEE/RSJ Int'l Conf. on Intelligent Robots and Sys. 4137-38 (Sep. 2008).

Johnson and P. Willemsen, "Six degree-of-freedom haptic rendering of complex polygonal models," in Haptic Interfaces for Virtual Environment and Teleoperator Systems, 2003. HAPTICS 2003. Proceedings. 11th Symposium on. IEEE, 2003, pp. 229-235.

Otaduy and M. Lin, "Introduction to haptic rendering," in ACM SIGGRAPH 2005 Courses. ACM, 2005, p. 3.

Johnson, P. Willemsen, and E. Cohen, "Six degree-of-freedom haptic rendering using spatialized normal cone search," Visualization and Computer Graphics, IEEE Transactions on, vol. 11, No. 6, pp. 661-670, 2005.

Nelson, D. Johnson, and E. Cohen, "Haptic rendering of surfaceto-surface sculpted model interaction," in ACM SIGGRAPH 2005 Courses. ACM, 2005, p. 97.

Colgate, M. Stanley, and J. Brown, "Issues in the haptic display of tool use," in Intelligent Robots and Systems 95.'Human Robot Interaction and Cooperative Robots', Proceedings. 1995 IEEE/RSJ International Conference on, vol. 3. IEEE, 1995, pp. 140-145.

Zilles and J. Salisbury, "A constraint-based god-object method for haptic display," in Intelligent Robots and Systems 95.'Human Robot Interaction and Cooperative Robots', Proceedings. 1995 IEEE/RSJ International Conference on, vol. 3. IEEE, 1995, pp. 146-151.

Baraff, "Analytical methods for dynamic simulation of nonpenetrating rigid bodies," in ACM SIGGRAPH Computer Graphics, vol. 23, No. 3, ACM, 1989, pp. 223-232.

Ruspini and O. Khatib, "Collision/contact models for the dynamic simulation of complex environments," in Proc. IEEE/RSJ Int. Conf. on Intelligent Robots and Systems, vol. 82, Citeseer, 1997.

Redon, A. Kheddar, and S. Coquillart, "Gauss' least constraints principle and rigid body simulations," in Robotics and Automation, 2002, Proceedings, ICRA'02. IEEE International Conference on, vol. 1. IEEE, 2002, pp. 517-522.

McNeely, K. Puterbaugh, and J. Troy, "Six degree-of-freedom haptic rendering using voxel sampling," in Proceedings of the 26th annual conference on Computer graphics and interactive techniques. ACM Press/Addison-Wesley Publishing Co., 1999, pp. 401-408.

Gregory, A. Mascarenhas, S. Ehmann, M. Lin, and D. Manocha, "Six degree-of-freedom haptic display of polygonal models," in Proceedings of the conference on Visualization'00 IEEE Computer Society Press, 2000, pp. 139-146.

Wan and W. McNeely, "Quasi-static approximation for 6 degrees-of-freedom haptic rendering," in Proceedings of the 14th IEEE Visualization 2003 (VIS'03). IEEE Computer Society, 2003, p. 34.

Hasegawa and M. Sato, "Real-time rigid body simulation for haptic interactions based on contact volume of polygonal objects," in Computer Graphics Forum, vol. 23, No. 3. Wiley Online Library, 2004, pp. 529-538.

Otaduy and M. Lin, "Sensation preserving simplification for haptic rendering," in ACM SIGGRAPH 2005 Courses. ACM, 2005, p. 72.

Otaduy, et al., "A modular haptic rendering algorithm for stable and transparent 6-dof manipulation," Robotics, IEEE Transactions on, vol. 22, No. 4, pp. 751-762, 2006.

McNeely, K. Puterbaugh, and J. Troy, "Voxel-based 6-dof haptic rendering improvements," Haptics-e, vol. 3, No. 7, 2006.

Barbi and D. James, "Time-critical distributed contact for 6-dof haptic rendering of adaptively sampled reduced deformable models," 2007.

Kolesnikov and M. Zefran, "Energy-based 6-dof penetration depth computation for penalty-based haptic rendering algorithms," in Intelligent Robots and Systems, 2007. IROS 2007. IEEE/RSJ International Conference on. IEEE, 2007, pp. 2120-2125.

Barbic and D. James, "Six-dof haptic rendering of contact between geometrically complex reduced deformable models," Haptics, IEEE Transactions on, vol. 1, No. 1, pp. 39-52, 2008.

He and Y. Chen, "Six-degree-of-freedom haptic rendering in virtual teleoperation," Instrumentation and Measurement, IEEE Transactions on, vol. 57, No. 9, pp. 1866-1875, 2008.

Mirtich and J. Canny, "Impulse-based simulation of rigid bodies," in Proceedings of the 1995 symposium on Interactive 3D graphics. ACM, 1995, pp. 181-ff.

Chang and J. Colgate, "Real-time impulse-based simulation of rigid body systems for haptic display," in Proc. Symp. on Interactive 3D Graphics, 1997, pp. 200-209.

Constantinescu, S. Salcudean, and E. Croft, "Haptic rendering of rigid body collisions," in Haptic Interfaces for Virtual Environment and Teleoperator Systems, 2004. HAPTICS'04. Proceedings. 12th International Symposium on IEEE, 2004, pp. 2-8.

Constantinescu, "Haptic rendering of rigid contacts using impulsive and penalty forces," Robotics, IEEE Transactions on, vol. 21, No. 3, pp. 309-323, 2005.

Ruffaldi, D. Morris, F. Barbagli, K. Salisbury, and M. Bergamasco, "Voxel-based haptic rendering using implicit sphere trees," in Haptic interfaces for virtual environment and teleoperator systems, 2008. haptics 2008. symposium on. IEEE, 2008, pp. 319-325.

Berkelman, R. Hollis, and D. Baraff, "Interaction with a real time dynamic environment simulation using a magnetic evitation haptic interface device," in Robotics and Automation, 1999. Proceedings. 1999 IEEE International Conference on, vol. 4. IEEE, 1999, pp. 3261-3266.

Ortega, S. S Redon, and S. Coquillart, "A six degree-of-freedom god-object method for haptic display of rigid bodies," in Virtual Reality Conference, 2006, IEEE, 2006, pp. 191-198.

Ortega, et al., "A six degree-of-freedom god-object method for haptic display of rigid bodies with surface properties," Visualization and Computer Graphics, IEEE Transactions on, vol. 13, No. 3, pp. 458-469, 2007.

Chan, F. Conti, N. Blevins, and K. Salisbury, "Constraint-based six degree-of-freedom haptic rendering of volume-embedded isosurfaces," in Proc. Of the 2011 IEEE International World Haptics Conference, 2011.

Zhang, D. Wang, Y. Zhang, and J. Xiao, "Configuration-based optimization for six degree-of-freedom haptic rendering using spheretrees," in Intelligent Robots and Systems (IROS), 2011 IEEE/RSJ International Conference on. IEEE, 2011, pp. 2602-2607.

Wang, X. Zhang, Y. Zhang, and J. Xiao, "Configuration-based optimization for six degree-of-freedom haptic rendering or fine manipulation," in Robotics and Automation (ICRA), 2011 IEEE International Conference on. IEEE, 2011, pp. 906-912.

Wang, S. Liu, X. Zhang, Y. Zhang, and J. Xiao, "Six-degree-of-freedom haptic simulation of organ deformation in dental operations," in Robotics and Automation (ICRA), 2012 IEEE International Conference on. IEEE, 2012, pp. 1050-1056.

Ryden, S. Nia Kosari, and H. Chizeck, "Proxy method for fast haptic rendering from time varying point clouds," in ntelligent Robots and Systems (IROS), 2011 IEEE/RSJ International Conference on. IEEE, 2011, pp. 2614-2619.

Leeper, S. Chan, and K. Salisbury, "Point clouds can be represented as implicit surfaces for constraint-based haptic rendering," in Roboticss and Automation (ICRA), 2012 IEEE International Conference on. IEEE, 2012, pp. 5000-5005.

Rasool and A. Sourin, "Haptic interaction with 2d images," in Proceedings of the 10th International Conference on Virtual Reality Continuum and Its Applications in Industry. ACM, 2011, pp. 13-22.

Ryden and H. Chizeck, "Forbidden-region virtual fixtures from streaming point clouds: Remotely touching and protecting a beating heart," in Intelligent Robots and Systems (IROS), 2012 IEEE/RSJ International Conference on IEEE, 2012.

Leeper, S. Chan, K. Hsiao, M. Ciocarlie, and K. Salisbury, "Constraint-based haptic rendering of point data for teleoperated robot grasping," in Haptics Symposium (HAPTICS), 2012 IEEE, Mar. 2012, pp. 377-383.

Tomasi and R. Manduchi, "Bilateral filtering for gray and color images," in Computer Vision, 1998. Sixth International Conference on. IEEE, 1998, pp. 839-846.

Wendland, "Piecewise polynomial, positive definite and compactly supported radial functions of minimal degree," Advances in computational Mathematics, vol. 4, No. 1, pp. 389-396, 1995.

(56) References Cited

OTHER PUBLICATIONS

Wilhelmsen, "A nearest point algorithm," Mathematics of computation, vol. 30, No. 133, pp. 48-57, 1976.

Adams and B. Hannaford, "Stable haptic interaction with virtual environments," Robotics and Automation, IEEE Transactions on, vol. 15, No. 3, pp. 465-474, 1999.

N. Diolaiti, G. Niemeyer, F. Barbagli, and J. Salisbury, "Stability of haptic rendering: Discretization, quantization, time delay, and coulomb effects," Robotics, IEEE Transactions on, vol. 22, No. 2, pp. 256-268, 2006.

Kolesnikov and M. Zefran, "Generalized penetration depth for penalty-based six-degree-of-freedom haptic rendering," Robotica, vol. 26, No. 04, pp. 513-524, 2008.

Rosenberg, "Virtual fixtures: Perceptual tools for telerobotic manipulation," pp. 76-82, Sep. 1993.

Kitagawa, D. Dokko, A. Okamura, and D. Yuh, "Effect of sensorysubstitution on suturemanipulation forces for robotic surgical systems,"Journal of Thoracic and Cardiovascular Surgery, vol. 129, No. 1, pp. 151-158, 2005.

Navkar, Z. Deng, D. J. Shah, K. E. Bekris, and N. V. Tsekos,"Visual and force-feedback guidance for robot-assisted Interventions in the beating heart with real-time MRI," pp. 689-894, May 2012.

Payandeh and Z. Stanisic, "On application of virtual fixtures as an aid for telemanipulation and training," in Haptic Interfaces for Virtual Environment and Teleoperator Systems, 2002. HAPTICS 2002. Proceedings. 10th Symposium on, 2002, pp. 18-23.

Adamson et al., "Approximating and Intersecting Surfaces from Points," Proceedings of the 2003 Eurographics/ACM SIGGRAPH Symposium on Geometry Processing (SGP '03), Jun. 2003, pp. 230-239.

Hua et al., "A 2-D Microdisplay Using An Integrated Microresonating Waveguide Scanning System," 20th International Conference on Adaptive Structures and Technologies, Hong Kong, Oct. 2009, pp. 53-62.

Inglese et al., "A Human-Scale Virtual Environment with Haptic Feedback," Proc. ICINCO, 2005, pp. 140-145, vol. 4.

International Bureau, International Report on Patentability mailed on Jan. 3, 2014, issued in connection with International Application No. PCT/US2012/042716, filed on Jun. 12, 2012, 9 pages.

International Searching Authority, International Search Report and Written Opinion mailed on Sep. 25, 2012, issued in connection with International Application No. PCT/US2012/042716, filed on Jun. 12, 2012, 14 pages.

International Searching Authority, International Search Report and Written Opinion mailed on Dec. 11, 2015, issued in connection with International Application No. PCT/US2015/049781, filed on Sep. 11, 2015, 14 pages.

Klein et al., "Point Cloud Collision Detection," Eurographics, Sep. 2004, pp. 567-576, vol. 23, No. 3.

Lee et al., "Haptic Rendering of Point Set Surfaces," Second Joint EuroHaptics Conference and Symposium on Haptic nterfaces for Virtual Environment and Teleoperator Systems (WHC'07), IEEE, 2007, pp. 513-518.

Levin, David, "The Approximation Power of Moving Least-Squares," Mathematics of Computation, Oct. 1998, pp. 1517-1531, vol. 67, No. 224.

\* cited by examiner

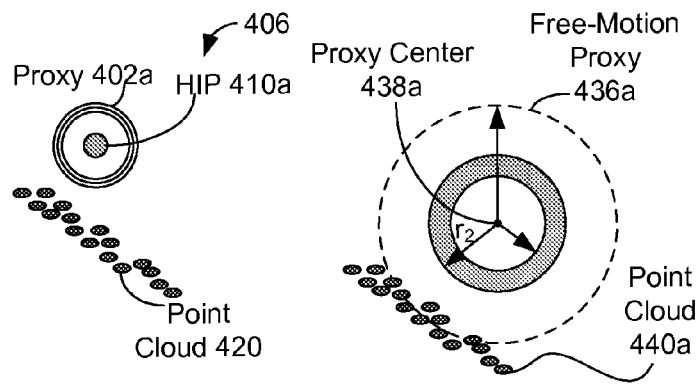
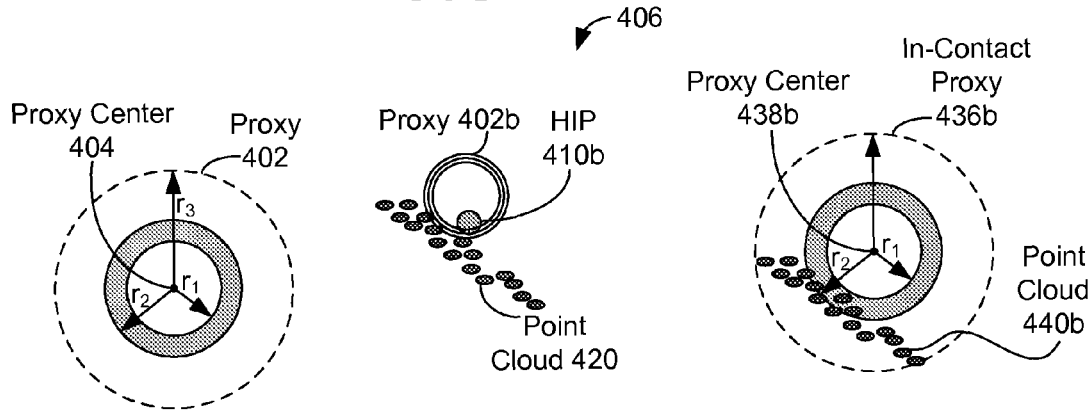
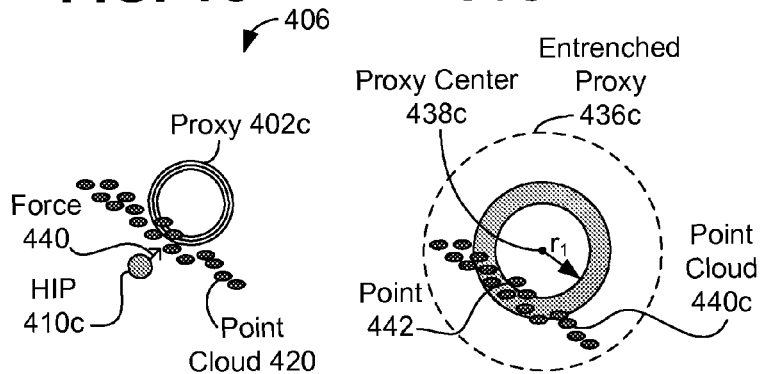
FIG. 4B  FIG. 4E
FIG. 4A  FIG. 4C  FIG. 4F
FIG. 4D  FIG. 4G

METHODS AND SYSTEMS FOR HAPTIC RENDERING AND CREATING VIRTUAL FIXTURES FROM POINT CLOUDS

RELATED APPLICATIONS

The present application is a U.S. National Stage Entry of Patent Cooperation Treaty (PCT) Application No. PCT/US 12/42716, entitled "Methods and Systems for Haptic Rendering and Creating Virtual Fixtures from Point Clouds", filed on Jun. 15, 2012, which claims priority to U.S. Provisional Patent Application No. 61/497,423 entitled "Methods and Systems for Haptic Rendering and Creating Virtual Fixtures from Point Clouds", filed Jun. 15, 2011, all of which are entirely incorporated by reference herein for all purposes.

STATEMENT OF GOVERNMENT RIGHTS

This invention was made with government support under grant CNS-0930930, awarded by the National Science Foundation. The government has certain rights in the invention.

BACKGROUND OF THE INVENTION

Unless otherwise indicated herein, the materials described in this section are not prior art to the claims in this application and are not admitted to be prior art by inclusion in this section.

Haptic rendering is the translation of forces in a virtual environment to a physical "haptic" device that can provide touch-based, a.k.a. haptic, feedback to a user of the haptic device. Both impedance type and admittance type haptic devices are available.

To provide haptic feedback about the virtual environment, objects in the virtual environment are often represented as a collection of polygons, such as triangles, that can be operated upon using a haptic device. The haptic device can be controlled using a "Haptic Interaction Point" (HIP) in the virtual environment, which performs a similar function for the haptic device as a mouse pointer does for a computer mouse. Ideally, the HIP should not be able to penetrate virtual environment objects.

FIGS. 1A-1C depict a scenario 100 that illustrates a prior art technique of utilizing proxy 130 to control interactions between HIP 110 and polygon 120 in a virtual environment. In scenario 100, HIP 110 starts as the position shown as HIP 110a in FIG. 1A, moves through position HIP 110b shown in FIG. 1B, and ends at position HIP 110c shown in FIG. 1C. In this technique, HIP 110 and proxy 130 are connected by a simulated spring not shown in the Figures.

In FIG. 1A, proxy 130, shown at position 130a, is in "free motion"; e.g., proxy 130a is not touching polygon 120. In FIG. 1B, proxy 130, shown at position 130b, is "in contact" with polygon 120. In scenario 100, while HIP 110 continues to move down from position 110b into polygon 120, proxy 130 is not permitted to enter into polygon 120. In FIG. 1C, proxy 130, shown at position 130c, is still in contact with a surface of polygon 120 after HIP 110 has moved to position 110c inside of polygon 120. As the distance increases between HIP 110 and proxy 130, the simulated spring exerts a proportionally larger force to draw HIP 110 closer to proxy 130. FIG. 1C shows the simulated spring force as force 140 exerted on HIP 110. As shown in FIG. 1C, force 140 is exerted in the direction of a normal of the surface in contact with the proxy 130; e.g., a hypotenuse 122 of polygon 120.

Recently, relatively inexpensive, low-latency cameras have been made commercially available that provide both image and depth information about a real environment. One example is the camera used by KINECT® for XBOX 360® by the Microsoft Corporation of Redmond, Wash. The KINECT® camera includes an RGB camera and a depth sensor. The KINECT® camera can capture and provide RGB+D data, or video (RGB) and depth (D) information, at a 30 Hertz frame rate. The RGB+D data provided by the KINECT® uses 8-bit VGA resolution (640×480 pixels) for an RGB video stream and one 11-bit depth value per pixel as a monochrome depth sensor data stream.

In the realm of robotic surgery, the introduction of the da Vinci surgical robot (Intuitive Surgical, Inc., Sunnyvale, Calif.) in 2001 provided an additional laparoscopic technological adjunct which has rapidly penetrated the surgical arena. Adapted from research exploring remote surgical capabilities for the military, the da Vinci robot is the only commercially available remote surgical robot. The fields of general surgery, urology, gynecology, cardiothoracic surgery, pediatric surgery and otolaryngology have to varying degrees embraced this technology and its adoption is evidenced particularly by the rapid increase in the number of prostatectomies for prostate cancer.

Even though the da Vinci has dramatically enhanced the dexterity of laparoscopic procedures, the integration between computation and surgery is essentially unchanged from prior practice. In current robotic surgery, the robot is merely an extension of existing tools. In particular, the current state-of-the-art for visualization during robotic surgery involves a rigid single view 3D endoscope.

Other environments can be explored by robots, such as undersea, outer space, and hazardous environments. In some of these environments, robots can be controlled by human operators receiving video and/or audio information from the robot.

SUMMARY

In one aspect, a method is provided. A computing device receives depth data about an environment. The computing device generates a point cloud from the depth data. The computing device determines a haptic interface point (HIP). The computing device determines a force vector between the HIP and point cloud. The computing device sends an indication of haptic feedback based on the force vector.

In another aspect, an article of manufacture is provided. The article of manufacture includes a physical and/or non-transitory computer-readable storage medium storing instructions that, upon execution by a processor, cause the processor to perform functions including: (a) receiving depth data about an environment, (b) generating a point cloud from the depth data, (c) determining a haptic interface point (HIP), (d) determining a force vector between the HIP and the point cloud, and (e) sending an indication of haptic feedback based on the force vector.

In yet another aspect, a computing device is provided. The computing device includes a processor and data storage. The data storage stores instructions that, upon execution by a processor, cause the computing device to perform functions including: (a) receiving depth data about an environment, (b) generating a point cloud from the depth data, (c) determining a haptic interface point (HIP), (d) determining a force vector between the HIP and the point cloud, and (e) sending an indication of haptic feedback based on the force vector.

One advantage of this application is that haptic feedback is generated based on the use of streaming point clouds. As disclosed herein, the use of a stream of frames representing point clouds permits haptic rendering, or providing haptic feedback, at a haptic rendering rate faster than a frame rate, or rate of depth-information reception. In some embodiments, a haptic rendering system utilizing the techniques described here can have a haptic rendering rate meeting or exceeding 1000 Hz.

Another advantage is that the point clouds are regenerated each time new depth information is received. Regeneration of point clouds in keeping with the frame rate and providing haptic feedback rate at the faster haptic rendering rate enables providing haptic feedback for non-predetermined environments. In some scenarios, the non-predetermined environments can include moving objects. Even when a non-predetermined environment includes moving objects, the haptic rendering system described herein can provide haptic feedback at a haptic rendering rate above the frame rate for the non-predetermined environment.

BRIEF DESCRIPTION OF THE DRAWINGS

Various examples of particular embodiments are described herein with reference to the following drawings, wherein like numerals denote like entities, in which:

FIG. 4A is a diagram of a proxy, in accordance with an example embodiment;

FIGS. 4B-4D depict a scenario illustrating a technique of controlling interactions between a Haptic Interaction Point (HIP) and a point cloud in a virtual environment, in accordance with an example embodiment;

FIG. 4E is a diagram of an example free-motion proxy, in accordance with an example embodiment;

FIG. 4F is a diagram of an example in-contact proxy, in accordance with an example embodiment;

FIG. 4G is a diagram of an example entrenched proxy, in accordance with an example embodiment;

FIG. 6A is a vector diagram for a free-motion proxy, in accordance with an example embodiment;

FIG. 6B is a vector diagram for an entrenched proxy, in accordance with an example embodiment;

FIG. 6C is a vector diagram for an in-contact proxy with a HIP inside of a surface defined by a point cloud, in accordance with an example embodiment;

FIG. 6D is a vector diagram for an in-contact proxy with a HIP outside of a surface defined by a point cloud, in accordance with an example embodiment;

FIG. 7A depicts a point cloud with a forbidden region, in accordance with an example embodiment;

FIG. 7B depicts a proxy, in accordance with an example embodiment;

FIG. 7C shows an example proxy whose movement toward a HIP is impeded by a forbidden region, in accordance with an example embodiment;

FIG. 7D shows an example point cloud, in accordance with an example embodiment.

DETAILED DESCRIPTION

Overview

Haptic feedback can include any kind of touch-based feedback, such as vibrations, forces, motions, shocks, and/or other kinds of touch-based feedback. The techniques described herein are primarily concerned with providing force feedback. This force feedback is readily interpreted as resistance at a surface of an object in a virtual environment to provide a simulated touch of the surface.

RGB+D data received from a camera, such as the KINECT® camera, can be transformed into a "point cloud" or a collection of points in a frame of reference, such as a Cartesian coordinate system (e.g., points in $R^2$ or $R^3$). Once in the frame of reference, the point cloud can be treated a collection of points that can represent surfaces and objects in the virtual environment that also includes two other entities: one or more HIPs and a proxy for each HIP.

The HIP represents a position of potential contact between the virtual environment and a real environment that, as mentioned above, should not be able to enter into objects of the virtual environment. For example, in a virtual environment representing a game, one HIP can represent a position of a player's hand. Then, any haptic feedback from the game can use the HIP to determine the appropriate feedback; e.g., any haptic feedback upon touching or pressing on a surface in the virtual environment As mentioned above, a proxy can be used to provide haptic feedback for an associated HIP. The proxy can be (a representation of) a function for selecting zero or more points in the point cloud that are near to the HIP. For example, a proxy can be a representation of the function $(x-Px)+(y-Py)+(z-Pz)=r^2$, for a proxy center $P=(Px, Py, Pz)$ in $R^3$, a current position $p=(x, y, z)$ in $R^3$, and a proxy radius $r$; in this example, the proxy is a sphere centered at $(Px, Py,$ Pz) with radius r that represents the proxy function $(x-Px)+(y-Py)+(z-Pz)=r^2$. While the HIP is not supposed to enter into an object in the virtual environment, a user can still direct the HIP into the object. In contrast, a haptic rendering algorithm can enforce rules that keep the proxy on a surface of the object. Then, haptic feedback can be provided by using the proxy as an anchor of a virtual spring connected to the HIP.

Figure 1A:
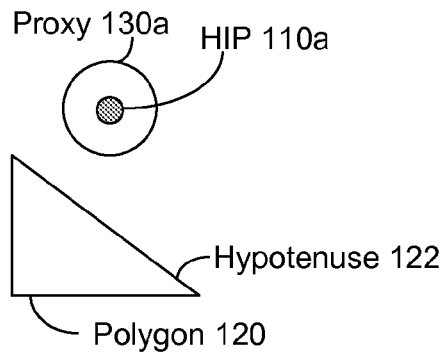
FIGS. 1A-1C depict a scenario illustrating a prior art technique of controlling interactions between a Haptic Interaction Point (HIP) and a polygon in a virtual environment.
Figure 1B:
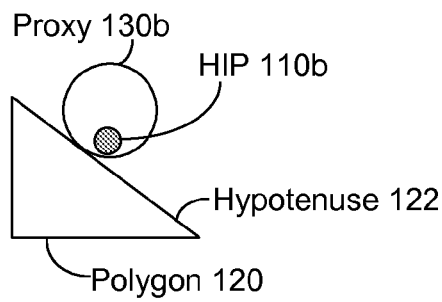
Figure 1C:
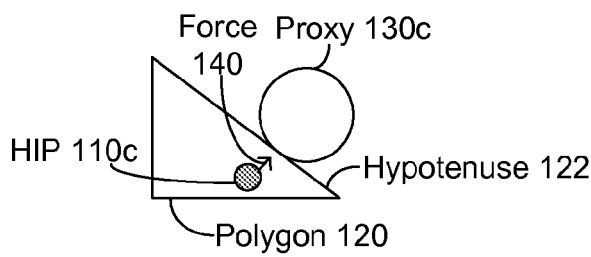

In the context of a circular (for $R^2$) or spherical proxy (for $R^3$) within a point cloud, the proxy can be modified to have multiple radii. Then, using those multiple radii, definitions of the terms free motion, in contact, and entrenched can be updated as disclosed herein to be operable in a virtual environment utilizing point clouds, rather than the virtual environment utilizing polygons discussed above in the context of FIG. 1. Utilizing proxies and HIPs that operate directly on point clouds rather than other formats, such as but not limited to polygons or implicit functions, can save numerous computations per frame. By reducing the number of computations required per frame of RGB+D, a computing device can provide feedback at a haptic rendering rate that exceeds the frame rate, to give an impression of realistically interacting with the virtual environment via touch.

In some embodiments, forbidden regions of a point cloud can be specified. A forbidden region is a region of an area surrounding the point cloud where the proxy is not permitted to enter. Forbidden regions can be used to provide haptic feedback once the HIP enters the forbidden region. For example, let p be a collection of points in a point cloud that define a forbidden region and let $p_r$ be a radius associated with a point $p_i$ of the forbidden region so that a proxy is not permitted to travel within $p_r$ units of $p_i$. Then, by operation of the virtual spring connecting the HIP and the proxy, haptic feedback can be generated once the HIP enters the forbidden region; e.g., comes within $p_r$ units of $p_i$. This haptic feedback can keep the HIP from coming in contact with the point(s) in p.

Along with games, as mentioned above, another example use of haptic feedback is robotic or telerobotic surgery. In telerobotic surgery, a surgeon can be located at one location which can be remote from an operating room that holds the patient. During the operation, the surgeon can view the patient using data provided by a camera in the operating room that provides RGB+D data to a computing device, such as the XBOX® KINECT®. The computing device can receive the RGB+D data, generate a point cloud based on the RGB+D data, and then generate haptic feedback that the surgeon can use to better treat the patient.

Haptic feedback can also be useful in remotely controlling exploration devices operating in hostile, dangerous, and/or unsafe environments. Example exploration devices include undersea and outer space exploration vehicles, explosive location devices, chemical sniffing (e.g., drugs, gas leaks, toxic waste) mechanisms, exploration robots, and/or other exploration devices. For example, using haptic feedback, including haptic feedback in forbidden regions, can provide additional information about an environment under exploration and/or protect the exploration device from entering a known dangerous, already-explored, or otherwise forbidden region.

An Example Computing Network

Figure 2A:
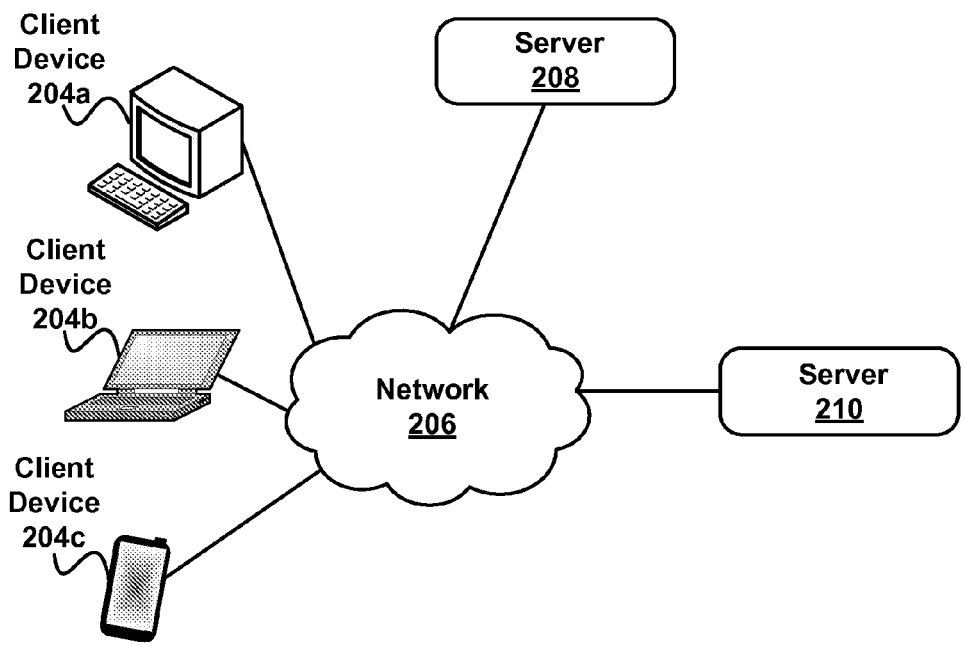
FIG. 2A is a block diagram of a computing environment, in accordance with an example embodiment.

Turning to the figures, FIG. 2A depicts a network 200 in accordance with an example embodiment. In FIG. 2A, servers 208 and 210 are configured to communicate, via a network 206, with client devices 204a, 204b, and 204c. As shown in FIG. 2A, client devices can include a personal computer 204a, a laptop computer 204b, and a smart-phone 204c. More generally, client devices 204a-204c (or any additional client devices) can be any sort of computing device, such as a workstation, network terminal, desktop computer, laptop computer, wireless communication device (e.g., a cell phone or smart phone), and so on.

The network 206 can correspond to a local area network, a wide area network, a corporate intranet, the public Internet, combinations thereof, or any other type of network(s) configured to provide communication between networked computing devices. Servers 208 and 210 can share content and/or provide content to client devices 204a-204c. As shown in FIG. 2A, servers 208 and 210 are not physically at the same location. Alternatively, recipe servers 208 and 210 can be co-located, and/or can be accessible via a network separate from network 206. Although FIG. 2A shows three client devices and two servers, network 206 can service more or fewer than three client devices and/or more or fewer than two servers.

An Example Computing Device

Figure 2B:
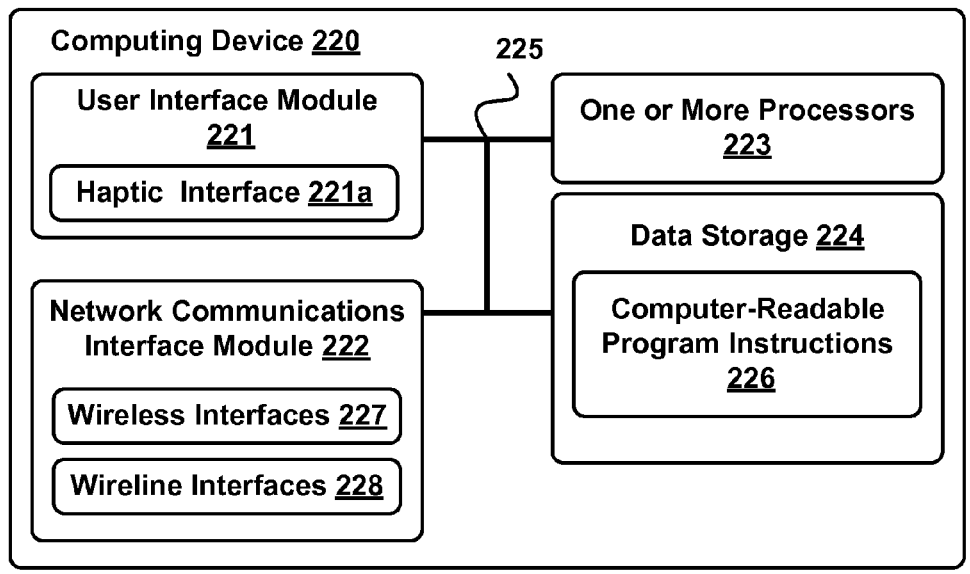
FIG. 2B is a block diagram of an example computing device, in accordance with an example embodiment.

FIG. 2B is a block diagram of an example computing device 220 including user interface module 221, network-communication interface module 222, one or more processors 223, and data storage 224, in accordance with embodiments of the invention.

In particular, computing device 220 shown in FIG. 2A can be configured to perform one or more functions of client devices 204a-204c, network 206, 310, servers 208, 210, and/or computing device 320a, 320b. Computing device 220 may include a user interface module 221, a network-communication interface module 222, one or more processors 223, and data storage 224, all of which may be linked together via a system bus, network, or other connection mechanism 225.

Computing device 220 can be a desktop computer, laptop or notebook computer, personal data assistant (PDA), mobile phone, embedded processor, or any similar device that is equipped with at least one processing unit capable of executing machine-language instructions that implement at least part of the herein-described techniques and methods, including but not limited to method 1400 described in more detail below with respect to FIG. 14.

User interface 221 can receiving input and/or provide output, perhaps to a user. User interface 221 can be configured to send and/or receive data to and/or from user input from input device(s), such as a keyboard, a keypad, a touch screen, a computer mouse, a track ball, a joystick, and/or other similar devices configured to receive user input from a user of the computing device 220. User interface 221 can be configured to provide output to output display devices, such as. one or more cathode ray tubes (CRTs), liquid crystal displays (LCDs), light emitting diodes (LEDs), displays using digital light processing (DLP) technology, printers, light bulbs, and/or other similar devices capable of displaying graphical, textual, and/or numerical information to a user of computing device 220. User interface module 601 can also be configured to generate audible output(s), such as a speaker, speaker jack, audio output port, audio output device, earphones, and/or other similar devices configured to convey sound and/or audible information to a user of computing device 220. As shown in FIG. 2B, user interface can be configured with haptic interface 221a that can receive inputs related to a Haptic Interface Point, a remote device configured to be controlled by haptic interface 221a, and/or other inputs, and provide haptic outputs such as tactile feedback, vibrations, forces, motions, and/or other touch-related outputs.

Network-communication interface module 222 can be configured to send and receive data over wireless interfaces 227 and/or wired interfaces 228 via a network, such as network 206. Wired interface(s) 228, if present, can comprise a wire, cable, fiber-optic link and/or similar physical connection to a data network, such as a wide area network (WAN), a local area network (LAN), one or more public data networks, such as the Internet, one or more private data networks, or any combination of such networks. Wireless interface(s) 227 if present, can utilize an air interface, such as a ZIGBEE®, WI-FI®, and/or WIMAX™ interface to a data network, such as a WAN, a LAN, one or more public data networks (e.g., the Internet), one or more private data networks, or any combination of public and private data networks.

In some embodiments, network-communication interface module 222 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 223 can include one or more central processing units, computer processors, mobile processors, digital signal processors (DSPs), microprocessors, computer chips, and/or other processing units configured to execute machine-language instructions and process data. Processor(s) 223 can be configured to execute computer-readable program instructions 226 that are contained in data storage 224 and/or other instructions as described herein.

Data storage 224 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 224 can include one or more physical and/or non-transitory storage devices with at least enough combined storage capacity to contain computer-readable program instructions 226 and any associated/related data structures.

Computer-readable program instructions 226 and any data structures contained in data storage 226 include computer-readable program instructions executable by processor(s) 223 and any storage required, respectively, to perform at least part of herein-described methods, including but not limited to method 1400 described below with respect to FIG. 14.

Figure 3A:
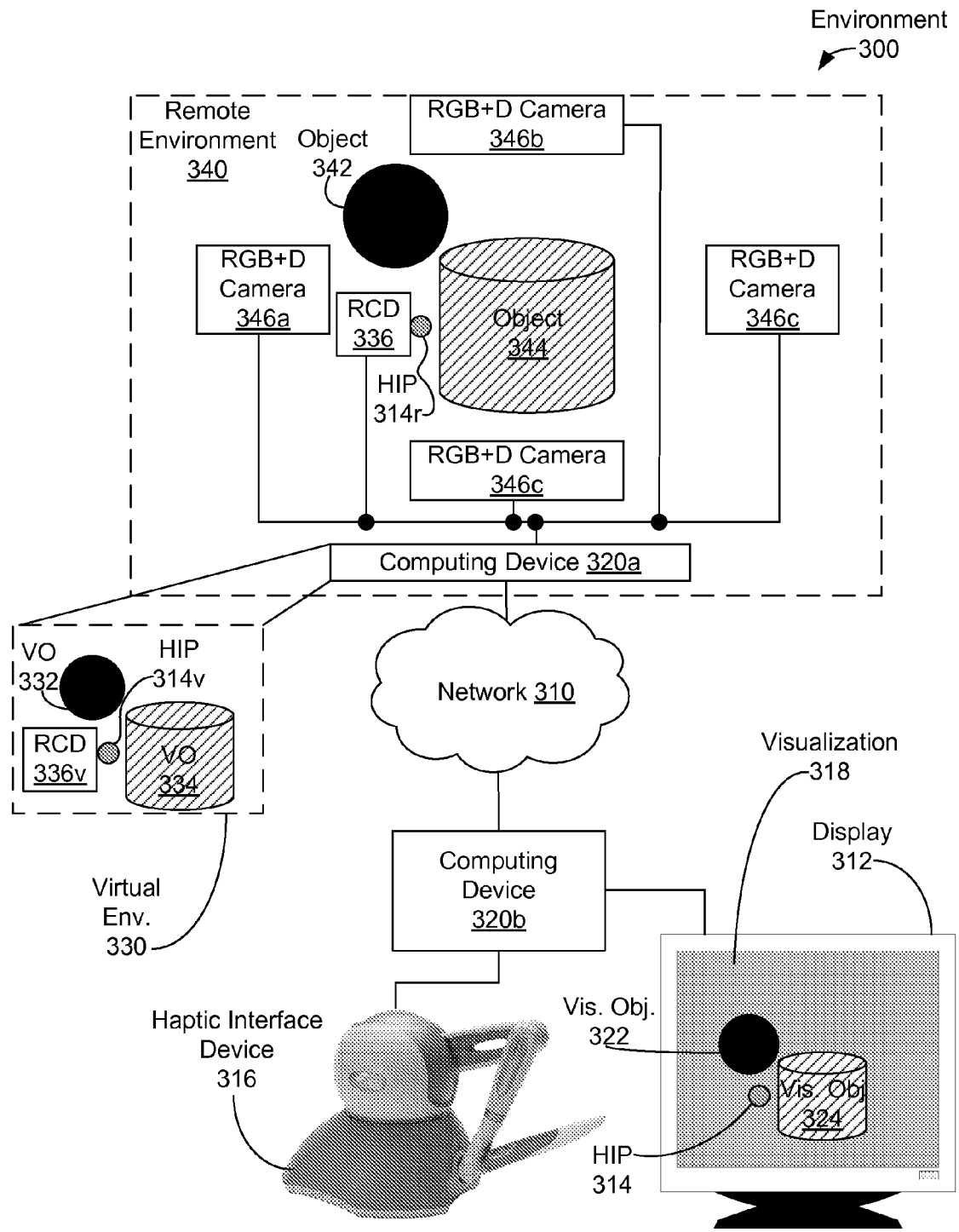
FIG. 3A is a diagram of a haptic rendering environment, in accordance with an example embodiment.

Example Environments and Images FIG. 3A is a diagram of a haptic rendering environment 300, in accordance with an example embodiment. Environment 300 includes computing devices 320a, 320b connected via network 310. Computing device 320a is in remote environment 340 and is additionally connected to remote controlled device (RCD) 336, and red-green-blue-depth (RGB+D) cameras 346a-346d. Computing device 320b is additionally connected to display 312 and haptic feedback device 316.

Computing device 320a can receive image and depth data from RGB+D cameras 346a-346d. In some embodiments, each of RGB+D cameras 346a-346d is configured with an optical camera to capture image data and an infrared camera to capture depth data. In other embodiments, computing device 320a can be connected to more or fewer RGB+D cameras than shown in FIG. 3A, while remaining connected to at least one RGB+D camera.

The image data can be received as a NR×NC matrix of pixels, with each pixel having 24 RGB bits of color component information, including 8 bits of data for each of red, green and blue component colors. The depth data can be received as a NR×NC matrix of depth values, where each depth value has $B_d$ bits. In one example, the KINECT® camera uses NR=640, NC=480, and $B_d$=11, and so produces 640×480 matrices of image data and depth data, where each depth value has 11 bits. The KINECT® camera can simultaneously provide both image and depth data at a frame rate $f_c$ of 30 Hz.

In the example shown in FIG. 3A, each of RGB+D cameras 346a-346d is configured to capture image and depth data of remote controlled device 336 and objects 342, 344. The image and depth data can be sent from each of RGB+D cameras 346a-346d to computing device 320a. Computing device 320a can use received image and depth data to generate virtual environment 330. In order to interpret the depth data, computing device 320a can transform the depth data into a Cartesian coordinate system in three dimensions. For example, let M(u, v)=d be a depth value with value d at row u and column v, with $0 \le u \le (NR-1)$, $0 \le v \le (NC-1)$, and $0 \le d \le 2^{Bd}-1$. Then, each (u, v, d) triple can be converted to a Cartesian coordinate system using the conversion (x' y' z' w)=(u v d 1)*$M_c$ for $$M_c = \begin{pmatrix} 1/f_x & 0 & 0 & 0 \\ 0 & 1/f_y & 0 & 0 \\ 0 & 0 & 0 & a \\ -c_x/f_x & c_y/f_y & -1 & b \end{pmatrix}.$$

In some embodiments, parameters a, b, $c_x$, $c_y$, $f_c$, and $f_y$ used in elements of $M_c$ can be selected so that one unit in the Cartesian coordinate system corresponds to one meter. In these embodiments, parameters a, b, $c_x$ $c_y$, $f_x$ and $f_y$ can be selected as shown in Table 1 below.

TABLE 1

| Parameter | Value |
| --- | --- |
| a | 594.214342 |
| b | 591.040537 |
| $c_x$ | 339.307810 |
| $c_y$ | 242.739138 |
| $f_x$ | −0.003071102 |
| $f_y$ | 3.330949516 |

Then, the (x' y' z' w) vector can be divided by w to get a Cartesian-coordinate vector (x y z 1). Each (x, y, z) point can represent one point in a "point cloud" or collection of points in three-dimensional Cartesian space; e.g., (x, y, z)∈$R^3$.

Figure 3B:
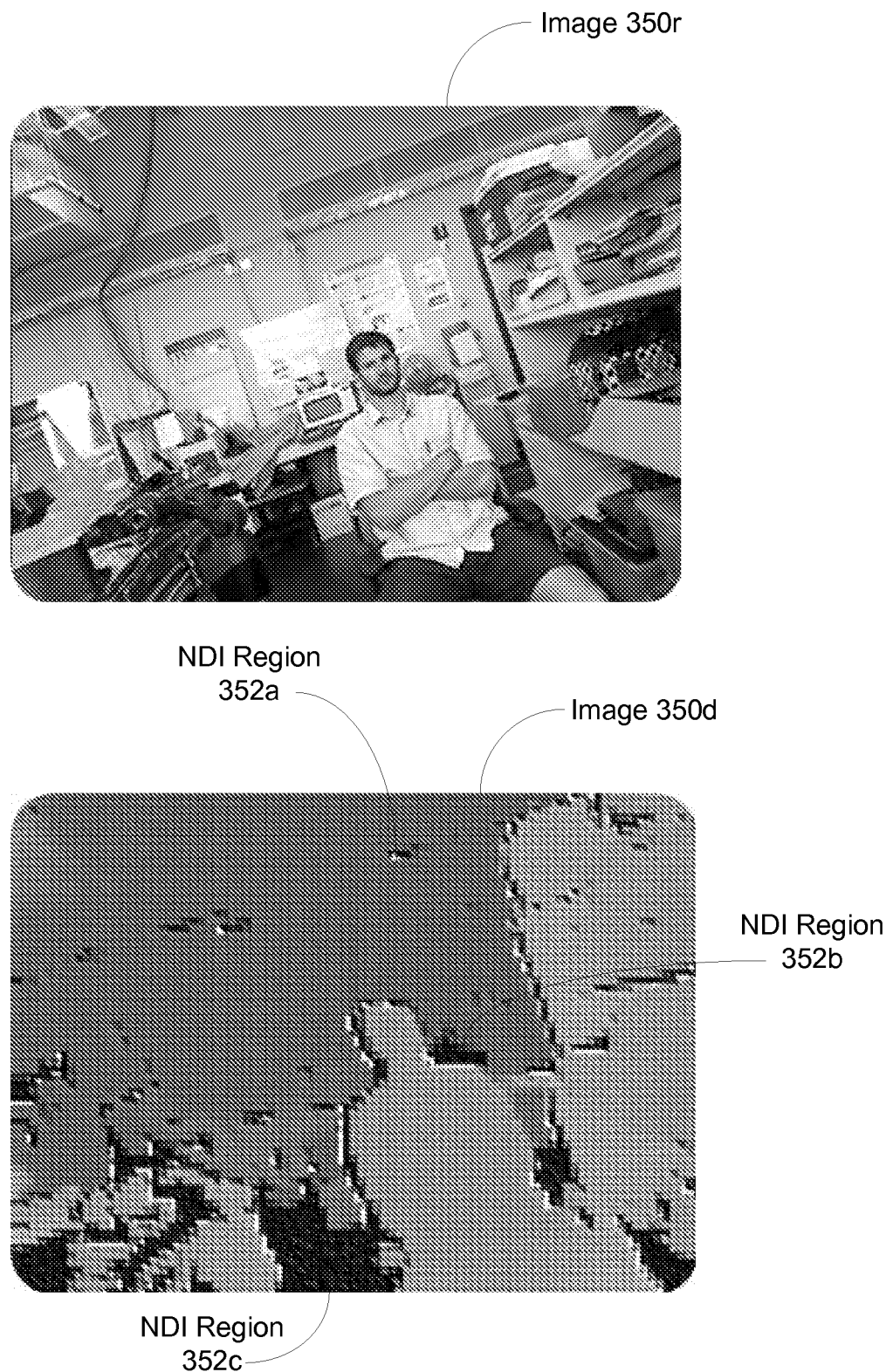
FIG. 3B shows images generated from data received from an RGB+D camera, in accordance with an example embodiment.

The point cloud can be visualized as a "point cloud image" independent of an image represented by the image data. FIG. 3B shows images 350r, 350d generated from a frame of data received from an RGB+D camera, in accordance with an example embodiment. Image 350r is an image generated from the red, green, blue (RGB) image data in the frame and image 350d is an image of the point cloud after conversion of the depth data. Image 350d has various "no depth information" (NDI) regions shown as black spots—three example NDIs regions 352a, 352b, and 352c are identified within 350d in FIG. 3B. The NDI regions 352a, 352b, and 352c represent shadows or other occlusions where the infrared camera was unable to capture depth data used to generate image 350d. Note that images 350r, 350d are illustrations where one pixel in image 350r may not correspond directly to one pixel of RGB data and/or one pixel in image 350d may not correspond to one pixel of depth data.

After generating the point cloud from received depth data, computing device 320a can render virtual environment 330 as RGB and point cloud images and/or as a three dimensional visualization. FIG. 3A shows virtual environment 330 including virtual objects (VOs) 332, 334, a virtual remote controlled device 336v, and a representative HIP 314v.

Computing device 320a and remote environment 340 can be physically distant from computing device 320b. In some scenarios, remote environment 340 can be physically near or in the same environment as an environment around computing device 320b. In particular, of these scenarios not shown in the Figures, one computing device can provide the herein-described functionality of computing devices 320a and 320b.

Computing device 320a can generate force vectors related to HIP 314 and send indications of haptic feedback to computing device 320b. Upon reception of the indications of haptic feedback, computing device 320b can utilize haptic interface device 316 to generate the haptic feedback. Additionally, computing device 320a and/or 320b can generate visualization 318 with visualization objects 322, 324 respectively corresponding to virtual objects 332, 334, and/or objects 342, 344. As also shown in FIG. 3A, visualization 318 can include an indication of HIP 314 which can correspond to HIP 314v in virtual environment 330 and/or HIP 314r in remote environment 340.

Haptic interface device 316 can be a controllable mechanism configured to receive indications of haptic feedback and provide the indicated haptic feedback based on the indications. Example haptic interface devices 316 include, but are not limited to a PHANTOM OMNI® Haptic Device by Sensable of Wilmington, Mass., other haptic devices, other haptic interfaces, haptic gloves, tactile displays, devices configured at least in part to provide haptic feedback such as laptop computers, desktop computers, mobile telephones, haptic suits, and/or other devices.

As haptic interface device 316 is moved, indication(s) of movement of haptic interface device 316 can be generated and sent from computing device 320b, such as to computing device 320a via network 310. Upon reception of the indication(s) of movement, computing device 320a can update a position of HIP 314r and/or HIP 314v. Also or instead, computing device 320a can send control signals to change movement; e.g., change speed, direction, acceleration, stop) by remote controlled device 336. By changing movement of remote controlled device 336, HIP 314r can be moved as well. For example, HIP 314r can represent a position of tool(s), sensor(s), and/or other device(s) on remote controlled device 336, and by moving remote controlled device 336, the tool(s), sensor(s), and/or other device(s) can be moved, thereby moving HIP 314r.

As image and depth data of remote environment 340 are captured, the captured image and depth data can correspond to images and point clouds showing movement of remote controlled device 336 and thus showing movement of HIP 314v. In some embodiments, remote controlled device 336v and/or HIP 314v can be moved within virtual environment 330 based on the indication(s) of movement instead of or as well as based on captured image and depth data.

Example Techniques for Haptic Rendering Using Point Clouds

FIG. 4A is a diagram of proxy 402, in accordance with an example embodiment. Proxy 402 is centered at a proxy center P 404 and has includes three radii $r_1$, $r_2$, and $r_3$. As shown in FIG. 4A, $r_1 > 0$, $r_2 > r_1$, and $r_3 \geq r_2$. In some embodiments, $r_1$, $r_2$, and $r_3$ can each be fixed.

For example, in an environment where point clouds are represented in a Cartesian coordinate system where each point (x, y, z) has coordinates represented in meters, example radii values can be: $r_1 = 0.00499$ meters, $r_2 = 0.00501$ meters, and $r_3 = 0.01$ meters. In this example, the ratio of $r_3$ to $r_2 = 0.01/0.00501 \approx 1.996$. In some embodiments, $r_3$ can be considered to be substantially larger than $r_2$ when the ratio of $r_3$ to $r_2$ exceeds a constant $c_{s1} > 1$. As an example, let $c_{s1} = 1.7$. The, in this example, as the ratio of $r_3$ to $r_2$ is about $1.996 > 1.7 = c_{s1}$, $r_3$ can be considered to be substantially larger than $r_2$.

FIGS. 4B-4D depict a scenario 406 that illustrates a technique of utilizing proxy 402 to control interactions between HIP 410 and a point cloud, such as point cloud 420 in a virtual environment. In scenario 406, HIP 410 starts at the position shown as HIP 410a in FIG. 4B, moves through position HIP 410b shown in FIG. 4C, and ends at position HIP 410c shown in FIG. 4D. In this technique, HIP 410 and proxy 402 are connected by a simulated spring not shown in the Figures.

In FIG. 4B, proxy 402, shown at position 402a, is in free motion; e.g., proxy 402 can be considered as not touching point cloud 430. FIG. 4E shows example free-motion proxy 436a with proxy center 438a. Proxy 436a can be considered as a free motion proxy if all points in a point cloud, such as point cloud 440a, are outside of radius $r_2$ of proxy center 438a, such as shown in FIG. 4E. FIG. 4E also shows that proxy 436a is considered a free-motion proxy even though some points of point cloud 440a are within radius $r_3$ of proxy center 438a, since those points within radius $r_3$ remain outside of radius $r_2$ of proxy center 438a.

In FIG. 4C, proxy 402, shown at position 402b, is in contact with point cloud 420. FIG. 4F shows example in-contact proxy 436b with proxy center 438b. Proxy 436b can be considered as an in-contact proxy if all points in a point cloud, such as point cloud 440b, are outside of radius $r_1$ of the proxy center, but at least one point in the point cloud is within radius $r_2$ of the proxy center. FIG. 4F shows the portion of proxy 436b between radii $r_1$ and $r_2$ as a grey ring, and shows two points of point cloud 440b as completely within the grey ring and four other points of point cloud 440b inside or touching the grey ring, indicating at least one point of point cloud 440b is within radius $r_2$. FIG. 4F also shows the portion of proxy 436b with radius $r_1$ as a white circle that does not include any points of point cloud 440b. Thus, proxy 436b is considered as an in-contact proxy.

In scenario 406, HIP 410 continues to move down from position 110b, but once entrenched, proxy 402 is not permitted to go further into point cloud 420. In FIG. 4D, proxy 402, shown at position 402c, is entrenched in point cloud 420 while HIP 410 has moved to position 410c on the other side of point cloud 420 from proxy 402. FIG. 4G shows example entrenched proxy 436c with proxy center 438c. Proxy 436c can be considered as an entrenched proxy if at least one point in a point cloud is within of radius $r_1$ of the proxy center. FIG. 4G shows point 442 of point cloud 440c within radius $r_1$ of proxy center 438c, and therefore proxy 436c can be considered as an entrenched proxy.

In some embodiments, as the distance increases between HIP 410 and proxy 402, the simulated spring exerts a proportionally larger force to draw HIP 410 closer to proxy 402.

FIG. 4D shows the simulated spring force as force 440 exerted on HIP 410. As shown in FIG. 4D, force 440 is exerted in the direction of a normal of the point cloud entrenching proxy 402.

As mentioned above, in general, the proxy can be (a representation of) a function for selecting zero or more points in the point cloud that are near to the HIP. For an example not shown in the figures, the proxy could be a bounding box in $R^2$ or $R^3$, such as a square proxy $P_{sqr}$ in $R^2$ centered at a proxy center (Psqr$_x$, Psqr$_y$) and side length 2s, where a point $p_i=(x_i, y_i)$ of a point cloud is inside $P_{sqr}$ if $|x_i-Psqr_x| \leq s$, $|y_i-Psqr_y| \leq s$. For a rectangular proxy $P_{rect}$ with proxy center (Prect$_x$, Prect$_y$) the side length 2s of the square proxy can be replaced by two side lengths: a side length in the x-axis of $2s_x$ and a side length in the y-axis of $2s_y$. Then, a point in the point cloud $p_i=(x_i, y_i)$ is inside $P_{rect}$ if $|x_i-Prect_x| \leq s_x$, $|y_i-Prect_y| \leq s_y$.

Bounding squares and rectangles can be nested as well, using multiple side lengths similar to the multiple radii of proxy 402. For example, $P_{sqr}$ in $R^2$ can be centered at a proxy center (Psqr$_x$, Psqr$_y$) and with side lengths $2s_1$, $2s_2$, and $2s_3$, where $s1<s2 \leq s3$. Then, let inside(s, p) be a function taking a side length s and a point p=(x, y). Then inside(s, p) is TRUE when $|x-Psqr_x| \leq s$, and $|y-Psqr_y| \leq s$; otherwise, inside(s, p) is FALSE. Then, using the inside( ) function to define "inside", movement states for $P_{sqr}$ can be defined. For example, $P_{sqr}$ can be in: (1) a free-motion movement state when no points in a point cloud are within s2 of the proxy center (Psqr$_x$, Psqr$_y$), (2) an in-contact movement state when no points in the point cloud are within s1 of the proxy center (Psqr$_x$, Psqr$_y$) and when at least one point in point cloud is within s2 of the proxy center (Psqr$_x$, Psqr$_y$), or (3) an entrenched movement state when at least one point in point cloud is within s1 of the proxy center (Psqr$_x$, Psqr$_y$). One way to determine the movement state for Psqr is to determine a number N1 of points in the point cloud where inside(s1, p) is TRUE for side length s1 and p in the point cloud and a number N2 of points in the point cloud where inside(s2, p) is TRUE for side length s2. Then, if N2 equals 0, then Psqr is in a free-motion movement state; otherwise if N1 equals 0, then Psqr is in an in-contact state (since N2>0 to get to this point); otherwise (N1>0 and N2>0) Psqr is in an entrenched state. Similar definitions of inside( ) can be used for bounding rectangles and for bounding cubes and boxes in $R^3$.

In still other embodiments, a proxy can be defined as a function fprox(p$_i$), which can return TRUE if a point $p_i$ of the point cloud is within the proxy and FALSE if $p_i$ is not within the point cloud. Many other proxies and definitions are possible as well.

Figure 5A:
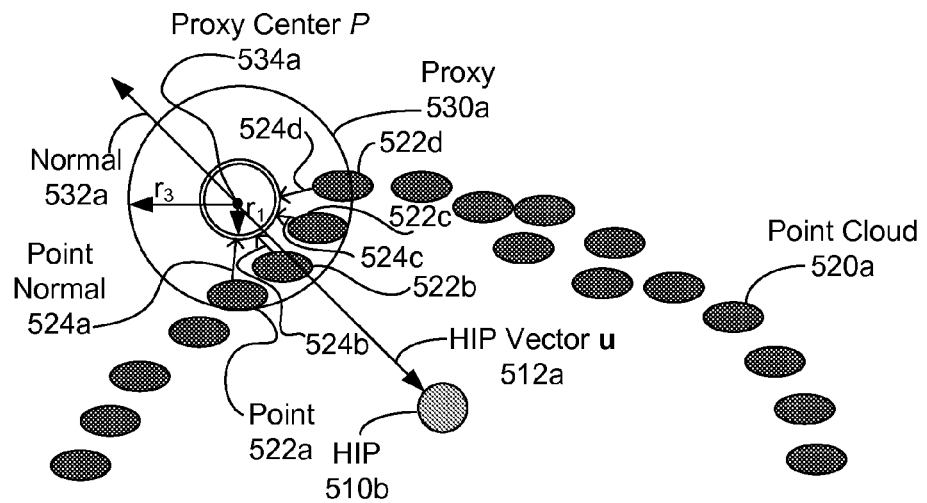
FIGS. 5A and 5B are diagrams showing normal vectors through a proxy on the surface of a point cloud, in accordance with an example embodiment.
Figure 5B:
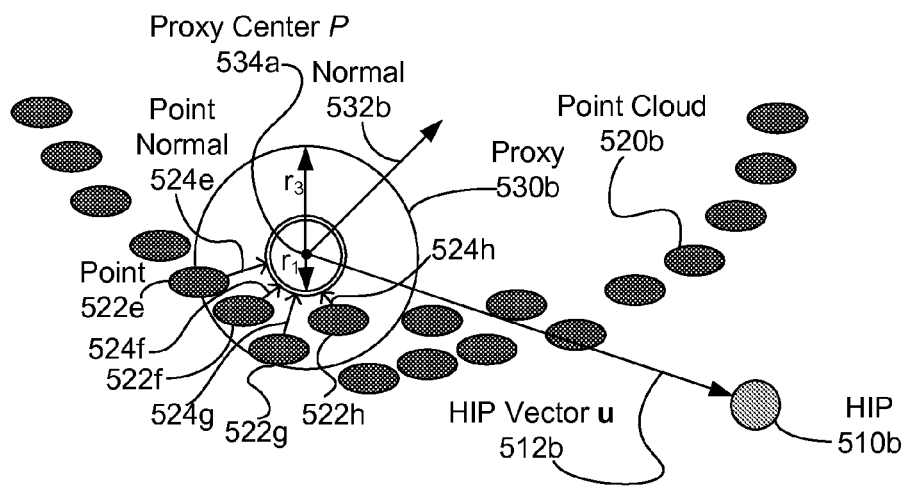

FIGS. 5A and 5B are diagrams each showing normal vectors to a surface of a point cloud through a proxy center, in accordance with an example embodiment. As shown in FIG. 5A, points in point cloud 520a form a rough arc, with proxy 530a on an outside of the arc and HIP 510a on an inside of the arc. Point cloud 520a includes a number of points, including points 522a-522d, where each of points 522a-522d is within radius $r_3$ from proxy center P 534a.

The following technique can be used to calculate an estimated surface normal n of point cloud 520a at proxy center P 534a:

1. Determine all points $x_i$ inside proxy radius $r_3$; i.e., $|P-x_i| \leq r_3$.
2. Let N=the number of points $x_i$. Then, i=1 to N.
3. Let n=P).

One example function $f$ that can be used for determining the normal n is:

$$n = f(x_i, P) = \frac{1}{N} \sum_{i=1}^{N} \frac{P - x_i}{\|P - x_i\|} \qquad (1)$$

Function (1) determines an average of the "point normals" or contribution to n for each point $x_1$, where the point normal for a point $x_i=(P-x_i)/\|P-x_i\|$, for i=1 to N. FIG. 5A shows four points 522a-522d as points $x_i$ and uses arrows for the respective point normals 524a-524d.

Another example function $f_1(x_i, P)$ for determining the normal n is:

$$n = f_1(x_i, P) = \frac{\sum_{i=1}^{N} \frac{P - x_i}{\|P - x_i\|_2} \psi(\|P - x_i\|_2)}{N \sum_{i=1}^{N} \psi(\|P - x_i\|_2)} \qquad (2)$$

where $$\psi(r) = \begin{cases} 1 & \text{if } r \leq r_1 \\ \left(1 - \frac{r - r_1}{r_3 r_1}\right)^4 \left(\frac{4(r - r_1)}{r_3 r_1} + 1\right) & \text{if } r_1 < r < r_3 \\ 0 & \text{if } r \geq r_3 \end{cases}$$

$\Psi(r)$ is an adaptation of the Wendland function that acts as a smooth weighting function that is monotonically decreasing for radius values r between radii $r_1$ and $r_3$. For points within radius $r_1$, $\Psi(r)=1$, and for points outside $r_3$, $\psi(r)=0$. Other functions $f(x_i, P)$ for determining a normal to a point cloud for a proxy and other weighting functions than $\Psi(r)$ are possible as well.

FIG. 5A shows proxy 530a and HIP 510c as being "aligned" or in a state where the normal n to proxy 530a is in the opposite direction of HIP vector u 512a, where u=HIP–P, where HIP is the center of HIP 510c. That is, if both n and u have the same length 1, i.e., n and u are normalized, then n=−u and u=−n. One technique to determine if n and u are aligned is to normalize n=n/$\|n\|_2$ and u=u/$\|u\|_2$. After normalization, take the dot product DP of the normalized vectors; that is, DP=$-u^T \cdot n$. If n and u are aligned, then $\cos^{-1}(DP)=0$. A robust test for alignment can be to determine whether $\cos^{-1}(DP)<\theta_s$ for a small value $\theta_s$, and determine that n and u are aligned when $\cos^{-1}(DP)<\theta_s$. In some cases, such as shown in FIG. 4B, P=HIP, and in this case, n and u have "converged." A robust test for convergence can determine whether |P−HIP| or $\|P-HIP\|_2$ is less than a small value δ. If |P−HIP| (or $\|P-HIP\|_2$) is less than δ, then the proxy with proxy center P can be said to have converged to the haptic interface point whose center is HIP.

FIG. 5B shows that points in point cloud 520b forms an arc, with proxy 530b on an inside of the arc and HIP 510b on an outside of the arc. Point cloud 520b includes a number of points, including points 522e-522h, where each of points 522e-522h are within radius $r_3$ from proxy center P 534b. Using the definitions above used in describing Equations (1) and (2) above, FIG. 5B shows four points 522e-522h as points in $x_i$ and uses arrows for the respective point normals 524e-524h. As shown in FIG. 5B, proxy 530b and HIP 510b have not converged, rather HIP vector 512b and normal 532b are shown in FIG. 5B as being approximate 60° apart.

An example algorithm for haptic rendering shown in Table 3 below, which include 11 "Numbers" or organizational labels to aid description. The main loop of the example algorithm starts at Number 2 with the REPEAT statement, can possibly terminate with the break statement at Number 11, and is intended to execute at least $f_h$ times per second. Each iteration of the main repeat loop can move the proxy by a "step" and/or send an indication of a force. The force indication can be utilized by a haptic interface device, such as haptic interface 221a and/or haptic interface device 316, to provide haptic feedback. The main repeat loop of the haptic rendering algorithm will iterate until the HIP and the proxy are either aligned or have converged to the same point. In some embodiments, after alignment/convergence and subsequent termination, the haptic rendering algorithm can be restarted when the HIP moves and/or when the new point cloud data is received.

TABLE 3

1. Let P = center position of proxy; e.g., proxy center 404 of FIG. 4A.
   N = number of points in point cloud within proxy radius $r_3$,
   $x_i$ = point in point cloud inside proxy radius $r_3$, for i = 1 to N,
   $f_c$ = the frame rate,
   $f_h$ = the haptic rendering rate,
   j = current frame counter, initially 0,
   $v_j$ = velocity estimate of point cloud of frame j, with $v_0$ = 0,
   u = HIP vector from P to HIP = HIP − P, and
   $n_0$ = previous surface normal
   $t_j$ = reception time for current frame, initially set to current_time( )
   $u_1, u_0$ = velocity adjusted HIP vectors, both initially 0.
   $k_s$ = spring constant (see FIG. 6E).
   $k_d$ = damping force constant (see FIG. 6E).
   $\theta_s$ = small predefined angle for convergence calculation, $\theta_s > 0$
   $\delta$ = small predefined distance for convergence calculation, $\delta > 0$
   VEL_EST = a Boolean set to TRUE if velocity estimation for point clouds is to be used, and set to FALSE if velocity estimation is unused
2. REPEAT
   Estimate new surface normal $n_1$ // use Function (2) to estimate surface normal $$n_1 = \frac{\sum_{i=1}^{N} \frac{P - x_i}{\|P - x_i\|_2} \psi(\|P - x_i\|_2)}{N \sum_{i=1}^{N} \psi(\|P - x_i\|_2)}$$

where $$\psi(r) = \begin{cases} 1 & \text{if } r \leq r_1 \\ \left(1 - \frac{r - r_1}{r_3 - r_1}\right)^4 \left(\frac{4(r - r_1)}{r_3 - r_1} + 1\right) & \text{if } r_1 < r < r_3 \\ 0 & \text{if } r \geq r_3 \end{cases}$$

3. if (new point cloud data received) // assume point cloud is in Cartesian coordinates
   j = j + 1
   $t_j$ = current_time( )

$P = P + s_j$, where $s_j = \frac{1}{f_c} v_j n_0$, and where $v_j = \max(0, v_{j-1} + n_0 s_k f_c)$ TABLE 3-continued end if
4. Let S = proxy movement state; e.g., either free-motion, in-contact, or entrenched
5. if (S == free-motion) // See FIG. 6A
   Let M = number of points that could constrain proxy movement toward HIP.
   Let $x_i$ = point that could constrain proxy movement toward HIP, for i = 1 to M.
   Let D = distance between P and HIP
   Let current step size $d_k$ = D + 1
   for (i = 1 to M) // for each point that could constrain movement Solve $r_2 - \left\|x_i - P - d_i \frac{u}{\|u\|_2}\right\| = 0$ for $d_i$ if ($d_i < d_k$) then // find minimum distance to move as $d_k$
      $d_k = d_i$
   end if
   end for
   if ($d_k > D$) then // if step size is too large, reset to reasonable value
      $d_k = \|u\|_2$
   end if
   // set free-motion step size based on $d_k$ $s_k = d_k \frac{u}{\|u\|_2}$ end if
6. else if (S == entrenched) // See FIG. 6B
   Let M = number of points that entrench proxy (e.g., are within radius $r_1$ of P).
   Let $x_i$ = point that entrenches proxy, for i = 1 to M.
   Let current step size $d_k$ = −1
   for (i = 1 to M) // for each point that entrenches proxy
      Solve $r_1 - \|x_i - P - d_i n_1\|_2 = 0$, for $d_i$
      if ($d_i > d_k$) then // find maximum distance to move proxy out of trench as $d_k$
         $d_k = d_i$
      end if
   end for
   if ($d_k > 0$) then // don't permit negative motion
      $d_k = 0$
   end if
   // set entrenched step size based on $d_k$
   $s_k = d_k n_1$
   end else if
7. else // S == in-contact
   Determine estimated surface of point cloud; e.g., plane that contains $u_p$ = vector perpendicular to $n_1$.
   Determine whether HIP is inside or outside estimated surface.
   If (HIP is inside estimated surface) then // See FIG. 6C
      Let $u_{k,p}$ = projection of u onto $u_p$; e.g., $u_{k,p} = u - u \cdot n_1$
      Let $d_k = \gamma \|u_{k,p}\|_2$, where $\gamma$ = scaling factor with $\gamma \leq 1$.

Figure 6E:
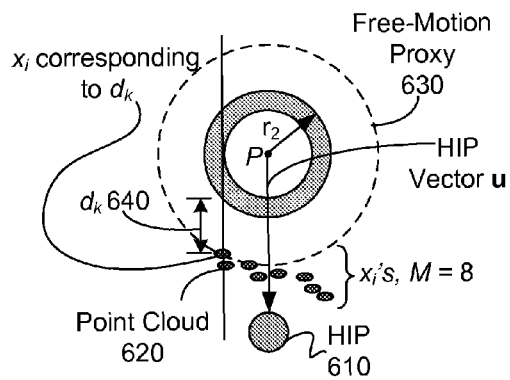
FIG. 6E is a diagram illustrating application of force on a HIP inside of a surface defined by a point cloud that is in contact with a proxy, in accordance with an example embodiment.
Figure 6E:
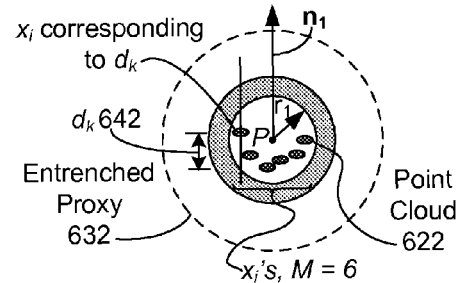
Figure 6E:
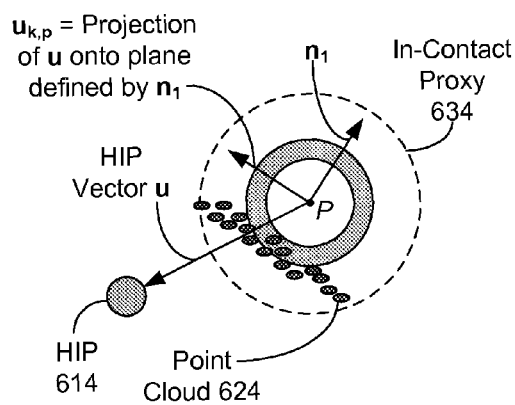
Figure 6E:
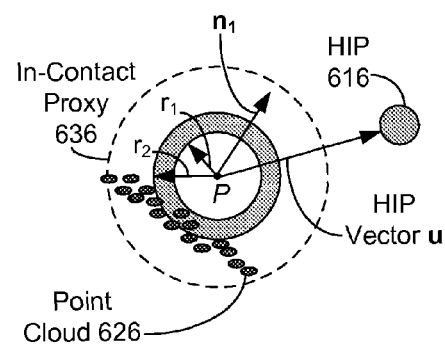
Figure 6E:
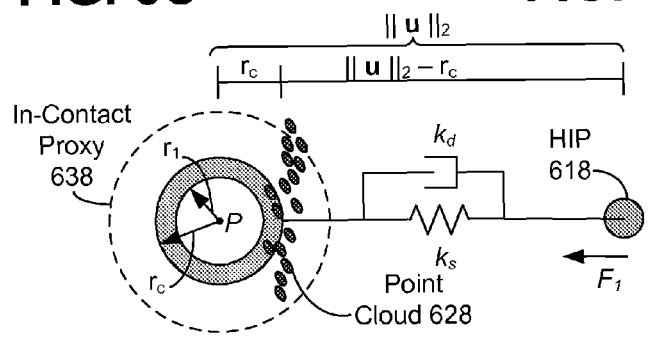

$s_k = d_k \frac{u_{k,p}}{\|u_{k,p}\|_2}$ end if
   else // See FIG. 6D—S is in-contact && HIP is outside estimated surface
      $s_k = (r_2 - r_1) n_1$
   end else
   end else
8. Move proxy center and update old normal
   $P = P + s_k$
   $n_0 = n_1$
9. Update u
   u = HIP − P
10. Apply force if P is in contact and distance between proxy and HIP is large enough
    // See FIG. 6E
    Let S = proxy movement state; e.g., either free-motion, in-contact, or entrenched
    if ((S == in-contact) AND ($\|u\|_2 > r_2$))
       Let t = current_time( ) − $t_j$ TABLE 3-continued

```
        Let u_0 = u // keep old u_1 value
        Let u_1 = u // u_1 is u adjusted for velocity estimate.
        if (VEL_EST == TRUE) // if velocity estimation is to be used
            Let u_1 = u_1 + t * v_j // update u_1 to account for movement of
            point cloud
        end if
        // else don't update u_1 -> just reuse u as u_1
```

$$\text{Let } F_1 = \frac{u_1}{\|u_1\|_2}[k_s(\|u_1\|_2 - r_c) - k_d f_h(\|u_1\|_2 - \|u_0\|_2)]$$

```
        Send indication of F_1 for providing haptic feedback
        end if
11.  After moving proxy, see if proxy and HIP have converged.
```

$$\text{Let } A = \cos^{-1}\left(\frac{-u^T n}{\|u\|_2}\right).$$

```
    if (((S == in-contact) AND (A < θ_s)) // alignment
    OR ((S == free-motion) AND (|P − HIP| < δ)) then // convergence
        break; // out of repeat loop started at number 2.
    end if
    // else not converged, so repeat
    end REPEAT
```

In the example haptic rendering algorithm shown in Table 3, the procedures of Number 1 define a number of variables for use in the remainder of the algorithm. Number 2 performs two functions. The first function of Number 2 is to be the return point for the main repeat loop for the example haptic rendering algorithm. The second function of Number 2 is to determine a new estimated normal $n_1$ utilizing the techniques and Equation (2) discussed above in the context of FIGS. 5A and 5B.

At Number 3, a determination is made whether new point cloud data is received. For example, with the KINECT®, new point cloud data is received at a frame rate $f_c$ of 30 Hz or 30 frames per second. As part of or before receiving the new point cloud data, it is assumed that the point cloud data has been converted to Cartesian coordinates (x, y, z) using the techniques discussed above in the context of FIGS. 3A and 3B. In some embodiments, the haptic rendering rate $f_h$, or rate of proxy movement, is greater than the frame rate $f_c$. In particular embodiments, the haptic rendering rate $f_h$ is greater than or equal to 1000 Hz. In other embodiments, haptic rendering rate $f_h$ is based on the execution time of an implementation of one iteration of the main repeat loop shown of Table 3 above.

If new point cloud data is received, a frame counter j is updated, a reception time $t_j$ is set to the current time, and the proxy is moved according to the formula $P=P+s_j$, where P is the proxy center, and $s_j$ is a step along an estimated normal $n_0$ of the previous point cloud. Specifically, Table 3 shows $s_j=1/f_c * v_j * n_0$, where $v_j$ is a velocity estimate of the point cloud for frame j, and is determined as the maximum of either (a) 0 or (b) $v_{j-1}+n_0*sk*f_c$, with $v_{j-1}$=velocity estimate of the point cloud for frame j−1 and $s_k$=the step size for the last movement of the proxy prior to point cloud reception.

At Number 4, a proxy movement state S is determined as being in a free-motion state, an in-contact state, or an entrenched state. S can be determined using the techniques discussed above in the context of FIGS. 4A-4G.

Table 3.5 below reproduces Number 5, which is the portion of the haptic rendering algorithm of Table 3 above concerning movement of free motion proxies during a haptic rendering cycle.

TABLE 3.5

```
5.  if (S == free-motion) // See FIG. 6A
        Let M = number of points that could constrain proxy move-
    ment
        toward HIP.
        Let x_i = point that could constrain proxy movement toward
    HIP,
        for i = 1 to M.
        Let ||u||_2 = the length of HIP vector u = the distance between P
        and HIP
        Let current step size d_k = ||u||_2 + 1
        for (i = 1 to M) // for each point that could constrain move-
    ment
```

$$\text{Solve } r_2 - \left\|x_i - P - d_i \frac{u}{\|u\|_2}\right\| = 0 \text{ for } d_i$$

```
            if (d_i < d_k) then // find minimum distance to move as d_k
                d_k = d_i
            end if
        end for
        if (d_k > |u|_2) then // if step size too long, reset to reasonable
    value
            d_k = ||u||_2
        end if
        // set free-motion step size based on d_k
```

$$s_k = d_k \frac{u}{\|u\|_2}$$

```
    end if
```

While performing the "Solve" portion of Number 5 shown in Table 3.5, the haptic rendering algorithm determines a distance $d_i$ between P and a point $x_i$ before $x_i$ constrains motion of a free-motion proxy toward a HIP in the direction of HIP vector u. The for loop of Number 5 is used to determine a minimum distance $d_k$ over all $d_i$ values. After completing the for loop of Number 5, the minimum distance $d_k$ is compared to $\|u\|_2$, which is a distance between proxy center P and HIP. If the minimum distance $d_k$ exceeds the distance between proxy center P and HIP, then $d_k$ is set to the distance between proxy center P and HIP. Once calculated, $d_k$ is multiplied by a normalized HIP vector $u/\|u\|_2$ to determine a step $s_k$ toward the HIP.

FIG. 6A is a vector diagram for example free-motion proxy 630, in accordance with an example embodiment. As shown in the example of FIG. 6A, points $x_i$, i=1 to M, M=8 could constrain movement of free-motion proxy 630 toward HIP 610 in the direction of HIP vector u. In this example, a leftmost $x_i$ point of the eight $x_i$ points shown in FIG. 6A corresponds to a minimum distance $d_k$ 640 that free-motion proxy 630 can travel in the direction of u toward HIP 610 before any of the eight $x_i$ points could impede progress of free-motion proxy 630 toward HIP 610; i.e., after moving free-motion proxy 630 for the step $s_k$ along HIP vector u, the leftmost $x_i$ point could be within radius $r_2$ of P.

Table 3.6 below reproduces Number 6, which the portion of the haptic rendering algorithm of Table 3 above concerning movement of entrenched motion proxies during a haptic rendering cycle.

TABLE 3.6

```
6.  else if (S == entrenched) // See FIG. 6B
        Let M= number of points that entrench proxy (e.g., are within radius
        r_1 of P).
        Let x_i = point that entrenches proxy, for i = 1 to N.
        Let current step size d_k = −1
        for (i = 1 to M) // for each point that entrenches proxy
            Solve r_1 − ||x_i − P − d_i n_1||_2 = 0, for d_i
            if (d_i > d_k) then // find maximum distance to move proxy out of
```

TABLE 3.6-continued

```
                    trench as d_k
                        d_k = d_i
                    end if
                end for
                if (d_k > 0) then // don't permit negative motion
                    d_k = 0
                end if
                // set entrenched step size based on d_k
                s_k = d_k n_1
        end else if
```

While performing the "Solve" portion of Number 6 shown in Table 3.6, the haptic rendering algorithm determines a distance $d_i$ between P and a point $x_i$ along normal $n_1$ such that $x_i$ is at least radius $r_1$ units distant from P if P moves at least $d_i$ units along normal $n_1$, where $x_i$ a point selected from points in the point cloud that entrench the proxy. Recall that a point p entrenches a proxy if p is within $r_1$ of the proxy center P. The for loop of Number 6 is used to determine a maximum distance $d_k$ over all $d_i$ values. After completing the for loop, the maximum distance $d_k$ is compared to 0 and perhaps set to 0 to ensure $d_k$ is non-negative. Once calculated, $d_k$ is multiplied by the normal $n_1$ to determine a step $s_k$ along normal $n_1$, and thus a step away from the point cloud including the points $x_i$ for i=1 to M.

FIG. 6B is a vector diagram for an example entrenched proxy 632, in accordance with an example embodiment. As shown in the example of FIG. 6B, points $x_i$, i=1 to M, M=6 entrench entrenched proxy 632. In this example, a leftmost $x_i$ point of the six $x_i$ points shown in FIG. 6B corresponds to a maximum distance $d_k$ 642 that entrenched proxy 632 is to travel in the direction of the normal $n_1$ before entrenched proxy 632 is no longer entrenched, i.e., after moving entrenched proxy 632 for the step $s_k$ along $n_1$, none of the $x_i$ points will be within radius $r_1$ of P and thus the $x_i$ points will no longer entrench proxy 632.

Table 3.7 below reproduces Number 7, which is the portion of the haptic rendering algorithm of Table 3 above concerning movement of in-contact proxies during a haptic rendering cycle.

TABLE 3.7

```
7.    else // S == in-contact
          Determine estimated surface of point cloud; e.g., plane that
          contains u_p = vector perpendicular to n_1.
          Determine whether HIP is inside or outside estimated sur-
          face.
              If (HIP is inside estimated surface) then // See FIG. 6C
                  Let u_{k,p} = projection of u onto u_p; e.g., u_{k,p} = u − u · n_1
                  Let d_k = γ ||u_{k,p}||_2, where γ = scaling factor with γ ≤ 1.
```

$$s_k = d_k \frac{u_{k,p}}{\|u_{k,p}\|_2}$$

```
              end if
              else // See FIG. 6D—S is in-contact && HIP is outside
              estimated surface
                  s_k = (r_2 − r_1)n_1
              end else
          end else
```

Number 7 begins with determining an estimated surface of the point cloud. One technique to determine the estimated surface is to determine a vector $u_p$ that is perpendicular to estimated normal $n_1$. For example, let $n_1=(x\ y\ z)$, let perpendicular vector $u_p=(x_u\ y_u\ z_u)$, with $x_u=-y$, $y_u=x$, and $z_u=0$. Note that two vectors u and v are perpendicular when a dot product u·v=0. Then, $n_1 \cdot (u_p)^T=(x\ y\ z)\cdot(x_u\ y_u\ z_u)=(x\ y\ z)\cdot(-y\ x\ 0)=-xy+xy+0=0$, and thus $n_1$ is perpendicular to $u_p$. Other techniques for determining a perpendicular vector can be used instead or as well. The estimated surface can then be a plane that contains $u_p$.

Then, a determination is made whether the HIP is inside or outside of the estimated surface. If HIP is inside the estimated surface, a projection $u_{k,p}$ of HIP vector u is generated. For an example calculation of $u_{k,p}$, $u_{k,p}=u-u\cdot n_1$, where "·" is the dot product operator. A step amount $d_k=\gamma\|u_{k,p}\|_2$ is determined, where γ is a scaling factor with 0<γ≤1. Then a step $s_k$ in the direction of projection $u_{k,p}$ determined as $d_k\ u_{k,p}/\|u_{k,p}\|_2$, or as $u_{k,p}/\|u_{k,p}\|_2$ is a unit (normalized) vector, the step $s_k$ is a movement of the proxy $d_k$ units in the direction $u_{k,p}$. FIG. 6C is a diagram illustrating example in-contact proxy 634 with HIP 614 inside of an estimated surface of point cloud 624, in accordance with an example embodiment.

Number 7 continues with an else statement, e.g., a determination is made that the HIP is outside the estimated surface within the body of the else statement. In this case, the proxy is moved in the direction of estimated normal $n_1$. Recall that the proxy is in an in-contact movement stated when (a) no points in the point cloud are within radius $r_1$ of proxy center P and (b) at least one point of the point cloud is within radius $r_2$ of proxy center P. By moving the proxy in the direction of the estimated normal $n_1$, the proxy is being moved away from the estimated surface of the point cloud. Further, by moving the proxy a distance $r_2-r_1$ in the direction of estimated normal $n_1$, no points of the point cloud should be within radius $r_2$ of the proxy center P after the proxy is moved. Therefore, when the proxy is in-contact and the HIP is outside the estimated surface, the step $s_k$ is a movement of the proxy $(r_2-r_1)$ units in the direction $n_1$. FIG. 6D is a vector a diagram illustrating example in-contact proxy 636 with HIP 616 inside of an estimated surface of point cloud 626, in accordance with an example embodiment.

Number 8 of the example rendering algorithm moves the proxy center P according to step $s_k$; that is $P=P+s_k$. The previous estimated normal vector $n_0$ is set to the current normal vector n1 in preparation for another iteration of the main repeat loop. Number 9 of the example rendering algorithm updates the HIP vector u by subtracting the HIP center position HIP from the (new) proxy center P; that is u=HIP−P.

Table 3.10 below reproduces Number 10, which is the portion of the haptic rendering algorithm of Table 3 above concerning generation of force indications during a haptic rendering cycle.

TABLE 3.10

```
10.   Apply force if P is in contact and distance between proxy and
      HIP
      is large enough
      // See FIG. 6E
      Let S = proxy movement state; e.g., either free-motion, in-con-
      tact,
      or entrenched
          if ((S == in-contact) AND (||u||_2 > r_2))
              Let t = current_time( ) − t_j
              Let u_0 = u // keep old u_1 value
              Let u_1 = u // u_1 is u adjusted for velocity estimate.
              if (VEL_EST == TRUE) // if velocity estimation is to be used
                  Let u_1 = u_1 + t * v_j // update u_1 to account for movement of
                  point cloud
              end if
              // else don't update u_1 -> just reuse u as u_1
```

TABLE 3.10-continued

Let $F_1 = \frac{u_1}{\|u_1\|_2}[k_s(\|u_1\|_2 - r_c) - k_d f_h(\|u_1\|_2 - \|u_0\|_2)]$ Send indication of $F_1$ for providing haptic feedback
end if The procedures of Number 10 simulate application of a force from a spring when the proxy is in contact with a surface, represented by the point cloud. In some embodiments, the spring can have a resting length of $r_2$, a spring constant of $k_s$, and a damping constant of $k_d$.

Table 3.10 shows that the procedures of Number 10 start by recalculating the proxy movement state S is recalculated, as the proxy was moved at Number 8. If S is an in-contact movement state and a length $\|u\|_2$ of HIP vector u is greater than radius $r_2$, a force indication can be sent; otherwise, the procedures of Number 10 are terminated.

FIG. 6E is a diagram illustrating application of force $F_1$ on HIP 618 inside of a surface defined by a point cloud 628 that is in contact with proxy 638, in accordance with an example embodiment. To determine the force $F_1$ of the simulated spring, first a time difference t between a current time current_time( ) and the time the last point cloud was received $t_j$ is determined. A copy of velocity-adjusted HIP vector $u_1$ is saved as $u_0$ and then $u_1$ is initialized to be u, the HIP vector. Then, a test of the VEL_EST boolean is made—if VEL_EST is TRUE, then velocity estimation of the point cloud is to be used, and so $u_1$ is updated to add a movement represented by the velocity of point cloud $v_i$ times the time difference t. However, if VEL_EST is FALSE, then velocity estimation of the point cloud is not to be used, and so $u_1$ remains as u. The force $F_1$ can then be determined as a normalized velocity-adjusted HIP vector $u_1/\|u_1\|_2$ scaled by a value $k_s(\|u_1\|_2-r_2)-k_d f_h (\|u_1\|_2-\|u_0\|_2)$, where $k_s(\|u_1\|_2-r_2)$ represents the force exerted by the simulated spring as if the simulated spring were pulled a distance of $(\|u_1\|_2-r_2)$ to the center of the HIP, less a damping force to adjust for movement of the point cloud during the haptic rendering cycle represented by the $k_d f_h(\|u_1\|_2-\|u_0\|_2)$ term of the $F_1$ equation.

Other techniques for calculating the force $F_1$ are possible as well. For example, force $F_1$ could represent drag of a viscous fluid. In this example $F_1=f_v$(proxy velocity), where $f_v$ is a function that returns a drag value based on a proxy velocity Vp; e.g., during one rendering step of duration $f_h$, where the proxy center P is updated at Number 8 from P to $P+s_k$; then $Vp=[(P+s_k)-P]/fh=s_k/f_h$. Then, $F_1=f_v(Vp)=f_v(s_k/f_h)$.

Another technique can involve motion scaling, which can involve converting large motions of a haptic interface device to small motions in the virtual environment and/or remote environment and/or by removing movements suggestive of trembling, perhaps by scaling down HIP motion. In this environment, let HIP_positions=the set of all HIP positions={HIP, all previous HIP positions}, Proxy_positions=the set of all proxy center values={P, all previous P values}. Then, let $F_1=f_H$(HIP_positions, Proxy_positions), where $f_H$ returns a force value, perhaps based on one or more HIP positions in HIP_positions and/or one or more proxy center values in Proxy_positions. Many other techniques are possible as well.

After determining the force $F_1$, an indication of the force $F_1$ can be sent and/or used to apply haptic feedback. For example, suppose the haptic rendering algorithm were executed on computing device 320a of FIG. 3A, a generated force indication can be sent to computing device 320b of FIG. 3A. Then, computing device 320b can instruct haptic interface device(s) such as haptic interface device 316, to provide haptic feedback based on the force $F_1$ indicated in the received force indication. As another example, suppose the haptic rendering algorithm were executed on computing device 320b, which can directly instruct haptic interface device(s) to provide haptic feedback based on the force $F_1$. Other scenarios are possible as well.

At Number 11, a determination is made as to whether (a) the proxy is in an in-contact state and the HIP and proxy are aligned or (b) the proxy is in a free-motion state and if the proxy center P is within a small distance δ of the HIP center HIP. If (a) is true, the proxy and the HIP are aligned, and if (b) is true, the proxy and the HIP have converged. If the proxy and the HIP have either aligned or converged, the haptic rendering cycle is complete, and the main repeat loop can be terminated. However, if the proxy and the HIP have neither aligned nor converged, another iteration of the main repeat loop starting at Number 2 is performed.

Note that the haptic rendering algorithm can be called when either the HIP moves or the point cloud is updated. For example, example pseudo code that utilizes the haptic rendering algorithm is shown in Table 4 below:

TABLE 4

1. Let HIP0 = old HIP center position
   HIP1 = current HIP center position
   m = a message or other indication that a new frame/point cloud is available.
2. // initializations
   HIP0 = get_HIP_center( );
   HIP1 = HIP0;
   m = no message
3. while ((m == no message) and (HIP0 == HIP1))
   do
       m = receive_message( ); // see if we have new frame/ point cloud
       HIP1 = get_HIP_center( ); // see if HIP moved
       // if ((m indicates new frame available) or (HIP has moved))
       if ((m is not equal to no message) or (HIP0 is not equal to HIP1))
       then
           execute haptic rendering algorithm of Table 3;
           m = no message; // reset m for next iteration of while loop
           HIP0 = HIP1; // let old HIP center = current HIP center
       end if // of if ((m indicates new frame available) or (HIP has moved))
   end while // for while for #3

Other examples of code for the haptic rendering algorithm and code for utilizing the haptic rendering algorithm are possible as well.

Example Technique for Generating and Enforcing Forbidden Regions

FIG. 7A depicts point cloud 710 with forbidden region 714, in accordance with an example embodiment. Forbidden region 714 is a region of point cloud 710 and surrounding space where a proxy is prohibited from entry. FIG. 7A shows point cloud 710 including points 712a-712i. Of points 712a-712i, points 712d-712f are selected to form forbidden region 714.

A forbidden region can be generated by selecting points, planes, regions of space, and/or objects in a virtual environment to define the forbidden region. For each forbidden-region point $p_i$ in the point cloud that is completely within the forbidden region, a forbidden-region radius $r_{f,i}$ and a forbidden-region stiffness $k_{s,i}$ can be determined. FIG. 7A shows a two dimensional forbidden region feature defined by forbidden-region points 712d-712f and where $r_{f,1}=r_{f,2}=r_f$ 3. During haptic rendering of point cloud 712, a proxy will be prohibited from entering forbidden region 714.

During haptic rendering, the forbidden regions can be considered to be defined by forbidden-region spheres, each forbidden-region sphere defined by a forbidden-region point $p_i$ and related forbidden-region radius $r_{f,i}$. Then, the proxy can be constrained to only move on the surface of or away from the forbidden-region spheres.

FIG. 7B depicts proxy 720, in accordance with an example embodiment. Proxy 720 has a proxy center P 722 with four radii: $r_1$, $r_2$, $r_3$, and $r_c$. For proxy 720, radii $r_1$, $r_2$, and $r_3$ are as defined as for proxy 402 of FIG. 4A. $r_c$ is defined to be in the middle of $r_1$ and $r_2$; that is $r_c = \frac{1}{2}(r_1 + r_2)$. Proxy 720 is also defined to have contact point 724, which is any point in the middle of $r_1$ and $r_2$; e.g., a ring of radius $r_c$ centered at proxy center P 722. Contact point 724 is shown in FIG. 7B as a dotted-line ring at radius $r_c$ inside the grey ring covering the region between a circle of radius $r_1$ and a circle of radius $r_2$.

The definitions of movement states can be modified to account for forbidden regions. The proxy can be considered to be in a free-motion state with respect to one or more forbidden regions if the proxy is not on the boundary or inside of any of the one or more forbidden regions. The proxy can be considered to be in an in-contact state with respect to one or more forbidden regions if a portion of one or more of the forbidden region(s) is within radius $r_2$ of proxy center P and no part of one or more the forbidden region(s) is within radius $r_1$ of P. The proxy can be considered to be in an entrenched state with respect to one or more forbidden regions if a portion of one or more of the forbidden region(s) is within radius $r_1$ of P.

A normal vector estimate for each forbidden-region sphere can be determined. Then, for each normal vector estimate, a forbidden-region-boundary plane touching the surface forbidden-region sphere based on the normal vector estimate can be determined. To enforce the constraint that the proxy can only move on the surface of or away from the forbidden-region spheres, the proxy can be constrained to only move on or away from the forbidden-region-boundary plane.

If the proxy becomes entrenched in a forbidden region, then the proxy can be considered to be in an intermediate state and not used for haptic rendering. During the operation of the haptic rendering algorithm discussed above in the context of Table 3, the proxy should be in the intermediate state for at most one haptic rendering cycle as the proxy should be moved out of entrenchment. The stiffness of the remaining constraints can be calculated as a weighted average.

To modify the rendering algorithm discussed above in the context of Table 3, perform the following modifications to Numbers 2, 5, and 6 discussed below while using the definitions of the movement states that account for forbidden region(s) discussed just above.

Specifically, modify Number 2 to add the following procedures: 1. Let $p_i$, i=1 to NF, be the set of points in the point cloud that satisfy Equation (3) below:

$$\|P - p_i\|_2 - r_{f,i} = r_{n,i} \leq r_3 \qquad (3)$$

By using Equation (3), the selected $p_i$'s include all forbidden-region points whose constraints are active and some additional points to yield a smoother normal value estimate. If $p_i$ equals the empty set, then no points in the point cloud satisfy Equation (3), and set NF=0.

2. Determine the estimated surface normal $n_1$ using Equation (4) below, which is a modified version of the estimated surface normal Equation (2) that utilizes the $p_i$ values calculated using Equation (3):

$$n_1 = \frac{\sum_{i=1}^{NF} \frac{P - p_i}{\|P - p_i\|_2} \psi(r_{n,i})}{NF \sum_{i=1}^{NF} \psi(r_{n,i})} \qquad (4)$$

where $$\psi(r_{n,i}) = \begin{cases} 1 & \text{if } r_{n,i} \leq r_1 \\ \left(1 - \frac{r_{n,i} - r_1}{r_3 - r_1}\right)^4 \left(\frac{4(r_{n,i} - r_1)}{r_3 - r_1} + 1\right) & \text{if } r_1 < r_{n,i} < r_3 \\ 0 & \text{if } r_{n,i} \geq r_3 \end{cases}$$

3. The weighted virtual fixture stiffness $k_s$ can be determined using Equation (5) below.

$$k_s = \frac{\sum_{i=1}^{NF} k_{s,i} \psi(r_{n,i})}{NF \sum_{i=1}^{NF} \psi(r_{n,i})} \qquad (5)$$

The $\Psi(r_{n,i})$ function utilized in Equation (5) is the same $\Psi(r_{n,i})$ function used in Equation (4).

For forbidden regions, modify the proxy movement functionality of the haptic rendering algorithm discussed in the context of Numbers 5 and 6 of Tables 3, Table 3.5 for movement of free motion proxies, and Table 3.6 for movement of entrenched proxies can be modified for forbidden region processing as discussed immediately below in the context of Tables 5.1 and 5.2, and FIGS. 7B and 7C. Note that the algorithm for movement of in-contact proxies shown as Number 7 of Table 3 and in Table 3.7 need not change for forbidden regions, as changing the definitions of the in-contact proxy movement state and the normal vector (using Equation (4)) permit reuse of the in-contact proxy movement state algorithm when forbidden region(s) is/are present.

Table 5.1 updates Number 5 of Tables 3 and 3.5 for forbidden region processing. Number 5 the portion of the haptic rendering algorithm that moves free-motion proxies during a haptic rendering cycle.

TABLE 5.1

5. if (S == free-motion) // See FIGS. 6A and 7A
    Let M = number of points that could constrain proxy movement toward HIP.
    Let $x_i$ = point that could constrain proxy movement toward HIP, for i = 1 to M.
    Let $\|u\|_2$ = the length of HIP vector u = the distance between P and
    HIP
    // forbidden region definitions
    Let $p_i$, i = 1 to NF, be the set of points that satisfy Equation (3)
    Let $r_{n,i}$, i = 1 to NF, be the forbidden-region radius for $p_i$
    Let $k_{s,i}$, = 1 to NF, be the forbidden-region virtual fixture stiffness
    for $p_i$
    if (NF <=0) then // if no forbidden zone points
    // set $s_k$ and $d_k$ as shown in Tables 3 & 3.5
    . . .
    end if // if no forbidden zone points TABLE 5.1-continued

```
    else // have forbidden zone points
        Let current step size d_{free-motion} = 1000000 // or other arbi-
trarily
            large number
            for (i = 1 to NF) // for each forbidden zone point
```

$$\text{Solve } \left\| P - p_i - d_i \frac{u}{\|u\|_2} \right\|_2 = r_{f,i} + r_c \text{ for } d_i$$

```
                if (d_i < d_{free-motion}) then // find minimum distance to move
                    as d_{free-motion}
                        d_{free-motion} = d_i
                    end if
            end for
            // d_{free-motion} is minimum di value over all points in forbidden
zone
            if (d_{free-motion} > ||u||_2) then
                d_{free-motion} = ||u||_2
            end if
            // set free-motion step size based on d_{free-motion}
```

$$s_k = d_{free-motion} \frac{u}{\|u\|_2}$$

```
        end else // end of else there are forbidden zone points
    end if // of S in free-motion
```

The pseudo-code of Table 5.1 first determines if there are forbidden regions by testing the number of forbidden regions variable NF. If NF≤0, then no points satisfy Equation (3) implying no points are in a forbidden region, and then the techniques of Table 3.5 can be reused. Otherwise, NF>0, so there is at least one point in the set $p_i$ of points in and near forbidden region(s).

After determining that NF>0, then let the step size $d_{free-motion}$ equal an arbitrarily large number; e.g., 1000000. While performing the "Solve" portion of Number 5 within the for loop shown in Table 5.1, the haptic rendering algorithm determines a distance $d_i$ between proxy center P and a forbidden-region point $p_i$ before $p_i$ constrains motion of a free-motion proxy toward a HIP in the direction of HIP vector u.

The for loop of Table 5.1 then is used to determine a minimum distance $d_{free-motion}$ over all $d_i$ values. After completing the for loop, the minimum distance $d_{free-motion}$ is compared to $\|u\|_2$, which is a distance between proxy center P and HIP. If the minimum distance $d_{free-motion}$ exceeds the distance $\|u\|_2$, then $d_{free-motion}$ is set to $\|u\|_2$. Once calculated, $d_{free-motion}$ is multiplied by a normalized HIP vector $u/\|u\|_2$ to determine a step $s_k$ toward the HIP.

FIG. 7C shows an example proxy whose movement toward HIP 750 is impeded by forbidden region 740, in accordance with an example embodiment. As shown in the example of FIG. 7C, forbidden region 740 centered point $p_i$ with forbidden-region radius $r_{f,i}$ M=8 can constrains movement of free-motion proxy 730 centered at proxy center $P_I$ toward HIP 750 in the direction of HIP vector u. Specifically, FIG. 7C shows that when a proxy center of proxy 730 moves to a position $P_2$, proxy 730 will be in contact with forbidden region 740; i.e., contact point (CP) 732a will be touching a surface of forbidden region 740. In this example, $d_{free-motion}$ is shown as a distance between $P_1$ and $P_2$.

Table 5.2 updates Number 6 of Tables 3 and 3.6 for forbidden region processing. Number 6 of the haptic rendering algorithm moves entrenched proxies during a haptic rendering cycle.

TABLE 5.2

```
6. else if (S == entrenched) // See FIG. 6B
    Let M= number of points that entrench proxy (e.g., are within
        radius r_1 of P).
    Let x_i = point that entrenches proxy, for i = 1 to N.
    Let current step size d_k = -1
    // forbidden region definitions
    Let p_i, i = 1 to NF, be the set of points that satisfy Equation (3)
    Let r_{n,i}, i = 1 to NF, be the forbidden-region radius for p_i
    Let k_{s,i}, i = 1 to NF, be the forbidden-region virtual fixture
stiffness for p_i
    if (NF == 0) // if no forbidden zone points
        // set s_k and d_k as shown in Tables 3 & 3.6
        ...
    end if // if no forbidden zone points
    else // have forbidden zone points
        d_{entrenched} = -1; // arbitrary value less than 0
        for (i = 1 to NF) // for each forbidden zone point
            Solve || P - p_i + d_i n_1 ||_2 = r_{f,i} + r_1, for d_i
                if (d_i > d_{entrenched}) then // find max distance to move
                    as
                    d_{entrenched}
                        d_{entrenched} = d_i
                end if
        end for
        // make sure d_{entrenched} is non-negative
        if (d_{entrenched} > 0) then // don't permit negative motion
            d_{entrenched} = 0
        end if
        // set entrenched step size based on d_{entrenched}
            s_k = d_{entrenched} n_1
    end else // have forbidden zone points
end else if
```

The pseudo-code of Table 5.2 first determines if there are forbidden regions by testing the number of forbidden regions variable NF. If NF≤0, then no points satisfy Equation (3) implying no points are in a forbidden region, and then the techniques of Table 3.6 can be reused. Otherwise, NF>0, so there is at least one point in the set $p_i$ of points in and near forbidden region(s).

After determining NF>0, then let the step size $d_{entrenched}$=-1 or some other arbitrarily negative number. While performing the "Solve" portion of Number 6 within the for loop shown in Table 5.2, the haptic rendering algorithm determines a distance $d_i$ between proxy center P and a point $p_i$ before $p_i$ constrains motion of a free-motion proxy toward a HIP in the direction of HIP vector u.

While performing the "Solve" portion of Number 6 shown in Table 3.6, the haptic rendering algorithm determines a distance $d_i$ between P and a forbidden-region point $p_i$ along estimated normal vector $n_1$ such that $x_i$ is at least radius $r_1$ plus forbidden-region radius $r_{f,i}$ units distant from P if P moves at least $d_i$ units along estimated normal vector $n_1$. Recall that a forbidden-region point $p_i$ entrenches a proxy if $p_i$ is within radius $r_1$ of proxy center P.

The for loop of Table 5.2 then is used to determine a maximum distance $d_{entrenched}$ over all $d_i$ values. After completing the for loop, the maximum distance $d_{entrenched}$ is compared to 0, and if $d_{entrenched}$ is negative, $d_{entrenched}$ is set to 0. Once calculated, $d_{entrenched}$ is multiplied the estimated normal vector $n_1$ to determine a step $s_k$ along the normal from an entrenching forbidden region.

FIG. 7D shows an example point cloud (PC) 760, in accordance with an example embodiment. Point cloud 760 has one point, centered at $p_0$, that also forms a forbidden region with a forbidden-region radius $r_{f,i}$=0.1 m.

Figure 7E:
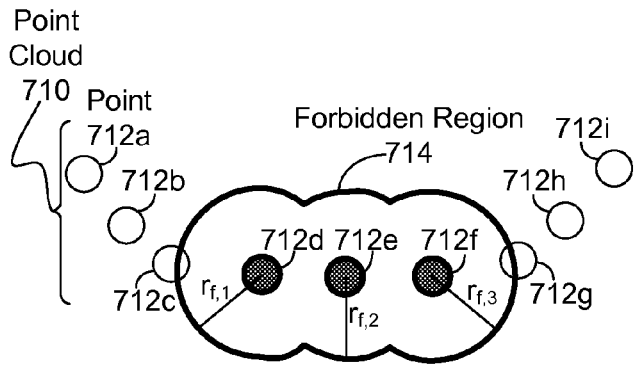
FIG. 7E graphs distances between a HIP and a center of a forbidden region and distances between a proxy and the center of the forbidden region, in accordance with an example embodiment.
Figure 7E:
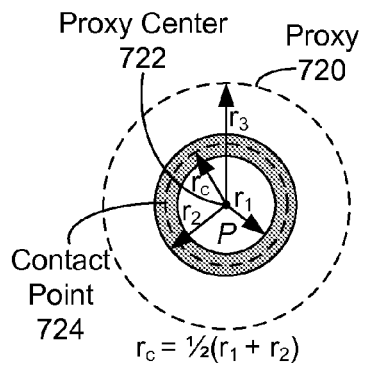
Figure 7E:
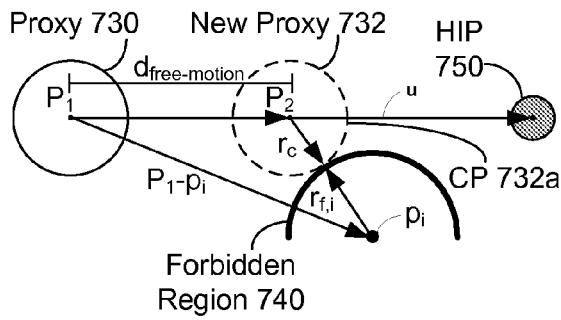
Figure 7E:
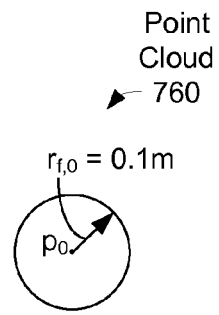
Figure 7E:
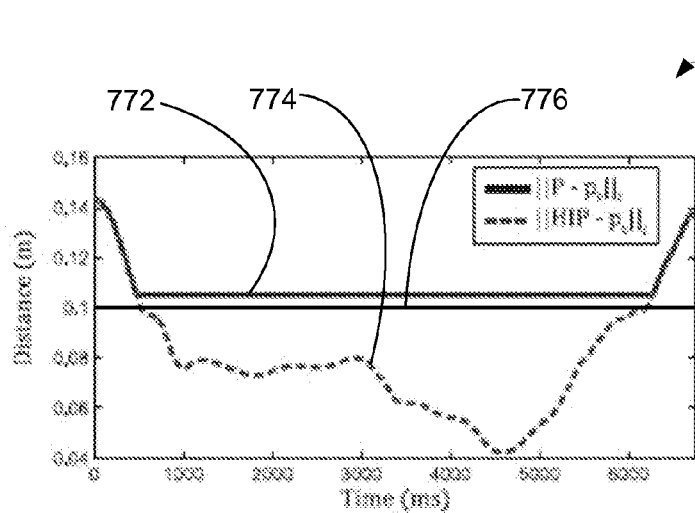

FIG. 7E depicts graph 770, graphing distances between a HIP and a center of a forbidden region and distances between a proxy and the center of the forbidden region, in accordance with an example embodiment. Data depicted by graph 770 was generated during a haptic rendering session interacting with the point cloud shown in FIG. 7D.

Graph 770 shows a time for the haptic rendering session on the horizontal axis, ranging from 0 to approximately 7000 ms (or 7 seconds), and distance in meters on the vertical axis. Line 772 shows $\|P-p_0\|_2$, which is the distance between proxy center P and point $p_0$ that centers both the point cloud and the forbidden region. FIG. 7E shows that all points of line 772 are above line 776, representing a distance 0.1 meters from $p_0$.

Line 774, depicted using a dotted line in FIG. 7E shows $\|HIP-p_0\|_2$, which is the distance between HIP center HIP and point $p_0$. In contrast to line 772, the HIP went considerably closer to $p_0$ than 0.1 meters. Thus, lines 772 and 774 together indicate that proxy center P did not enter into the 0.1 meter forbidden region during the haptic rendering session even though the HIP was within the forbidden region during most of the session.

Figure 8:
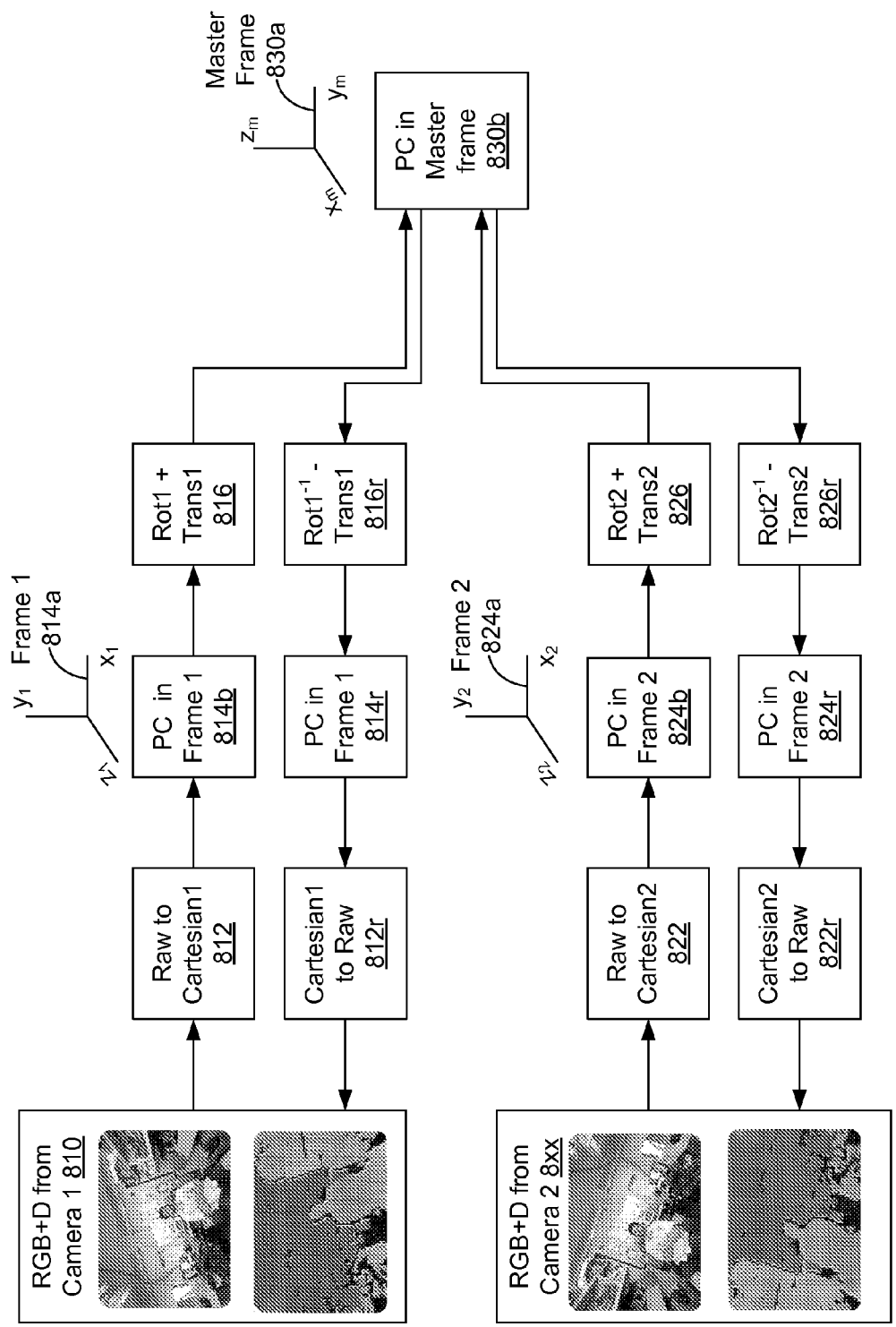
FIG. 8 depicts an example technique of integrating point cloud data from two cameras into a common master coordinate system, in accordance with an example embodiment.

Example Technique for Utilizing Multiple Cameras FIG. 8 depicts an example technique of integrating point cloud data from two cameras, Camera1 and Camera2, into a common master "frame" or coordinate system, in accordance with an example embodiment. In some embodiments, the herein-disclosed functions of a camera related to providing RGB+D data can be performed by one or more sensors, one or more network connections configured to provide at least RGB+D data from one or more points of view, one or more databases configured to provide at least RGB+D data from one or more points of view, and/or other device(s) that can provide RGB+D data as discussed herein.

FIG. 8 shows that the technique can begin when Image (RGB) and depth (D) data is captured by Camera1 as RGB+D Data 810 and captured by Camera2 as RGB+D Data 820. RGB+D data 810 can be converted to Cartesian coordinates using technique 812, such as the raw data to Cartesian conversion technique discussed above in the context of FIGS. 3A and 3B. As also discussed above regarding FIGS. 3A and 3B, RGB+D data converted Cartesian coordinates can be thought of as a point cloud (PC) 814a using the coordinates of Frame 1 814b. Point cloud 814a can transformed into a coordinates of the master frame 830a using technique 816, which can include rotating point cloud 814a according to a rotation, Rot1, and a translating point cloud 814a according to a translation, Trans1. After performing technique 816, point cloud 814a has been transformed to be part of point cloud 830a utilizing coordinates of master frame 830b.

FIG. 8 shows that RGB+D data 820 can be converted to a point cloud 824a in Frame 2 824b utilizing technique 822, and then transformed to part of point cloud 830a coordinates in master frame 830a using technique 826, which can include rotating point cloud 824a according to a rotation, Rot2, and a translating point cloud 824a according to a translation, Trans2. FIG. 8 also shows that each of these conversions can be reversed. For example, technique 816r can transform a point in point cloud 830a to point 814r in point cloud 814b of Frame 1 814a. Specifically, technique 816r can take an input point in point cloud 830a and utilize inverse rotation $Rot1^{-1}$ and negative translation −Trans1 to perform the conversion to point 814r. The converted point 814r can be further converted to a point in RGB+D data from Camera 1 810 utilizing technique 812r, which can invert the conversion of technique 812; e.g., determine RGB+D point (u v d 1)=(x y z w)*$\{M_c\}^{-1}$.

Also, technique 826r can transform a point in point cloud 830a to point 824r in point cloud 824b of Frame 1 824a. Specifically, technique 826r can take an input point in point cloud 830a and utilize inverse rotation $Rot2^{-1}$ and negative translation −Trans2 to perform the conversion to point 824r. The converted point 824r can be further converted to a point in RGB+D data from Camera 1 820 utilizing technique 822r, which can invert the conversion of technique 822.

As part of the haptic rendering algorithm, the set of points $x_i$ is determined as the set of points within radius r3 of proxy center P. When utilizing multiple cameras, one technique to determine the set of points $x_i$ is to check each point in the point cloud utilizing the master frame; e.g., point cloud 830b of FIG. 8. However, this can lead to a number of unnecessary computations.

Another technique is to select a region around proxy center P of radius r3 and project the region into RGB+D data coordinates using the reverse techniques shown in FIG. 8; e.g., utilize techniques 812r and 816r for Camera 1 data and utilize techniques 812r and 816r for Camera 2 data. The transformations 816r and 826r, perhaps through operations of inverse rotations $Rot1^{-1}$ and $Rot2^{-1}$, can affect the relative positions of x and y coordinates on the surface of the selected regions—that is, x and y coordinates can be "flipped" using these inverse rotations.

However, x and y coordinates of the midpoint of the region; a.k.a., proxy center P, are not affected. Then, to determine the $x_i$s from Camera 1, midpoint vector in the master frame $u_{mp}$(master)=$P_{master}$−0 can first be generated, where $P_{master}$ is the proxy center in master frame coordinates. $u_{mp}$(master) can be converted to midpoint vector in Frame 1 $u_{mp}$(Frame 1), by rotating $u_{mp}$(master) by $Rot1^{-1}$ and translating by −Trans1. Then all points with r3 of $u_{mp}$(Frame 1) can be selected as $x_i$s from Camera 1. Utilizing a similar technique, the $x_i$s from Camera 2 can be determined and merged with the $x_i$s from Camera 1, to generate the set of $x_i$s for the haptic rendering algorithm. In some embodiments not shown in FIG. 8, $x_i$s from two or more cameras can be determined and merged with the $x_i$s from Camera 1 to generate the set of $x_i$s for the haptic rendering algorithm.

Figure 9:
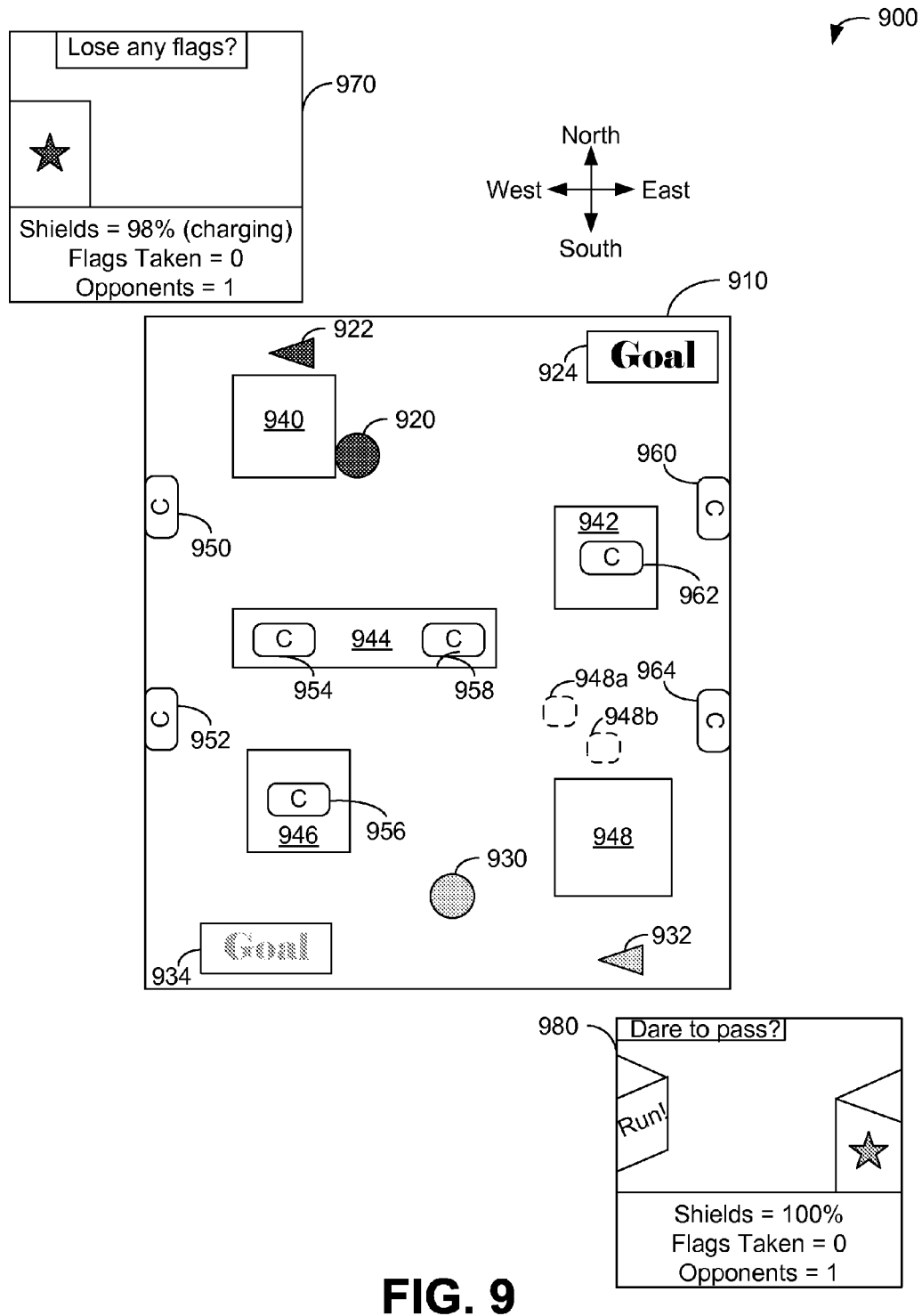
FIG. 9 is an example game scenario in a game environment, in accordance with an example embodiment.

Example Gaming and Augmented Reality Applications of Haptic Rendering FIG. 9 is an example game scenario 900 in a game environment 910, in accordance with an example embodiment. In scenario 900, players 920 and 930 are playing a game of "capture the flag" in game environment 910. FIG. 9 shows player 920 as a black circle in game environment 910 and guarding flag 922, and shows player 930 as a grey circle in game environment 910 and guarding flag 932.

In capture the flag, each player tries to be the first player to capture the opponent's flag and return the captured flag to a goal area. That is, during the game, player 920 attempts to capture flag 932 and return flag 932 to goal 924 before player 930 captures flag 922 and returns flag 922 to goal 934. In the variation of capture the flag shown in scenario 900, a player can lose if a shield level for the player goes to 0% as well.

In scenario 900, both players 920 and 930 utilize haptic feedback devices, such as haptic gloves, body suits with haptic feedback generators, and/or other haptic devices. Also, players 920 and 930 each have computing devices configured to use game-playing software access a virtual environment generated from RGB+D data generated by cameras 950, 952, 954, 956, 958, 960, 962, and 964. In other scenarios, more or fewer cameras can be used than shown in FIG. 9. Also, in scenario 900, both players 920 and 930 have sensors configured to provide location and heading information for the player. For example, both players 920 and 930 could have a haptic suit with a portable display that includes Global Positioning System (GPS) sensor(s), accelerometer(s), gaze detection sensors, and/or other sensors to both access the virtual environment, provide location and heading information, and receive haptic feedback.

Software for the game can determine a location and heading for each player within environment 910 and generate a display of environment 910 at the player's location as the player looks in the heading direction. FIG. 9 shows display 970 generated for player 920 with a view of box 940 shown with a black star. In scenario 900, a "charging object", or object star having the player's color on an object within environment 910 increases or "charges" the player's shield level as long as the player touches the object. In contrast, if the player touches a "discharging object", or object having a star of the color of the opponent, the player's shield level decreases or "discharges." In some embodiments, a discharging object can produce a forbidden zone that discharges a shield level while a player is within the forbidden zone. The colored star used for identification of charging and discharging objects can be generated by the game-playing software to permit changes in colors of player and/or changing which objects act as charging and/or discharging objects. Also, in some embodiments, touching a discharging object can quickly or even immediately reduce a shield level to 0—e.g., the discharging object causes the player to (nearly) instantly lose the game. Depending on the scenario, such instant-discharge objects may or may not be identified to the player by the game-playing software.

Along with identification of charging and discharging objects, the game-playing software can generate slogans, images, etc. on objects in the environment. For example, in scenario 900, player 920 has a heading of due south, and the game-playing software has generated the slogan "Lose any flags?" on an image of object 944 in display 970. Similarly, in scenario 900, display 980 for player 930 has slogans "Dare to pass?" and "Run!" display on generated images of objects 944. In some scenarios, the game-playing software may provide images of objects without additional slogans, images, etc.

Displays 970 and 980 each include game-related data for each player, including a shield level, a number of flags taken, and a number of opponents in environment 910. For example, FIG. 9 shows display 970 for player 920 with game-related data that indicates that player 920: (a) has a shield level of 98% and that the shields are charging, (b) has not taken any flags, and (c) has one opponent in environment 910. FIG. 9 also shows display 980 for player 930 with game-related data that indicates that player 930: (a) has a shield level of 100%, (b) has not taken any flags, and (c) has one opponent in environment 910. In some embodiments, more, different, and/or less game-related data can be provided in a display for a player.

In some embodiments, the game-playing software can generate and/or display virtual objects as well as, or instead of, actual objects such as objects 940, 942, 944, 946, and 948 of environment 910. For example, objects 948*a* and 948*b*, each shown using dashed lines, can be virtual objects. As one example, a virtual object can represent a "regular" object similar to object 946 or 948 but is not physically present in environment 910. In other examples, a virtual object can represent a trap such as a "covered pit" that an unwary player can fall into and lose shield strength, or a treasure such as "supercharger" that can immediately add shield strength to the player.

Many other examples of real and virtual objects are possible, including examples of other games that utilize haptic rendering. Some of these games can involve only one player and some games can involve more than two players. For example, a maze game with haptic feedback can involve a single player exploring the maze or can involve two or more players perhaps running a race through the maze.

Figure 10:
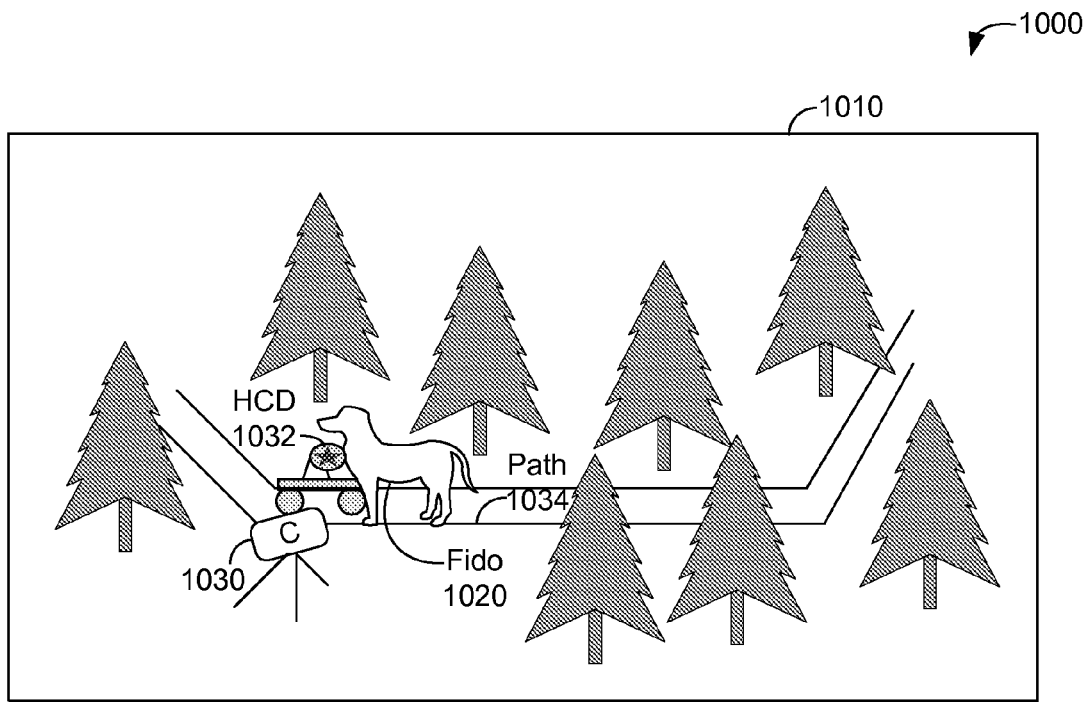
FIG. 10 is an example haptic rendering session scenario in a remote environment, in accordance with an example embodiment.
Figure 10:
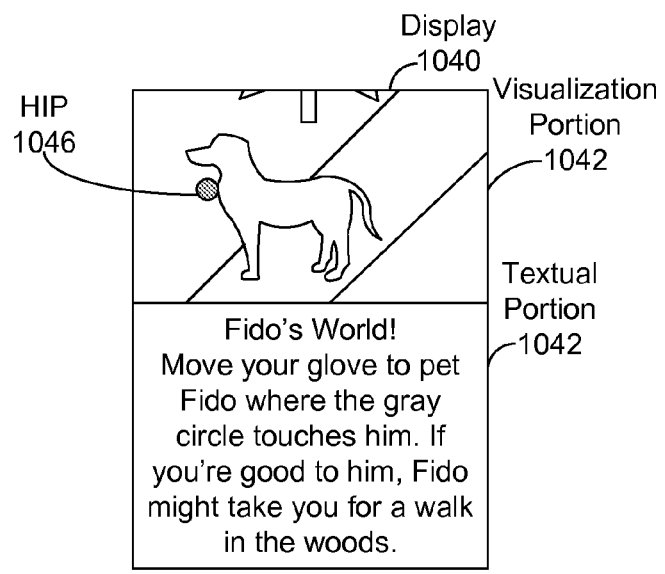

FIG. 10 is an example haptic rendering session scenario 1000 in a remote environment 1010, in accordance with an example embodiment. Environment 1010 includes a dog "Fido" 1020, an RGB+D camera 1030, and a haptically-controlled device (HCD) 1032. During scenario 1000, a remote viewer interacts with Fido 1020 via HCD 1032. For example, HCD 1032 can be a mobile robot with a robot arm configured for remote control. Other HCDs are possible as well. In some scenarios, HCD 1032 is not present, which permits interaction with a virtual environment generated by data from camera 1030 without the ability to affect a real environment, such as environment 1010.

Display 1040 can be generated to visualize a virtual environment utilizing RGB+D data generated by camera 1030. FIG. 10 shows display 1040 with visualization portion 1042 configured to display a view of environment 1010 and textual portion 1044 configured to display both instructions, such as "Move your glove to pet Fido where the grey circle touches him", and other information such as "If you're good to him, Fido might take you for a walk in the woods."

A user conducting a haptic rendering session scenario can use a haptic glove or other haptic interface device to control HIP 1046 and touch Fido 1020 using the robot arm of HCD 1032. In some scenarios, the user can control movement of HCD 1032, perhaps by certain movements of the haptic interface device; e.g., press a "move robot" button or otherwise signal a change of interpretation of movements of the haptic interface device from being interpreted as commands for moving the robot arm to commands for moving HCD 1032.

In scenario 1000, the move robot button can be pressed to move HCD 1032 along path 1034 and so walking Fido 1020 based on movements of the haptic interface device (e.g., move haptic interface device left or right to correspondingly move HCD 1032 left or right along path 1034). When the move robot button is not pressed, movements of the haptic interface device control the robot arm (e.g., for a haptic glove acting as the haptic interface device, Fido 1020 can be petted or scratched based on finger movements of the haptic glove).

In other scenarios, non-haptic interface devices can be used to control HCD 1032; e.g., the haptic interface device controls the robot arm and a joystick or keyboard can be used to move the mobile robot. In still other scenarios, camera 1030 can be mounted on HCD 1032 to provide additional information about environment 1010, including information about Fido 1020.

Figure 11:
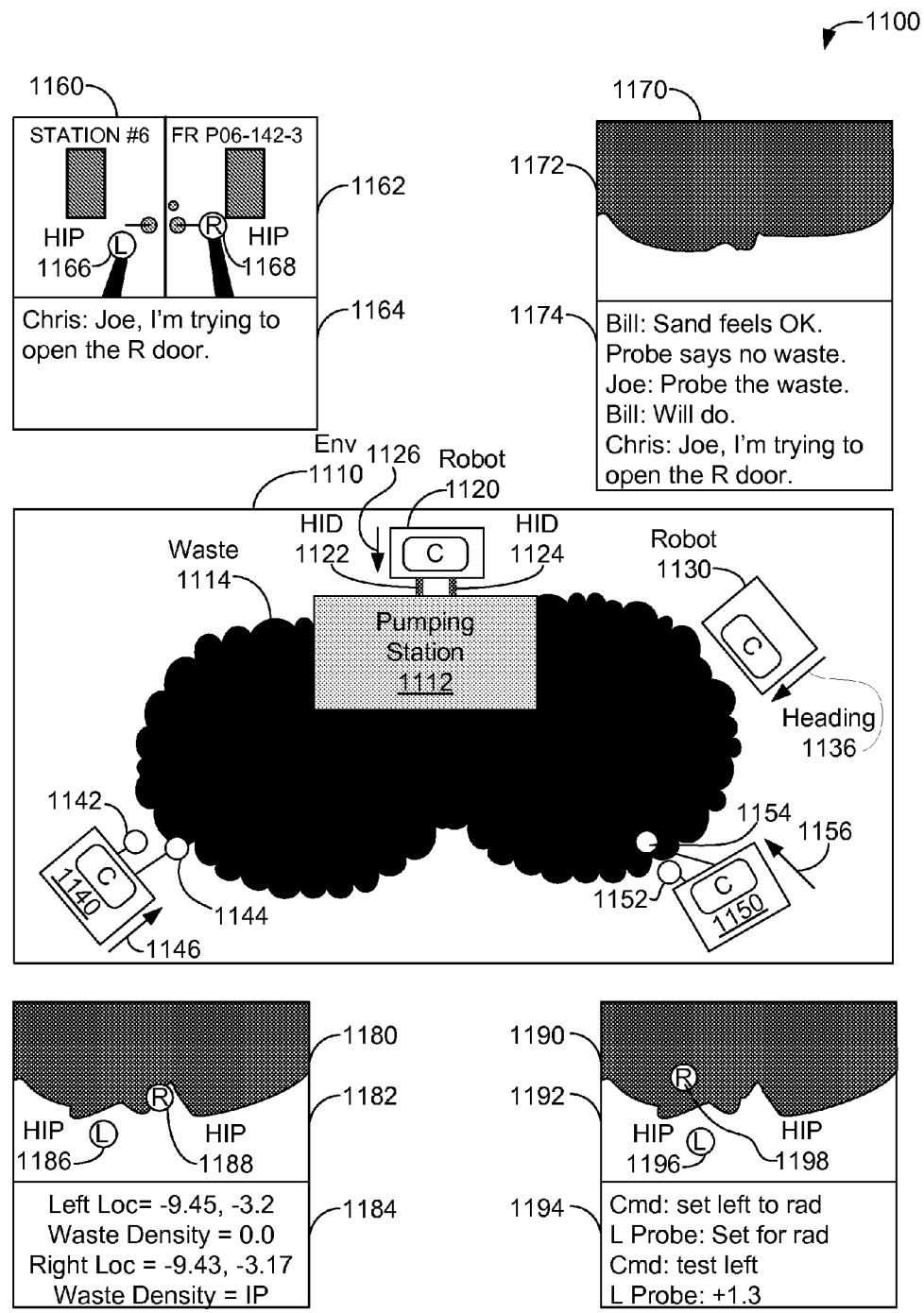
FIG. 11 is an example collaborative haptic rendering session scenario for a remote environment, in accordance with an example embodiment.

FIG. 11 is an example collaborative haptic rendering session scenario 1100 for a remote environment 1110, in accordance with an example embodiment. Environment 1110 includes pumping station 1112 that, during scenario 1100, has failed. Due to the failure of pumping station 1112, waste 1114 has escaped, as shown by FIG. 11 as a black cloud in environment 1110.

During scenario 1110, four robots 1120, 1130, 1140, and 1150 have been deployed to fix pumping station 1110 and investigate environment 1110 to begin clean up of waste 1114. Each of robots 1120, 1130, 1140, and 1150 has an RGB+D camera facing forward and can be driven by a remote operator using a display, such as display 312, and one or more haptic interface devices, such as haptic interface device(s) 316.

In scenario 1100, each robot operator is in a different physical location. Each location is equipped with one or more haptic interface devices, one or more displays, and perhaps other interface devices, such as keyboards, keypads, touch screens, loudspeakers, microphones, and/or other interfaces. In other scenarios, some or all of the robot operators can be in the same remote location. In still other scenarios, a single robot can be used with a single robot operator. In even other scenarios, one or more of the robots can be controlled by multiple robot operators e.g., both a driver and a ladder operator can control a robotic fire engine. In yet other scenarios, one or more of the robot operators can be local; e.g., at environment 1110, perhaps riding on or within a robot.

FIG. 11 shows the displays generated the RGB+D cameras for the robot operators, as display 1160 for robot 1120 headed along heading 1126, display 1170 for robot 1130 headed along heading 1136, display 1180 for robot 1140 headed along heading 1146, and display 1190 for robot 1150 headed along heading 1156. Robot 1120 has two robot arms configured as haptic interface devices (HIDs) 1122, 1124, robot 1140 has two probes 1142, 1144 configured as haptic interface devices, and robot 1150 has two probes 1152, 1154 configured as haptic interface devices. Each robot display shown in FIG. 11 includes a visualization portion and a textual portion, similar to display 1040 shown in FIG. 10. For example, display 1160 includes visualization portion 1162 and textual portion 1164.

In scenario 1100, robot 1130 is in communication with the other robots 1120, 1140, and 1150, and is configured to a "communication coordinator" to send and receive text, voice, and perhaps other types of messages from the other robot operators. For example, robot 1130 can be controlled by a supervisor observing environment 1110 and coordinating the efforts of robots 1120, 1140, and 1150.

In scenario 1100, a far end of each robot arm of robot 1120 is configured to be a HIP for the operator of robot 1120. FIG. 11 shows display 1160 for robot 1120 including a location of a left HIP 1166, corresponding to a left robot arm of robot 1120, and a right HIP 1168 corresponding to a right robot arm of robot 1120. In FIG. 11, right HIP 1168 is near to a handle of a door of pumping station 1112.

The operator of robot 1120 can use a non-haptic interface device, such as a keyboard or keypad to enter text that appears in textual portion 1164. FIG. 11 shows that the text "Joe, I'm trying to open the R door." Is in textual portion 1164, preceded by an identifier "Chris" of a person who entered in the text; e.g., Chris is a first name of the operator of robot 1120. In scenario 1120, text entered into a textual portion 1164 of display 1160, textual portion 1184 of display 1180, or textual portion 1194 of display 1190 is displayed both in the entering textual portion plus in textual portion 1174, as display 1170 and textual portion 1174 are associated with the communication coordinator. In some embodiments, robot operators can send a message to one or more other operators directly without sending a copy of the message to the communication coordinator.

In other embodiments, the operator of robot 1120 can receive touch feedback while attempting to open the door of pumping station 1112. For example, as the operator of robot 1120 uses robot arm 1122 to open the door of pumping station 1112, haptic rendering can provide feedback to indicate that the door is or is not resisting the efforts to open the door. Further, in embodiments where robot arm 1122 is equipped with finger-like appendages, the operator of robot 1120 can use a haptic glove or other haptic interface device to move the appendages to grab the door handle, and pull down or push up with an amount of effort based on, e.g., proportional to, an amount of effort exerted by the operator in moving the haptic interface device.

Robots 1140 and 1150 are each equipped with two probes. Each probe can be equipped with one or more sensors for chemical, biological, and/or radiation testing. FIG. 11 shows robot 1140 with probes 1142 and 1144 and robot 1150 with probes 1152 and 1154. FIG. 11 shows probes 1142 and 1152 outside of waste 1114, probe 1144 on a boundary of waste 1114, and probe 1154 in waste 1114.

Each of displays 1180 (for robot 1140) and 1190 (for robot 1150) shows a HIP associated with a probe. For example, for robot 1140, probe 1142 is associated with HIP 1186 and probe 1144 is associated with HIP 1188. Robot 1140 is engaged in measuring waste densities with probes 1142 and 1144. FIG. 11 shows textual portion 1184 of display 1180 displaying various types of information, including location information for each probe and waste density values detected by each probe. In scenario 1100, a waste density of "IP" indicates a probe is in the process of determining a waste density, such as shown in FIG. 11 for probe 1144.

Both haptic and non-haptic commands can be used to control robots. Textual portion 1194 of display 1190 shows commands being communicated from the operator of robot 1150 to robot 1150. FIG. 11 shows a "Cmd:" prompt for commands, such as "set left to rad", which directs robot 1150 to set a left probe 1152 to act as a radiation sensor. Robot 1150 responds with a confirmatory message from "L Probe" of "Set for rad" to indicate that left probe 1152 is ready for radiation testing. In scenario 1110, the operator of robot 1150 then send another command "test left" to robot 1150. In response, a left probe performs a radiation test and determines a value of "+1.3" for the radiation test. In scenario 1000, the operator of robot 1150 can move probe 1152 using a left haptic interface device, as indicated using the "L" on HIP 1196 that corresponds to probe 1152.

Figure 12:
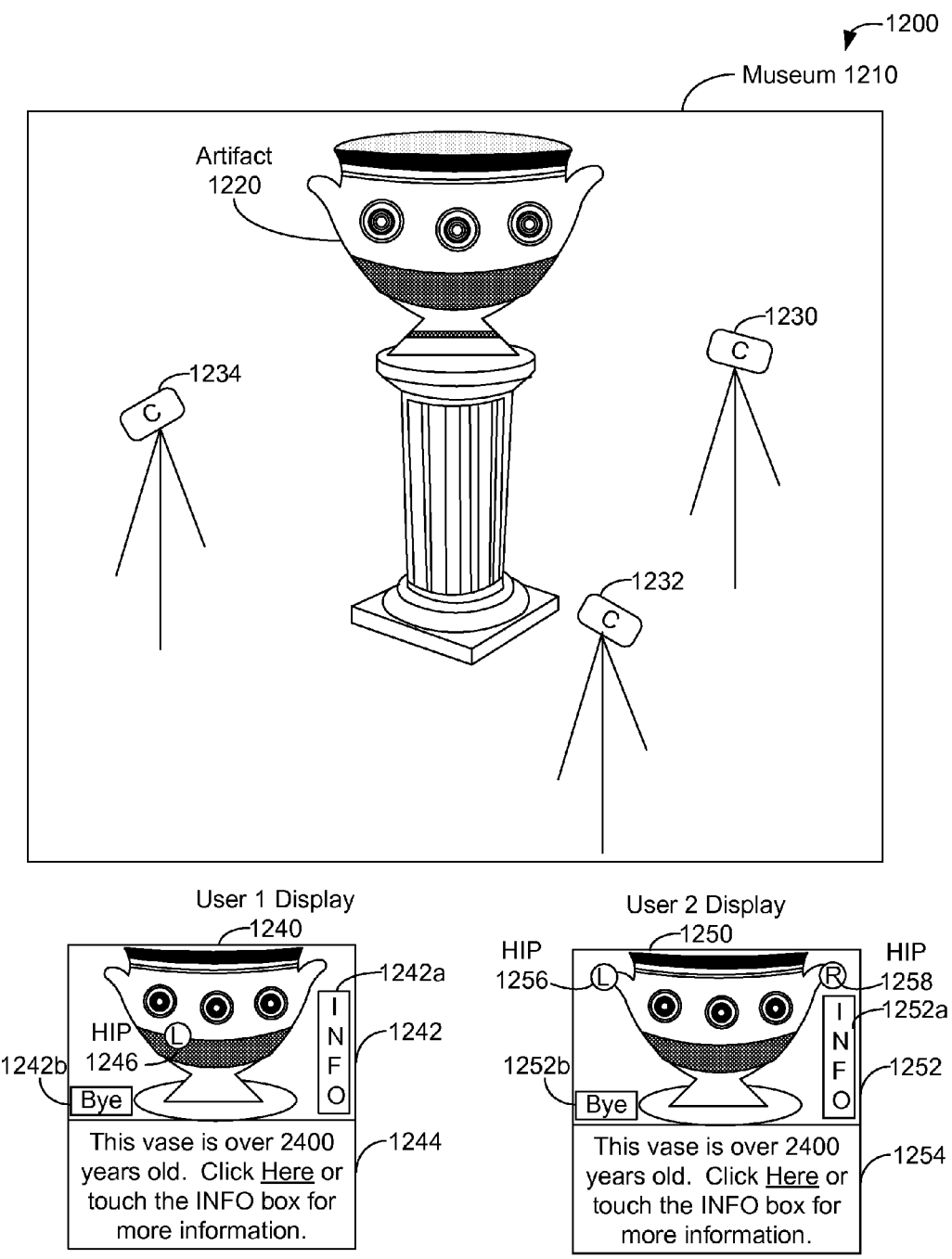
FIG. 12 is a multi-user haptic rendering session scenario in a museum environment, in accordance with an example embodiment.

FIG. 12 is a multi-user haptic rendering session scenario 1200 in a museum environment 1210, in accordance with an example embodiment. Museum 1210 has, as part of its collection, artifact 1220 that is on display.

To minimize risk and to permit virtual touching of artifact 1220, museum 1210 has allowed three RGB+D cameras 1230, 1232, and 1234 to be used to capture visual and depth data that can be used in multiple independent haptic rendering sessions. For example, the visual and depth data from each camera 1230, 1232, and 1234 can be converted to visual and point cloud data in a 3D coordinate system using the haptic rendering techniques described herein and then streamed using one or more streaming data servers. Then, a user with suitable connectivity and haptic interface hardware can establish a haptic rendering session utilizing the visual and point cloud data stream. This haptic rendering session can be used to view and virtually touch artifact 1220

FIG. 12 shows two users, User 1 and User 2, remotely viewing and virtually touching artifact 1220. Display 1240 for User 1 includes visualization portion 1242 and textual portion 1244. Visualization portion 1242 includes an image of artifact 1220, an info button 1242a, a bye button 1242b, and HIP 1246. Info button 1242a and bye button 1242b can be generated by software providing the haptic rendering session to User 1. Info button 1242a and bye button 1242b can be implemented, for example, using virtual objects. When a virtual object for a button is touched, an operation associated with the button can be performed. For example, if a virtual object associated with info button 1242a is touched, additional information about museum 1210, artifact 1220, and/or other information can be provided to User 1. The additional information can be provided within display 1240 or, in some embodiments, using other audio, video, and/or haptic feedback. Similarly, if a virtual object associated with bye button 1242*b* is touched, the haptic rendering session can be terminated. In some embodiments, more or fewer buttons can be provided as part of display 1240 and/or display 1250, such as a "switch camera" button, a "change artifact/display" button, a "buy tickets to museum" button, an "audio presentation" button, an "ask a curator/teacher" button, and/or other buttons.

Along with info button 1252*a* and bye button 1252*b* discussed immediately above, display 1250 shows two haptic interface points 1256 and 1258—one on each handle of artifact 1250. In some embodiments, a user, such as User 2 can use the haptic interface device to virtually move artifact 1220. For example, data from cameras 1230, 1232, and 1234 can be combined and mapped to a common coordinate system using the techniques discussed above. Then, to virtually move a static virtual object in the common coordinate system, such as artifact 1220, a point of view of the user can be moved. In some embodiments, the point of view for the user, expressed in the common coordinates, can be moved in an opposite direction to the desired movement of the static virtual object; e.g., if the object is to be moved to the right, the point of view can be moved to the left to provide the same point of view as if the object moved rightward without changing points of view.

In other scenarios, museum 1210 can have a haptically-controlled device with artifact 1220 to permit an expert in a remote location can manipulate the object with touch feedback. For example, a remotely-controlled robot with appropriate arm attachments, such as a fine brushes, focused air flow devices, and/or other attachments can be used by a remote expert to clean, restore, repair, and/or authenticate artifact 1220.

Many other uses of haptic rendering sessions to remotely and/or locally access environments, play games, perform collaborative tasks, communicate, and/or other activities are possible as well.

Co-Robotic Applications of Haptic Rendering for Surgical Procedures

Robotic techniques are changing surgical practice in procedures such as prostatectomy and hysterectomy, where tele-operated robotic surgery is rapidly becoming the standard of care. Robotic surgery is generally less invasive than traditional open surgery—rather than large incisions, access to inside the human body is through small incisions for minimal access. Besides allowing new and less invasive cures, this technology can potentially facilitate care in remote parts of the US, and the developing world through Internet connection of the surgeon to the surgical robot. Robotic surgery can be a "co-robotic" or a procedure that involves joint actions both by the surgeon and the robot.

Disclosed is a system where new autonomous capabilities built into the robot work with the surgeon, allowing the surgeon to restrict the robot's instruments to only relevant, safe, and/or economical movements and avoiding dangerous injury to surrounding structures. The disclosed co-robotic system for robotic surgery: (i) permits the surgeon to "feel" the interaction of surgical tools (e.g., the robot end-effectors) with the tissue during robotic surgery, (ii) tracks moving objects that need to be protected during surgery (e.g., blood supply to organs or certain nerves) using video and depth cameras (e.g., the MICROSOFT® KINECT®), (iii) establishes forbidden regions to act as virtual "force fields" around the protected objects as the haptic controls can "push back" if the surgeon tries to move too close or too quickly to the protected object, and (iv) restricts movement into dynamically tracked protected zones.

More specifically, haptic rendering from point clouds from one or more cameras can be used to give haptic feedback to a surgeon during a surgical procedure. The cameras can be placed outside or inside of a body of a patient undergoing the surgical procedure.

In some embodiments, the HIP for each haptically-controlled tool can be at a tip of the haptically-controlled tool, such as a haptically-controlled robot arm. In other embodiments, one or more other locations than a tip can be a HIP for the haptically-controlled tool. For example, a HIP may correspond to an actuator on a tool arm but not all the way at the tip.

Combined physical and virtual images can be used during a surgical procedure; for example, an RGB image captured by a RGB+D camera can be superimposed with graphic simulations of haptically-controlled tool(s) used by the surgeon and/or other members of the surgical team during a surgical procedure.

Additionally or instead, virtual fixtures, including forbidden regions to both protect sensitive objects from inadvertent cutting and/or to notify a surgeon of tool proximity to the sensitive object can be used. Also, "guidance virtual fixtures", or surfaces a HIP or related surgical tool can move along to guide a surgeon on a path toward or around a target region can be used.

The virtual fixtures can be defined in several ways and can be defined before or during surgery. One technique is to use a mouse or touch screen of images from KINECT® video to define region(s) for the virtual fixtures. Another technique involves having a surgeon move a haptically-controlled tool to boundary points of the virtual fixture. For example, the surgeon may do this while watching video image from an RGB+D cameral. A third technique involves automated object recognition of targets to be protected and then defining virtual fixtures around recognized targets. In some embodiments, a surgeon can confirm computer choices of virtual features and/or virtual feature boundaries.

Haptic feedback, particularly with respect to virtual features, may afford improvements in patient safety through at least two techniques: 1) inadvertent instrument movements may be restricted, and 2) surgical motion can be economized to yield more efficient surgeries. This is especially important to prevent unsafe motion when the surgical tools are outside of the visual field (on the robot video screen). Also, the techniques described here can reduce an attention capacity of the surgeon in making surgical movements.

The use of virtual fixtures to guide the surgeon's movements as she carries out surgeries may limit potential injurious peri-operative complications. One particular complication during surgery is hemorrhage due to vascular injury. Identification of major vasculature and avoidance is paramount, yet injuries to large blood vessels during robotic surgery are reported annually. Technology to guide surgeons around critical organs and their vascular hila would lower risk of inadvertent injury to the vessels. In addition, incorporation of virtual fixtures may provide for more efficient surgery.

Some patients have complex surgeries that can last multiple hours. These complex surgeries can place the patient at additional risk for complications, such as pressure sores, deep vein thrombosis, pneumonia, and cardiopulmonary collapse. As attention capacity is at a premium during complex surgeries, the use of haptic rendering to aid surgical movement can make surgeries safer and permit the surgeon to pay more attention to issues other than surgical movements.

In robotic surgery applications, the RGB+D camera can include miniaturized RGB+D cameras suitable for placement in the body during robotic surgery to implement virtual fixtures for different surgical tasks.

Virtual fixture technology can be adapted to any robotic surgical platform, or robot involving manipulation. In some embodiments, robotic surgery can be performed using a RAVEN-II robotic surgery research system, from the University of Washington, Seattle Wash.

The RAVEN-II Surgical Robot

The RAVEN-II surgical robot is a research instrument designed to support research in advanced techniques in robotic assisted surgery. The RAVEN-II robot supports computational functions for surgical robotics, such as motion planning, machine learning, stereo vision and tactile/haptic feedback, among others.

Each RAVEN-II robot can have two arms, which can be controlled by a single PC with two USB 2.0 boards. On each of the arms, the RAVEN-II can include one or more surgical manipulators with seven degrees of freedom (7-DOF). The two 7-DOF surgical manipulators on the RAVEN-II are each divided into three main subsystems: a base holding all seven actuators, a tool positioning mechanism for positioning robotic tools, and a tool interface. The motion axes of the surgical robot include: Shoulder Joint (rotational), Elbow Joint (rotational), Tool Insertion/Retraction (linear), Tool Roll (rotational), Tool Grasping (rotational), Tool Wrist1 Actuation (rotational), and Tool Wrist2 Actuation (rotational) axes. The first four joint axes can intersect at a surgical port location to creating a spherical mechanism that allows for tool manipulation similar to manual laparoscopy.

Electrical motors mounted to the RAVEN base can actuate all motion axes. The motors of the first three axes can have power-off brakes to prevent tool motion in the event of a power failure. The cable system transmission can have low ratios to make the mechanism back-drivable and thus responsive to tissue interactions. Each surgical manipulator can have a pre-determined total mass including motors, gear heads and brakes; e.g., the pre-determined mass can be approximately 10 kilograms. A tool interface allows quick changing of tools and transmits motion to the tool rotation, grasp and wrist axes. The links and control system support a 3 axis wrist.

The RAVEN-II has a powerful, low-level software environment that can be extended to work with both high speed UDP tele-operation packets as well as relatively slow and asynchronous interfaces such as TCP/IP networking, 3D graphics and graphical user interfaces (GUI). The low level control system includes a real time process in Linux using a Real-Time Pre-emptive Configuration running at a pre-determined rate; e.g., 1000 Hz. Key functions running inside the 1000 Hz servo loop are coordinate transformations, forward and inverse kinematics, gravity compensation, and joint-level closed-loop feedback control. Running on a modern personal computer with 1 GB RAM, the low-level software environment occupies about 5% of the CPU time.

The link between the control software and the motor controllers can include a USB interface with one or more channels of high-resolution 16 bit digital-to-analog conversion for control signal output to each joint controller and one or more 24 bit quadrature encoder readers; e.g., 8 channels and 8 encoder readers. The board can perform a read/write cycle for all channels within a pre-determined amount of time; e.g., 125 micro-seconds.

The surgical robot can use a haptic camera system with a 2D camera and vision-based depth measuring system that provides three-dimensional image data for haptic rendering during robotic telesurgery. The depth measuring system can rely on the structured light principle, where displacement of an object is determined by variations of the geometry of a projected pattern.

Virtual features can be created for objects that (such as the blood supply for organs) can move during the surgical procedure. That is, what can be seen by the cameras will change as different tissues are exposed during the surgery. Therefore, real time virtual fixtures can be obtained using real time video and depth information and track the movement of objects of interest within one or more predefined zones of interest. In some embodiments, the virtual fixtures can guide the operator to utilize tools at a certain distance from objects that move.

The surgeon or other person can specify the boundaries of virtual features by tele-operation using the tool tip; or by using mouse, touch screen, or other input device on the video display during the initial stages of the surgical procedure from the RBG-D imagery. At any time during the surgery, the surgeon or other will have the ability to re-define selected virtual fixture(s) by drawing on real time image, repeating the entire virtual fixture zone designation process, or by delicately touching anatomical landmarks with the robot (e.g., the volume around the liver).

In some embodiments, the haptic rendering system can use the predefined virtual features about anatomical features and apply existing segmentation and object recognition techniques for RGB+D images to track and protect the anatomical features in real time. The surgeon or other person can confirm that these anatomical features are to be protected. Then, during the surgical procedure, the haptic rendering system can adjust virtual fixture zones as the anatomic features move (e.g., due to respiration, circulation, and/or mechanical action during the surgery). The surgeon will be able to see the virtual fixture zone graphically on a surgical console display, as well as a highlighting of the protected objects. The virtual fixture can be corrected, perhaps by touching the image of an object to be protected on the screen, or by re-drawing the virtual fixture perimeter.

The surgical tool tips can be tracked in real time. This tracking can be performed using color markings (for tracking by video) from RGB+D information obtained from one or more cameras. Tool tip tracking is necessary to avoid the complex process of registering the robot kinematic frame (alterations of instrument position registration due to tool bending, etc.) to that patient's anatomy and also to compensate for the non-rigid behavior of the robot. From the tool tip tracking, the distance of the tool tips to the dynamic virtual fixture boundaries will be computed.

In some embodiments, force-feedback virtual fixtures can be used to improve the economy, speed and accuracy of user motions in the tele-operated environment. In particular, we will construct forbidden-region virtual fixtures (FRVFs) based on haptic rendering information obtained from RGB+D cameras. Haptic virtual fixtures (HVFs) can be used in two feedback control paths in this co-robotic system: by the surgeon, and by the robot's position control system.

HVFs can be used to generate self-adjusting virtual fixtures around protected objects (e.g., the blood supply of a kidney, liver and spleen), based upon video and dynamically changing depth information. This information must be combined with knowledge of the tool tips (end effectors of the surgical robot), in order to provide useful information to the surgeon. HVFs can be generated using real-time state and parameter estimates provided by Unscented Kalman Filters (UKFs)

The UKF can provide real-time estimates of tool tip contact force when the tool is in contact with tissue used in the haptic feedback. The UKF and a mathematical model of the mechanical properties of the tool tip (tool bending and rotation of the tool) can calculate real-time bounds on the tool tip location when the tool is not in contact with tissue. This information can adjust the offset distance of the virtual fixture. In some scenarios, an adjustment can be more or less conservative based on the respective uncertainty or certainty of a location of the tool tip. The real-time estimates provided by the UKF can be used to cross-check to the tool tip location estimates obtained from the haptic rendering algorithm. If the two different estimates are inconsistent, tool motion can be inhibited and/or an alert can be generated/displayed to indicate that there may be an error with virtual fixtures.

In addition to providing haptic information to the surgeon, we can also use tool tip tracking and dynamically changing virtual fixtures to modify robot control actions. One option is to lock out certain motions. Another option is to combine providing haptic information and modifying dynamic response of the robot, slowing down motion that is too close to the virtual fixture boundaries.

A Model Predictive Control (MPC) approach can be used to obtain precise control for the implementation of virtual fixtures. In MPC, the control plan over a fixed time horizon in the future is determined by solving an optimization problem over that horizon. The optimization includes minimizing a cost function of states and inputs. MPC incorporates a model of the system to predict the states in future, by propagating the dynamics forward in time. The first part of the control sequence is applied and the optimization problem is repeated for the shifted time horizon. The MPC can be readily used for implementing virtual fixtures, as the distance between the tool tip and virtual fixture can be incorporated into the cost that is optimized.

Differential Dynamic Programming (DDP) can be used to solve the MPC optimization problem sequentially. Each DDP iteration consists of two steps: a backward pass and a forward pass. In the backward pass, models of the cost and the dynamics along the nominal states are employed for calculating a set of feedforward and feedback gains for the entire horizon. These gains result in a control sequence that is used in the forward pass to simulate transition of the system to new nominal states. The backward and forward passes are repeated until convergence of this process is achieved within a specified tolerance. DDP can handle arbitrary state and input constraints. A virtual fixture can therefore be defined as constraints in state-space by imposing a relatively large cost on trajectories that violate this constraint. In some embodiments, execution time can be decreased by using a parallel implementation of DDP.

Haptic Rendering Applications for Underwater Object Removal

Disclosed are techniques and apparatus related to co-robotic removal of objects underwater, particularly underwater unexploded ordnance. A underwater video+depth camera, similar in spirit to the MICROSOFT® XBOX® KINECT®, but suitable for underwater conditions can be used for locating objects underwater and providing data for haptic feedback to a human operator of the robot. The haptic feedback can provide a human operator with a sense of touch for objects seen by the camera.

This system can: (a) permit the operator to 'feel' objects, such as underwater ordnance during remediation, through a haptic hand control interface, based upon the camera system image and dynamic haptic rendering, (b) enable the operator to guide the robot end-effectors with the target during removal, via tele-operation, and (c) establish virtual 'force fields' around protected zones of objects (such as locations that might result in explosion of the ordnance). If the tele-operator tries to move too close to a protected zone, he/she will feel resistance as the hand controls "push back". Imposition of protected zones, perhaps via virtual features, can prevent robot end effector contact with undesirable locations, either in the environment or on the ordnance. Combined with a tele-operated robotic device, this will allow human directed robotic capture and removal of objects, such as unexploded ordnance, from lake, river and/or sea bottoms.

Figure 13:
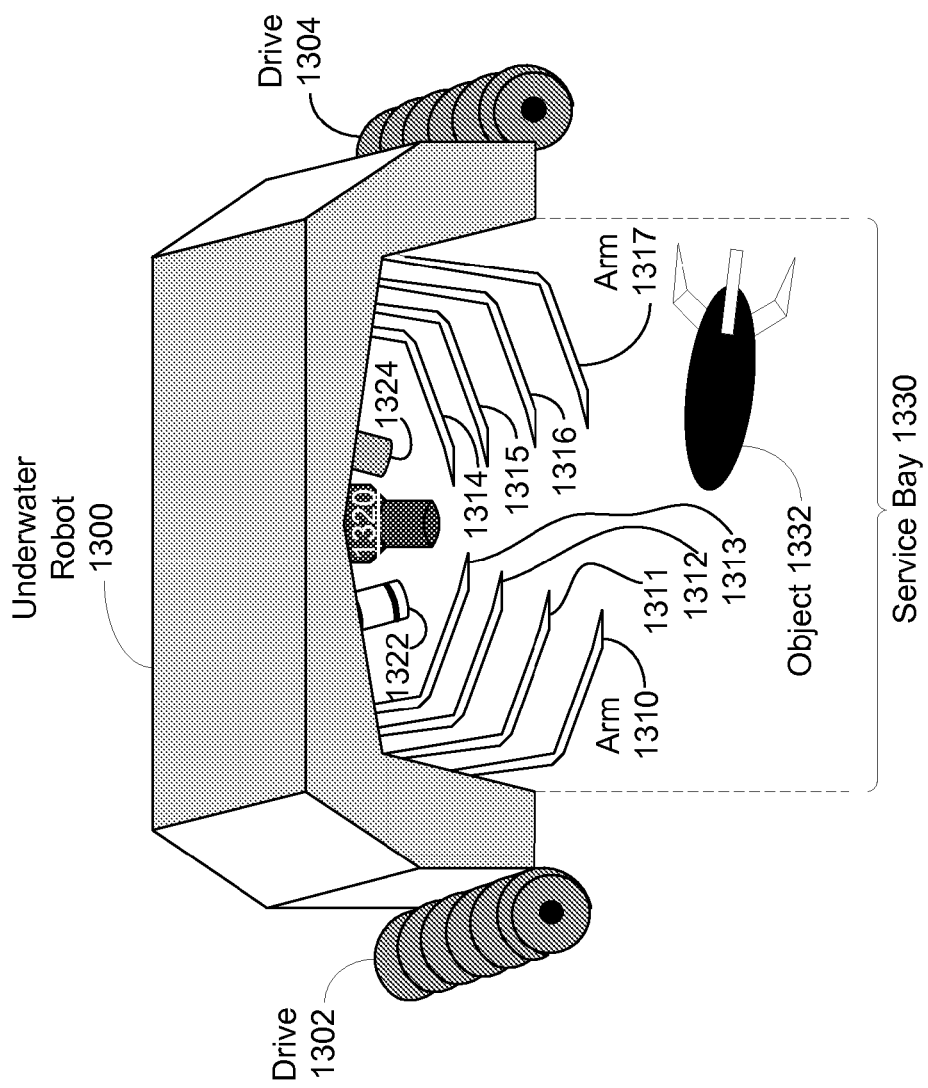
FIG. 13 shows an underwater robot, in accordance with an example embodiment.

FIG. 13 shows underwater robot 1300, in accordance with an example embodiment. Robot 1300 is configured with two screw drives 1302, 1304, eight robotic arms 1310, 1311, 1312, 1313, 1313, 1315, 1316, 1317, light sources 1320, 1324, and camera 1322.

Robot 1300 can be a bottom-crawling vehicle with a screw-drive propulsion system. Robot 1300 can move over an underwater object, such as ordnance, and the tele-operator uses robot arms 1310-1317 to grab the underwater object. Light sources 1320, 1324 and camera 1322 can operate together as a camera system.

As shown in FIG. 13, camera system 1320, 1322, 1324 can be integrated into a chassis of robot 1300 and image the region within service bay 1330. Camera system 1320, 1322, 1324 can generate a three-dimensional image of object(s) within service bay 1330, such as object 1332. The images generated by camera system 1320, 1322, 1324 can be provided to a processor at the surface to haptically rendering images within service bay 1330. A human tele-operator interacts with robot 1300, arms 1310-1317, and objects such as object 1332, using a haptic interface. The tele-operator can control arms 1310-1317 to either move object 1332, pick up object 1332, attach a sling and cable to object 1332 for future retrieval, and/or some other action such as mark the object for better identification.

Robot 1300 can use a system of screw drives 1302, 1304 for propulsion. Using screw drives maintains negative buoyancy throughout a mission and thus robot 1300 need not manage buoyancy. The use of screw drives, in contrast to thrusters, lowers the risk of stirring up silt or sand, which can deteriorate visibility. Additionally, silt poses a challenge to traditional track-driven vehicles not faced by screw drives.

FIG. 13 shows that screw drives 1302, 1304 are mounted on each side of robot 1300. Each screw drive 1302, 1304 can be driven at varying speeds. Robot 1300 can move sideways and thrust may be vectored so that non-holonomic constraints do not limit operation. Thrust vectoring allows for increased maneuverability and simplifies the role of the tele-operator, allowing for natural modes of operation and quick adjustments to the platform's location on the sea, river, or lake bed. Screw drives 1302, 1304 can also be articulated, allowing for a range of maneuvers and for convenient movements such as vertical translation of the chassis and service bay 1332 of robot 1300. In some scenarios, screw drives 1302, 1304 can dig into mud, getting the robot 1300 deeper into areas that may have buried ordnance.

Robotic manipulation and removal of munitions requires a stable platform that can remain fixed in an inertial frame with respect to the object. To carefully and firmly grip an object identified for removal, the system can use a number of robotic manipulators designed for the task, such as arms 1310-1317.

Arms 1310-1317 can have a series of linkages and the necessary actuation to achieve motion derivatives that accomplish desired gripping maneuvers to handle underwater objects. In some embodiments, such as shown in FIG. 13, each of arms 1310-1317 is identical and is designed for planar motion. When gripping an object, the trajectory of each of arms 1310-1317 is designed to achieve optimal grasping with respect to the goals and constraints defined by a human operator.

In some embodiments, each of arms 1310-1317 uses a low number of degrees of freedom. With eight low degree-of-freedom arms as shown in FIG. 13, intricate shapes can still be achieved with the coordinated manipulator system to allow for a high level of dexterity using simple components. As shown in FIG. 13, arms 1310-1317 can be mounted along either side of the service bay 1330, allowing them to oppose on another so that simple motions can result in stable gripping of munitions. The use of eight arms allows for a lower contact pressure on an object from each contacting arm. Also, a subset of arms 1310-1317 can be used, such as when a forbidden region on object 1332 prohibits one or more arms from gripping object 1332 at a particular location. In some embodiments, robot 1300 and arms 1310-1317 can operate in several modes of operation and redundancy, allowing an operator to carry out tasks even when a manipulator suffers damage.

The camera system can use a 'range gated' approach to allow both visible (blue green) and NIR images to be captured in combined stream of visible (blue green) and NIR images. Light source 1320 can be configured with blue-green filters and/or blue-green light-emitting diodes. The blue-green filters are configured to pass through light in a blue-green frequency range of 450-480 nm, while the blue-green diodes are configured to emit light in the blue-green frequency range.

Light source 1324 can include a NIR laser and a diffraction grating. The NIR laser and diffraction grating project a pseudo-random of dots of varying intensities. Camera 1322 can measure depth from the distortion between the projected and observed dot patterns. In some embodiments, the pulse duration for the NIR laser can be shorter than the time to travel to the target to reduce back scatter.

Camera system 1322 can be configured to capture the visible (blue green) and NIR images alternatively; that is illumination and camera frames are synchronized to capture the visible (blue green) and NIR images alternatively. That is, light sources 1320, 1324 can be alternatively activated at frame speed of camera 1322 to capture visible and NIR images in a single image stream. Dual-wavelength camera system 1322 can allow robot 1300 to obtain 2D images with depth measurements in low light conditions using a single camera. In some embodiments, camera system 1322 can be configured as an endoscope. Camera 1322 can include one or more adapters to combine the projected mask pattern from the light source 1324 with visible light source 1320, and recover the depth information from the reflected light with a wavelength-specific beam splitter.

In some embodiments, camera 1322 can be a modified 0° or 30° 10 mm endoscope with light sources and detectors separated by fixed distances. In particular embodiments, camera 1322 can output frames with VGA resolution (720× 900 pixels) at 30 frames per second, in RGB+Depth (RGB+D) format.

To calibrate the visible and depth images, planar calibration of camera system 1320, 1322, 1324 can first be performed on a planar surface with a checkerboard pattern. With camera system 1320, 1322, 1324 configured for close depth detection, the checkerboard can be produced with photolithographic techniques for both scale and accuracy. After planar testing is complete, optical testing of camera system 1320, 1322, 1324 can be performed on an irregular non-planar surface with both elevations and depressions to determine a depth resolution, and any effect of geometric distortion on the optical distortion of camera system 1320, 1322, 1324. If distortion is detected, a distortion-correction technique that automatically calculates correction parameters without precise knowledge of horizontal and vertical orientation can be used to correct the detected distortion.

The above-mentioned haptic rendering process can use camera system 1320, 1322, 1324 to generate RGB+D data, point clouds, and haptic feedback. The haptic feedback can give a tele-operator a "feel" for underwater objects that are within the field of the underwater video+depth cameras, such as underwater ordnance during remediation. The tele-operator's console (to transmit operator control actions as well as haptic feedback) can use two PHANTOM OMNI® haptic devices (SensAble Technologies) such as discussed above in the context of FIG. 3. As the tele-operator moves the robot through the haptic interface devices, he/she can feel a "force field" of increasing impedance, as proximity of the tool tip to the virtual fixture boundary decreases.

Virtual fixtures can be established around the portion of protected structure; that is, structures not to be touched during a remediation procedure. Force-feedback virtual fixtures designed can improve the economy, speed and accuracy of user motions in the tele-operated environment. In particular, forbidden-region virtual fixtures (FRVFs) driven by haptic rendering information obtained from RGB+D camera(s) can be used in two feedback control paths in this co-robotic system: by the tele-operator, and by a position control system for robot 1300.

Virtual fixtures around critical parts of a target (e.g., locations that would trigger explosion of the ordnance) can be designated by operator input or through image recognition. For operator designation of a virtual fixture, the tele-operator will specify the boundaries of virtual fixture either using a haptic interface device, or by using mouse, touch screen, or other input on a video display. At any time during operation of robot 1300, a tele-operator of robot 1300 can re-define virtual fixtures by drawing on a real time image, or by repeating the virtual fixture designation process. For automatic recognition, an image recognition capability could be used to specify 'no touch' zone(s) based on objects detected from images captured by camera system 1320, 1322, 1324.

Effectors at ends of robot arms 1310-1317 can be tracked in real time. Using the haptic rendering algorithms described above, haptic feedback can be provided to the tele-operator, such as pushing back if an effector gets too close to a protected location; i.e., near or within a forbidden region defined as a virtual fixture. Additionally or instead, if an effector gets too close to a protected location, robot control actions can be modified to lock out certain motions. For example, suppose a forbidden region had been defined that was directly astern from robot 1300. Then, if the tele-operator of robot 1300 attempted movement of one or more of arms 1310-1317 backwards close to or within the forbidden region, haptic feedback, such as resistance, can be used to inform the tele-operator about the forbidden region. Additionally or instead, backward movements of robot 1300 can be inhibited while the forbidden region remains directly astern of robot 1300. In some embodiments, both providing haptic information and dynamic robot responses can be modified; such as both providing resistance to the teleoperator and slowing down motion of robot 1300 that is near or within a boundary of a virtual fixture. Many other examples are possible as well.

A Model Predictive Control (MPC) approach can be used to obtain precise control for the implementation of virtual fixtures. In MPC, the control plan over a fixed time horizon in the future is determined by solving an optimization problem over that horizon. As discussed above in the context of co-robotic surgery, Differential Dynamic Programming (DDP) can be used to solve the MPC optimization problem.

An Example Method for Haptic Rendering

Figure 14:
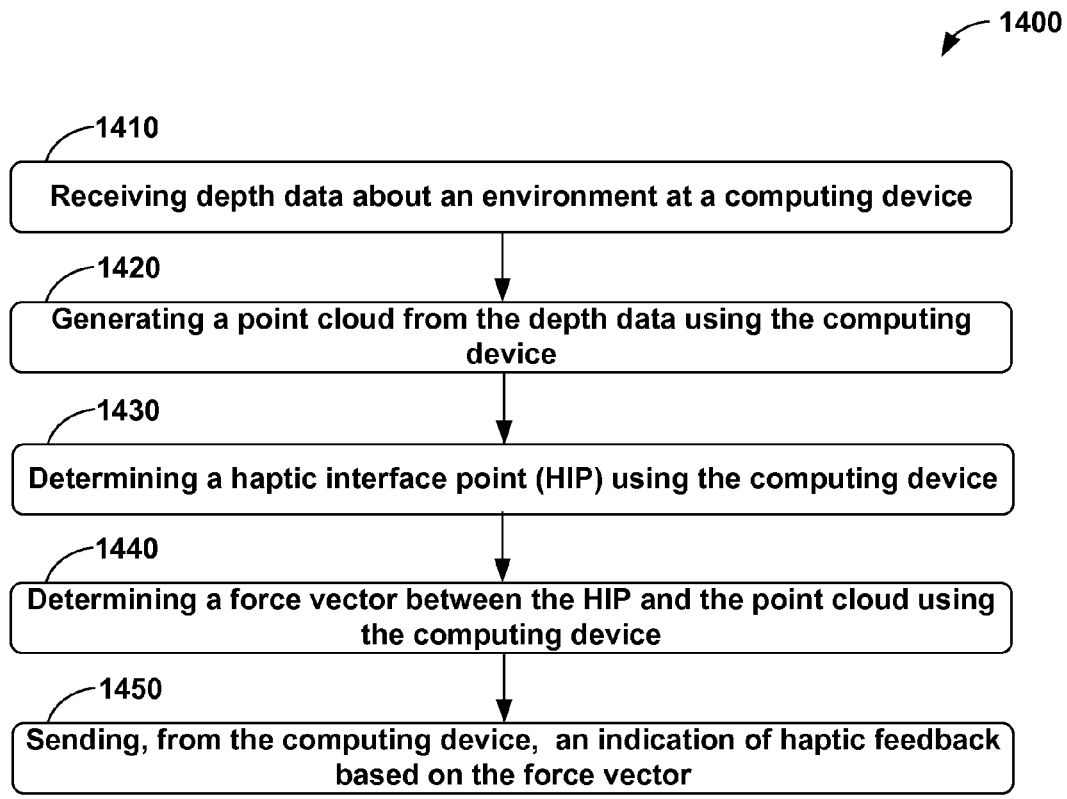
FIG. 14 is a flowchart of a method, in accordance with an example embodiment.

FIG. 14 is a flowchart depicting example functional blocks of an example method 1400. Method 1400 begins at block 1410, where a computing device can receive depth data about an environment, such as discussed above in detail in the context of at least FIGS. 3A, 3B, and 8.

In some embodiments, receiving the depth data about the environment can include receiving the depth data about the environment from one camera. In other embodiments, receiving the depth data about the environment can include receiving the depth data about the environment from a plurality of cameras.

At block 1420, a computing device can generate a point cloud from the depth data, such as discussed above in detail in the context of at least FIGS. 3A, 3B, and 8.

At block 1430, the computing device can determine a haptic interface point (HIP), such as discussed above in detail in the context of at least FIGS. 3A-6E.

At block 1440, the computing device can determine a force vector between the HIP and the point cloud, such as discussed above in detail in the context of at least FIGS. 3A-6E. In some embodiments, determining the force vector between the HIP and the point cloud can include determining the force vector between the HIP and the point cloud using a proxy. The proxy can be configured to select zero or more points of the point cloud near the proxy.

In other embodiments, the proxy can include a reference point for the proxy, at least three scale factors, and a movement state. Example reference points for the proxy can include a center of the proxy or one or more corners of a bounding rectangle/volume specifying the proxy, while other reference points for the proxy are possible as well. Example scale factors include radii r1, r2, and r3 discussed above for a circular/spherical proxy with $0<r1<r2\leq r3$ or side lengths s1, s2, and s3 for a square/cubic proxy, $0<s1<s2\leq s3$. Other proxy shapes, including an undefined proxy shape (e.g., a "blob") are possible as well.

In these embodiments, determining the force vector between the HIP and the point cloud using the computing device can further include: (i) determining a number N1 of points within the point cloud inside of a box of side length 2s1 centered at the proxy center, where 2s1 means 2 times the side length s1, (b) determining a number N2 of points within the point cloud inside of a box of side length 2s2 centered at the proxy center, where 2s1 means 2 times the side length s2, (c) in response to determining N2 equals 0, determining that the movement state is a free-motion state, (d) in response to determining that N2>0 and that N1 equals 0, determining that the movement state is an in-contact state, and (e) in response to determining that N1>0, determining that the movement state is an entrenched state.

In particular embodiments, the proxy can have a center, at least one radius from the center of the proxy, and a movement state. In some of the particular embodiments, the proxy can include at least three radii from the center of the proxy: r1, r2, and r3, where $0<r1<r2<r3$. Then, determining the force vector between the HIP and the point cloud can include: (a) determining a closest point within the point cloud to the center of the proxy and a closest distance between the closest point and the center of the proxy, and (b) selecting one or more movement states based on at least one comparison between the closest distance and at least one radius of the three radii.

In a subset of some of the particular embodiments, selecting one or more movement states based on at least one comparison between the closest distance and at least one radius of the three radii can include: (a) that the movement state can be determined as an entrenched state in response to determining that the closest distance is less than radius r1, (b) the movement state can be determined as being in an in-contact state in response to determining that the closest distance is greater than radius r1 but less than radius r2, and (c) the movement state can be determined as being in a free-motion state in response to determining that the closest distance is greater than radius r2. In a subset of some of the particular embodiments, the radius r3 can be substantially larger than the radius r2, such as discussed above in the context of at least FIG. 4A.

In more particular embodiments, determining the force vector between the HIP and the point cloud using the computing device can further include determining a surface-normal set of points within the radius r3 of the center of the proxy. Then, a sum of a number of surface-normal estimates can be determined, where each surface-normal estimate in the number of surface-normal estimates can include an estimate of a surface normal between a surface-normal point in the set of surface-normal points and the proxy. An estimated surface normal n between the proxy and the point cloud can be determined based on the sum of the number of surface-normal estimates.

In still more particular embodiments, determining the force vector between the HIP and the point cloud using the computing device can further include determining the force vector using at least one of: a position of the HIP, a rate of change of the position of the HIP, a position of the center of the proxy, and a rate of change of the position of the center of the proxy. In even still more particular embodiments, determining the force vector using at least one of the position of the HIP, the rate of change of the position of the HIP, the position of the center of the proxy, and the rate of change of the position of the center of the proxy comprises can further include determining a HIP vector u between the HIP and the center of the proxy, and a negated HIP vector −u. An angle θ between −u and n can be determined. A determination is made whether the angle θ exceeds a predetermined angle θ_threshold and that the HIP is not at the center of the proxy. Then, in response to determining that the angle θ exceeds the predetermined angle θ_threshold and that the HIP is not at the center of the proxy, the proxy can be moved.

In some of the even still more particular embodiments, moving the proxy can include moving the proxy using at least one of: a position of the HIP, a rate of change of the position of the HIP, a position of the center of the proxy, and a rate of change of the position of the center of the proxy. In a subset of the some of the even still more particular embodiments, moving the proxy using at least one of the position of the HIP, the rate of change of the position of the HIP, the position of the center of the proxy, and the rate of change of the position of the center of the proxy can include determining an estimated surface of the point cloud based on n. When the movement state is the free-motion state, the proxy can be moved along u toward the HIP. When either (a) the movement state is the entrenched state or (b) when the movement state is the in-contact state and the HIP is outside the estimated surface, the proxy can be moved along n. Also, when the movement state is the in-contact state and the HIP is inside the estimated surface the proxy can be moved along a projection of u onto a plane defined by n.

In even more particular embodiments, determining the force vector between the HIP and the point cloud using the computing device can further include determining whether the movement state is the in-contact state and can include determining whether a length $\|u\|_2$ of u is greater than radius r2. In response to determining that the movement state is the in-contact state and that $\|u\|_2$ is greater than radius r2, $u_1$ can be determined by updating u to account for movement of the point cloud, a length of $u_1 \|u_1\|_2$ can be determined, and the force vector between the HIP and the point cloud can be determined based on a difference between $\|u_1\|_2$ and radius r2.

At block 1450, the computing device can send an indication of haptic feedback based on the force vector, such as discussed above in detail in the context of at least FIGS. 3A-7C. In some embodiments, the computing device can be configured to communicate with a controllable mechanism. In these embodiments, sending the indication of haptic feedback based on the force vector from the computing device can include sending the indication of haptic feedback based on the force vector from the computing device to the controllable mechanism. Additionally, method 1400 can further include providing haptic feedback based on the indication of haptic feedback using the controllable mechanism.

In particular embodiments, the controllable mechanism can include haptic interface devices, such as haptic interface device 316. In other embodiments, method 1400 can further include receiving image data at the computing device, where the image data corresponds to the depth data. Then, in these embodiments, a virtual environment based on the depth data and the image data can be generated. In some of these other embodiments, generating the virtual environment can include generating the HIP within the virtual environment.

In even other embodiments, method 1400 can further include defining a forbidden region within the environment. In these even other embodiments, determining the force vector between the HIP and the point cloud can include inhibiting a proxy center from moving within the forbidden region.

In still other embodiments, the controllable mechanism can include a medical intervention device. In yet other embodiments, the proxy can include multiple proxies operating on the same point cloud.

In further embodiments, method 1400 can further include controlling a motion of an object or character within a virtual environment. The virtual environment can include at least one virtual object and at least one real surface. In some of these further embodiments, the virtual environment can include a computer generated multi-user virtual environment. In particular of these further embodiments, the virtual environment can include a virtual environment for a game. In other particular of these further embodiments, the virtual environment can include a virtual environment for a teleconferencing system.

In additional further embodiments, the virtual environment can include a first object and a second object different from the first object. In these embodiments, method 1400 can further include determining a contact between the first object and the second object.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include physical and/or non-transitory computer readable media such as computer-readable media that stores data for short periods of time like register memory, processor cache, and random access memory (RAM). The computer readable media may also include physical and/or non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

The terms physical and/or tangible computer-readable medium and physical and/or tangible computer-readable media refer to any physical and/or tangible medium that can be configured to store instructions for execution by a processor, processing unit and/or computing device. Such a medium or media can take many forms, including but not limited to, non-volatile media and volatile media. Non-volatile media includes, for example, read only memory (ROM), flash memory, magnetic-disk memory, optical-disk memory, removable-disk memory, magnetic-tape memory, hard drive devices, compact disc ROMs (CD-ROMs), direct video disc ROMs (DVD-ROMs), computer diskettes, and/or paper cards. Volatile media include dynamic memory, such as main memory, cache memory, and/or random access memory (RAM). Many other types of tangible computer-readable media are possible as well. As such, the herein-described data storage can comprise and/or be one or more physical and/or tangible computer-readable media.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
receiving first depth data about an environment at a computing device;
generating a first point cloud from the first depth data using the computing device;
determining a haptic interface point (HIP) using the computing device;
determining, using the computing device, a first force vector between the HIP and the first point cloud utilizing a proxy, wherein the proxy is configured to select zero or more points near the proxy, wherein the proxy comprises a center of the proxy and at least three scale radii r1, r2, and r3 with r1<r2≤r3, and wherein determining the first force vector comprises:
determining a closest point within the first point cloud to the center of the proxy, and a closest distance between the closest point and the center of the proxy;
selecting one or more movement states based on at least one comparison between the closest distance and at least one radius of the three radii;
determining a surface-normal set of points based on points within the first point cloud and within the radius r3 of the center of the proxy;
determining a sum of a number of surface-normal estimates, wherein each surface-normal estimate in the number of surface-normal estimates comprises an estimate of a surface normal between a surface-normal point in the set of surface-normal points and the proxy; and
determining an estimated surface normal n between the proxy and the first point cloud based on the sum of the number of surface-normal estimates;
determining a HIP vector u between the HIP and the center of the proxy, and a negated HIP vector −u;
determining an angle θ between −u and n;
determining whether the angle θ exceeds a predetermined angle θ threshold and that the HIP is not at the center of the proxy; and
in response to determining that the angle θ exceeds the predetermined angle θ threshold and that the HIP is not at the center of the proxy, moving the proxy;
sending, from the computing device, a first indication of haptic feedback based on the first force vector;
receiving second depth data about the environment at the computing device, wherein the second depth data differs from the first depth data;
generating a second point cloud from the second depth data using the computing device;
determining a second force vector between the HIP and the second point cloud using the computing device; and
sending, from the computing device, a second indication of haptic feedback based on the second force vector.

2. The method of claim 1, wherein the computing device is configured to communicate with a controllable mechanism, wherein sending the indication of haptic feedback based on the force vector from the computing device comprises sending the indication of haptic feedback based on the force vector from the computing device to the controllable mechanism, and wherein the method further comprises:
providing haptic feedback based on the indication of haptic feedback using the controllable mechanism.

3. The method of claim 2, wherein the controllable mechanism comprises a medical intervention device.

4. The method of claim 1, further comprising:
receiving first image data at the computing device, wherein the first image data corresponds to the first depth data; and
generating a virtual environment based on the first depth data and the first image data, wherein the virtual environment comprises an indication of the HIP within the virtual environment.

5. The method of claim 4, wherein the virtual environment comprises a first object and a second object different from the first object, and wherein the method further comprises:
determining a contact between the first object and the second object.

6. The method of claim 1, wherein the computing device is configured to communicate with an underwater robot.

7. The method of claim 1, wherein the proxy further comprises a movement state.

8. The method of claim 7, wherein selecting the one or more movement states based on the at least one comparison between the closest distance and the at least one radius of the three radii comprises:
in response to determining that the closest distance is less than radius r1, determining that the movement state is an entrenched state;
in response to determining that the closest distance is greater than radius r1 but less than radius r2, determining that the movement state is an in-contact state; and
in response to determining that the closest distance is greater than radius r2, determining that the movement state is a free-motion state.

9. The method of claim 8, wherein determining the force vector between the HIP and the first point cloud using the computing device further comprises:
determining whether the movement state is the in-contact state;
determining whether a length $\|u\|_2$ of u is greater than radius r2; and
in response to determining that the movement state is the in-contact state and that $\|u\|_2$ is greater than radius r2:
determining $u_1$ by updating u using an estimate of movement of the first point cloud,
determining a length of $u_1$ $\|u_1\|_2$, determining the first force vector between the HIP and the first point cloud based on a difference between $\|u_1\|_2$ and radius r2.

10. The method of claim 9, wherein moving the proxy comprises:
   determining an estimated surface of the first point cloud based on n;
   moving the proxy along u toward the HIP, when the movement state is the free-motion state;
   moving the proxy along n, when either (a) the movement state is the entrenched state or (b) when the movement state is the in-contact state and the HIP is outside the estimated surface; and
   moving the proxy along a projection of u onto a plane defined by n, when the movement state is the in-contact state and the HIP is inside the estimated surface.

11. The method of claim 1, wherein the environment comprises an undersea environment.

12. The method of claim 1, wherein determining the first force vector between the HIP and the first point cloud using the computing device further comprises:
   determining the first force vector using at least one of: a position of the HIP, a rate of change of the position of the HIP, a position of the center of the proxy, and a rate of change of the position of the center of the proxy.

13. The method of claim 1, wherein moving the proxy comprises moving the proxy using at least one of: a position of the HIP, a rate of change of the position of the HIP, a position of the center of the proxy, and a rate of change of the position of the center of the proxy.

14. The method of claim 1, further comprising:
   defining a forbidden region within the environment, wherein determining the first force vector between the HIP and the first point cloud comprises inhibiting a proxy center from moving within the forbidden region.

15. The method of claim 1, further comprising:
   controlling a motion of an object or character within a virtual environment, wherein the virtual environment comprises at least one virtual object and at least one real surface.

16. An article of manufacture, comprising a physical computer-readable storage medium storing instructions that, upon execution by a processor, cause the processor to perform functions comprising:
   receiving first depth data about an environment;
   generating a first point cloud from the first depth data;
   determining a haptic interface point (HIP);
   determining a first force vector between the HIP and the first point cloud utilizing a proxy, wherein the proxy is configured to select zero or more points near the proxy, wherein the proxy comprises a center of the proxy and at least three scale radii r1, r2, and r3 with r1<r2≤r3, and wherein determining the first force vector comprises:
      determining a closest point within the first point cloud to the center of the proxy, and a closest distance between the closest point and the center of the proxy;
      selecting one or more movement states based on at least one comparison between the closest distance and at least one radius of the three radii;
      determining a surface-normal set of points based on points within the first point cloud and within the radius r3 of the center of the proxy;
      determining a sum of a number of surface-normal estimates, wherein each surface-normal estimate in the number of surface-normal estimates comprises an estimate of a surface normal between a surface-normal point in the set of surface-normal points and the proxy; and
      determining an estimated surface normal n between the proxy and the first point cloud based on the sum of the number of surface-normal estimates;
      determining a HIP vector u between the HIP and the center of the proxy, and a negated HIP vector −u;
      determining an angle θ between −u and n;
      determining whether the angle θ exceeds a predetermined angle θ_threshold and that the HIP is not at the center of the proxy; and
      in response to determining that the angle θ exceeds the predetermined angle θ_threshold and that the HIP is not at the center of the proxy, moving the proxy;
   sending a first indication of haptic feedback based on the first force vector;
   receiving second depth data about the environment, wherein the second depth data differs from the first depth data;
   generating a second point cloud from the second depth data;
   determining a second force vector between the HIP and the second point cloud; and
   sending a second indication of haptic feedback based on the second force vector.

17. A computing device, comprising:
   a processor; and
   data storage, storing instructions that, upon execution by the processor, cause the computing device to perform functions comprising:
      receiving first depth data about an environment;
      generating a first point cloud from the first depth data;
      determining a haptic interface point (HIP);
      determining a first force vector between the HIP and the first point cloud utilizing a proxy, wherein the proxy is configured to select zero or more points near the proxy, wherein the proxy comprises a center of the proxy and at least three scale radii r1, r2, and r3 with r1<r2≤r3, and wherein determining the first force vector comprises:
         determining a closest point within the first point cloud to the center of the proxy, and a closest distance between the closest point and the center of the proxy;
         selecting one or more movement states based on at least one comparison between the closest distance and at least one radius of the three radii;
         determining a surface-normal set of points based on points within the first point cloud and within the radius r3 of the center of the proxy;
         determining a sum of a number of surface-normal estimates, wherein each surface-normal estimate in the number of surface-normal estimates comprises an estimate of a surface normal between a surface-normal point in the set of surface-normal points and the proxy; and
         determining an estimated surface normal n between the proxy and the first point cloud based on the sum of the number of surface-normal estimates;
         determining a HIP vector u between the HIP and the center of the proxy, and a negated HIP vector −u;
         determining an angle θ between −u and n;
         determining whether the angle θ exceeds a predetermined angle θ_threshold and that the HIP is not at the center of the proxy; and in response to determining that the angle $\theta$ exceeds the predetermined angle $\theta\_threshold$ and that the HIP is not at the center of the proxy, moving the proxy;
sending a first indication of haptic feedback based on the first force vector;
receiving second depth data about the environment, wherein the second depth data differs from the first depth data;
generating a second point cloud from the second depth data;
determining a second force vector between the HIP and the second point cloud; and
sending a second indication of haptic feedback based on the second force vector.

* * * * *